US 6,654,487 B1

(12) United States Patent
Downs, Jr.

(10) Patent No.: US 6,654,487 B1
(45) Date of Patent: Nov. 25, 2003

(54) CHARACTER RECOGNITION, INCLUDING METHOD AND SYSTEM FOR PROCESSING CHECKS WITH INVALIDATED MICR LINES

(76) Inventor: Charles H. Downs, Jr., 2900 72nd Ave., SE., Norman, OK (US) 73026

( * ) Notice: Subject to any disclaimer, the term of this patent is extended or adjusted under 35 U.S.C. 154(b) by 0 days.

(21) Appl. No.: 09/518,424

(22) Filed: Mar. 3, 2000

(51) Int. Cl.⁷ .............................. G06K 9/00; G06K 9/74
(52) U.S. Cl. ...................................... 382/139; 382/213
(58) Field of Search ................................ 382/137, 138, 382/139, 140, 310, 318, 258, 259, 209, 213

(56) References Cited

U.S. PATENT DOCUMENTS

| | | | | |
|---|---|---|---|---|
| 3,949,363 A | * | 4/1976 | Holm .................. | 340/146.3 |
| 3,988,571 A | * | 10/1976 | Blair et al. ............ | 235/61.9 |
| 4,027,142 A | * | 5/1977 | Paup et al. ............ | 235/61.9 |
| 4,103,617 A | | 8/1978 | O'Brien et al. ........ | 101/93.03 |
| 4,205,780 A | * | 6/1980 | Burns et al. ........... | 235/454 |
| 4,315,246 A | * | 2/1982 | Milford ................. | 340/146.3 |
| 4,408,342 A | * | 10/1983 | Grabowski et al. ..... | 382/9 |
| 4,555,617 A | * | 11/1985 | Brooks et al. .......... | 235/379 |
| 4,888,812 A | * | 12/1989 | Dinan et al. ........... | 382/140 |
| 5,077,805 A | | 12/1991 | Tan ...................... | 382/7 |
| 5,119,433 A | * | 6/1992 | Will ..................... | 382/140 |
| 5,146,512 A | * | 9/1992 | Weidman et al. ....... | 382/30 |
| 5,359,667 A | * | 10/1994 | Borowski et al. ....... | 382/140 |
| 5,754,673 A | * | 5/1998 | Broks et al. ........... | 382/112 |
| 5,754,674 A | * | 5/1998 | Ott et al. ............... | 382/112 |
| 5,832,140 A | * | 11/1998 | Stapleton et al. ....... | 382/298 |
| 5,963,659 A | * | 10/1999 | Cahill et al. ........... | 382/139 |
| 6,023,534 A | * | 2/2000 | Handley ................. | 382/275 |
| 6,243,504 B1 | * | 6/2001 | Kruppa .................. | 382/318 |

* cited by examiner

Primary Examiner—Amelia M. Au
Assistant Examiner—Martin Miller
(74) Attorney, Agent, or Firm—McAfee & Taft

(57) ABSTRACT

An automated analysis method and tool for a digitally imaged financial item can digitally recognize a plurality of characters across an area of a digital image containing character indicia at predetermined positions in the area and also possibly containing non-character indicia in the area. This finds exemplification in an automated check processing method and check sorting system in which a check's MICR line that has been read and interpreted as invalid can be digitally analyzed, via a digital image of the check, to identify MICR characters that could not be validly read or interpreted by the conventional MICR processing equipment. This includes digitally applying character recognition processing to an invalidated MICR line in a digital image of the financial item (e.g., a check). Previously invalidated MICR line data can then be corrected.

22 Claims, 8 Drawing Sheets

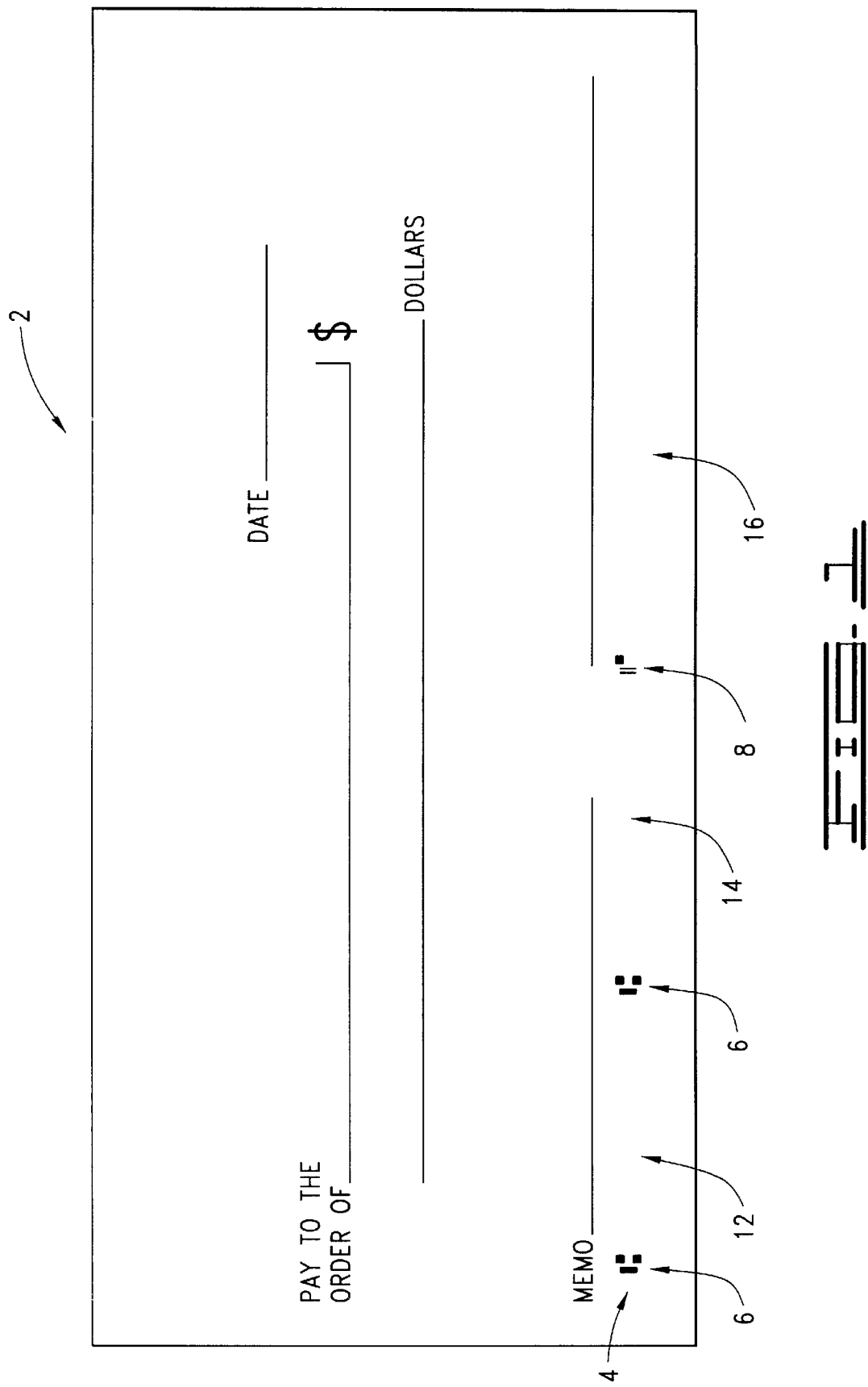

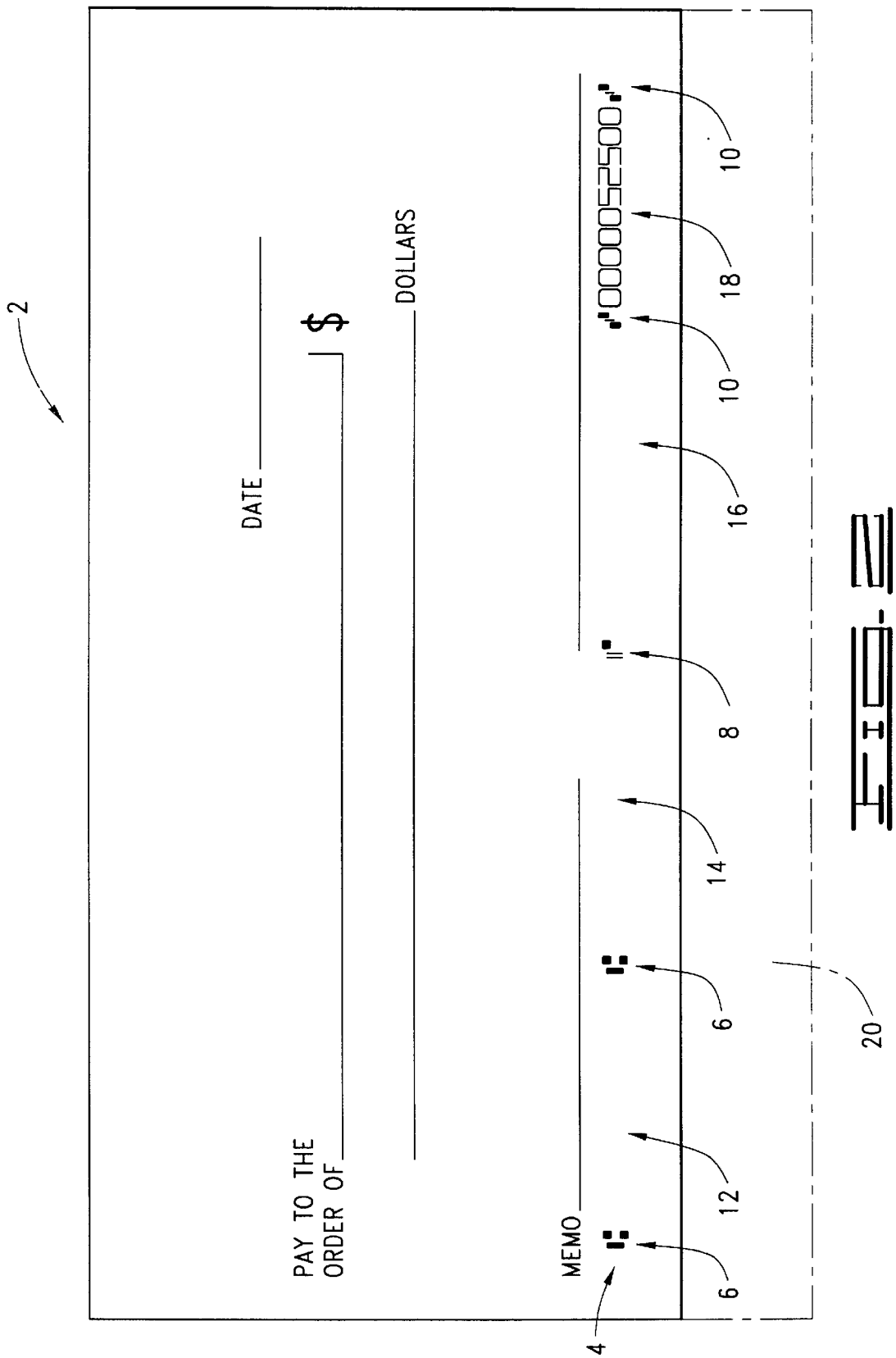

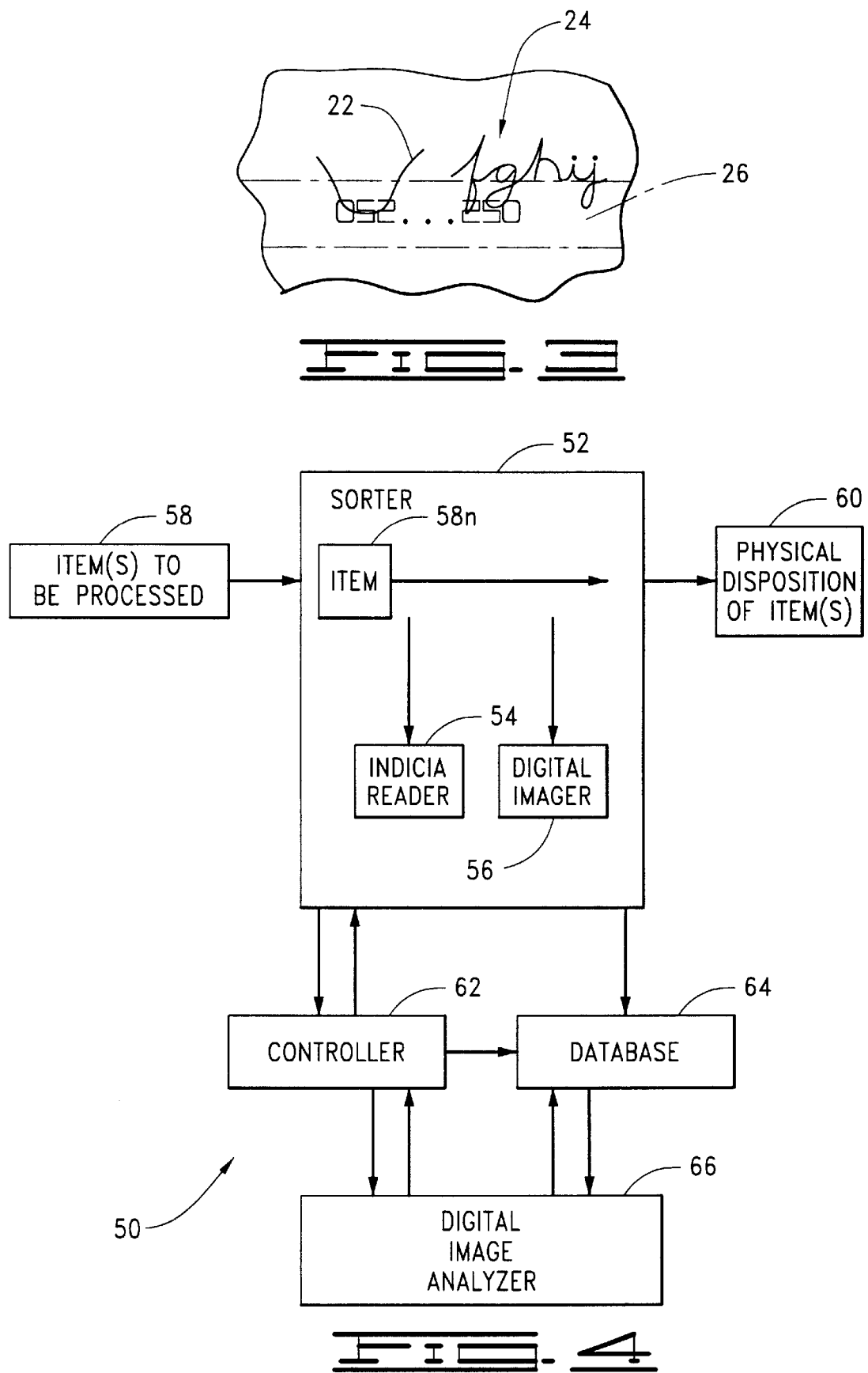

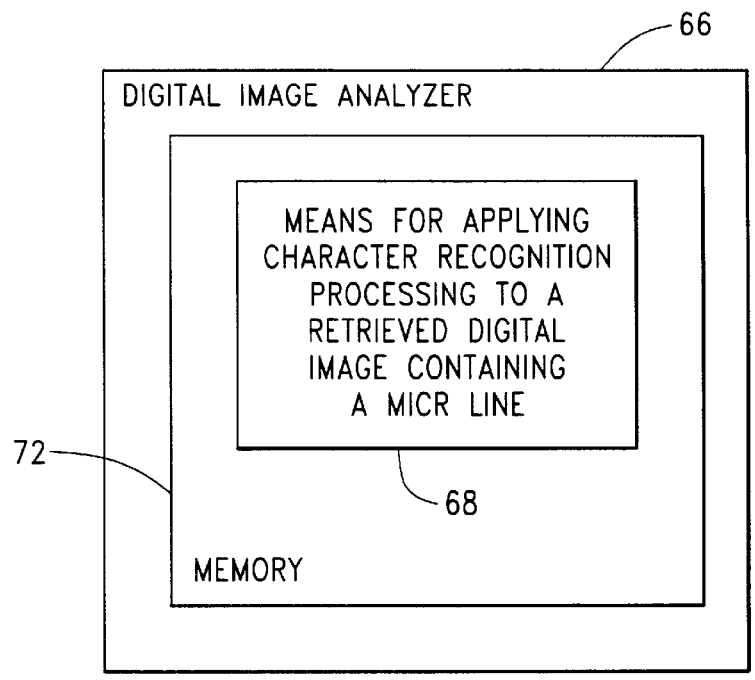
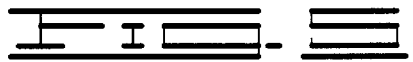
FIG. 5
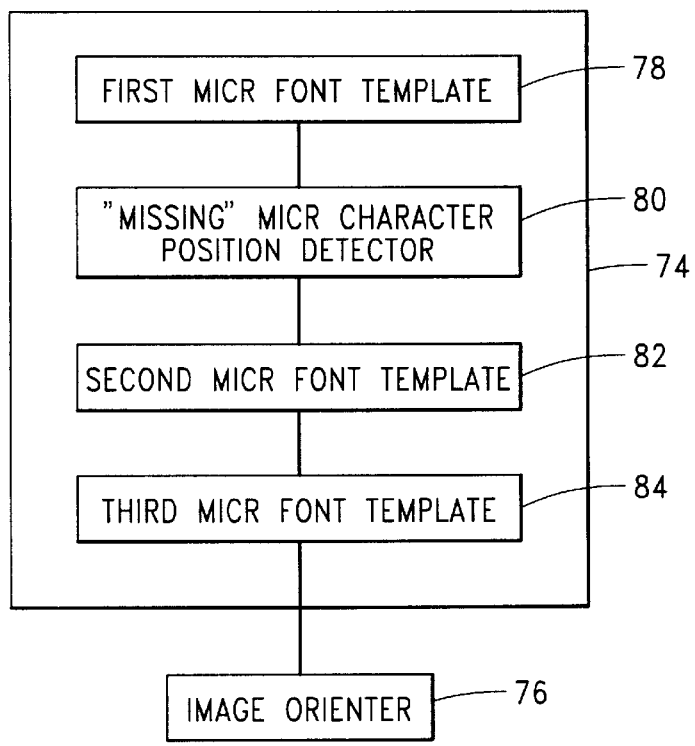
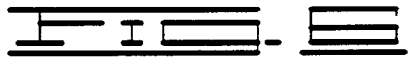
FIG. 6

CHARACTER RECOGNITION, INCLUDING METHOD AND SYSTEM FOR PROCESSING CHECKS WITH INVALIDATED MICR LINES

REFERENCE TO COMPUTER PROGRAM LISTING APPENDIX

Incorporated herein by reference is the material contained on the compact disc filed during the prosecution of this matter. Two duplicate compact discs have been submitted, and each contains one (1) file named 09-518,424.txt and created Nov. 1, 2002. The file is an OCR and manual reproduction of the program listing filed as part of the original application. The file size is 127 kilobytes.

BACKGROUND OF THE INVENTION

This invention relates generally to computer-implemented methods for digitally recognizing a plurality of characters across an area of a digital image containing character indicia at predetermined positions in the area and also possibly containing non-character indicia in the area. The invention relates particularly to an analysis method and tool for a digitally imaged financial item, such as a check having a MICR line, and even more particularly to a check processing method and a check sorting system.

Although the present invention has broader aspects referred to above, the invention will be described in the context of handling financial items, specifically checks which have along their lower portions indicia-containing areas referred to as "MICR lines." Referring to FIG. 1, a conventional check 2 has various conventional portions. These include the illustrated date, payee, numerical and alphabetical amount, memo, and signature areas. Typically other information is preprinted on the check as well (e.g., account holder identification information such as name and address, and bank name). The check 2 also includes a MICR line 4. "MICR" stands for Magnetic Ink Character Recognition, and the acronym is used in this specification and the claims as an adjective to designate conformance or compliance with fonts and formats used in magnetic ink character recognition technology.

With regard to MICR lines and characters used on checks in the United States, the symbol set includes numerals 0 through 9, a financial institution designation symbol 6 shown in FIG. 1, an individual account number designation symbol 8 shown in FIG. 1, an amount designation symbol 10 shown in FIG. 2, and a hyphen (not shown). On the check shown in FIG. 1, two symbols 6 define the limits of a portion 12 of the MICR line 4 within which a nine-digit financial institution identification number in MICR numerals (not shown) is preprinted on the check 2. The symbol 8 delimits to the right (as viewed in FIG. 1) a portion 14 of the MICR line 4 within which a nine-digit individual account number in MICR numerals (not shown) is preprinted on the check 2. To the right (as viewed in FIG. 1) of the symbol 8 is a portion 16 of the MICR line 4 in which the check number is preprinted in MICR format (not shown). During processing of the check subsequent to it being used by the account holder to draw on the holder's account, the symbols 10 and a ten-digit number in MICR format are printed in portion 18 of MICR line 4 shown in FIG. 2 to indicate the amount of the check (the number shown illustrates certain MICR numeral forms, and it represents a check amount of $525.00).

During the time between when the account holder uses the check 2 and when it is returned to him or her as a canceled check with the account holder's monthly bank statement, for example, the check may go through various check handling processes. These can be at a bank, at a Federal Reserve facility, or at a third-party check-handling facility, for example. One of these processes will be described as one context in which the present invention has utility.

In this check processing, a check sorter transports individual checks from a batch of checks at the input of the sorter to respective receptacles, referred to as pockets, at the output of the sorter. Along the way in the sorter, the MICR line is read and a digital image of the front and possibly back of the check is made. Other functions may be performed; however, the MICR line reading and the digital imaging are of particular significance to the present invention. The electrical signals generated by reading the MICR line are conducted or otherwise transmitted to a computer programmed to determine if the read MICR line is valid or invalid, and the electrical signals representing the digitized image are conducted or otherwise transmitted to a database providing a repository of digital images of the processed checks. The foregoing is known in the art.

If the programmed computer determines that the read MICR line is valid (as defined by programmed rules), it outputs control to the sorter to put the respective check in an appropriate pocket (e.g., a pocket designated for the financial institution whose identification number is in the MICR line). If the programmed computer determines that the read MICR line is not valid, it may control the sorter to send the respective check to the "reject" pocket. Some reasons why a MICR line might be deemed invalid include: bad print of the magnetic substance to form the MICR symbols (whether the numerals or the designators), misorientation of the check in the sorter, correction tape placed over the MICR line, sorter mishandling, ferrous or magnetic quality to signature ink or other marking made on the check in the MICR line area (e.g., random marks 22 or letters 24 impinging on MICR line 26 illustrated in FIG. 3), and the check having a reject repair strip (a reject repair strip 20 is illustrated in dot-dash lining in FIG. 2; this is adhered to the bottom of the main check body and it has similar MICR encoding to that found in the conventional MICR line 4 on the main check body, as known in the art). In either event (i.e., either a validated read or an invalidated read), the database is updated to include the digital image of the processed check and to include the valid or invalidated information about the check's MICR line.

Valid MICR reads usually occur in the aforementioned automated process; however, even a small percentage of invalidated MICR reads can impose a significant cost. For example, one type of check sorter may process one million items (checks) each day. A reject, or invalidated MICR line read, rate of only 1.5% results in 15,000 rejected items per day for such a sorter. Presently, these rejected items are taken from the reject pocket of the sorter and manually processed by key entry personnel, who manually handle the rejected checks, read the MICR line information, and type the numerical information into the system computer(s) to provide the correct MICR line information. A highly efficient key entry person may be able to manually process five hundred rejected checks per hour; therefore, in this example, manually processing 15,000 checks per day would require thirty hours of personnel time each day if all personnel were able to handle five hundred rejects per hour. Of course with manual entry by humans, there is the possibility of data entry error. Clearly, the manual handling of invalidated MICR line items is time-consuming and expensive. Thus, there is the need for automating the processing of checks which have been deemed to have invalid MICR lines. This includes the need for automatically correcting the invalidated MICR line information in its database. A broader need is to provide for automating character recognition (and preferably correction) of character indicia of predetermined characteristic at predetermined positions as distinguished from other markings referred to as non-character indicia (which may in fact be characters, but not of the same predetermined characteristic).

SUMMARY OF THE INVENTION

The present invention meets the aforementioned needs by providing an automated analysis method and tool for a digitally imaged financial item, such as a check having a MICR line. The present invention provides a computer-implemented method for digitally recognizing a plurality of characters across an area of a digital image containing character indicia at predetermined positions in the area and also containing non-character indicia in the area. The present invention also provides a check processing method and a check sorting system. In the particular context of processing checks which have been previously read and deemed to have an invalid MICR line, the present invention results in reduced manual data entry to correct for invalidated MICR line reads, in faster posting of financial information related to processing the checks, and in reduced errors.

The present invention includes a financial item analysis method comprising digitally applying character recognition processing to an invalidated MICR line in a digital image of a financial item. If the financial item is a check, this method may further comprise processing the check through a check sorter. Such check processing includes sensing the check for a MICR line and characters therein, determining the check has an invalidated MICR line, and creating a digital image of the check. If such check processing is performed, the aforementioned "digitally applying character recognition processing" may be performed after the aforementioned sensing, determining, and creating; however, the method of the present invention can also be used in making a determination about the validity or invalidity of a MICR line. The method can further include changing the digitally stored MICR line data for the financial item (e.g., check) in response to digitally applying character recognition processing to the invalidated MICR line in the digital image of the financial item.

As applied specifically to checks, the present invention can be defined as a check analysis method comprising: digitally processing a digital image of a check to search for a digital image of a MICR line of the check; and digitally changing the orientation of the digital image of the check in response to at least one failure of the digitally processing of the digital image of the check to find a digital image of the MICR line. Another definition as a check analysis method comprises: using a first MICR font template to identify MICR characters across the length of a selected area of the digital image of the check; detecting a position for a MICR character not identified by the first MICR font template relative to at least one MICR character identified by the first MICR font template; and in response to detecting a position for a MICR character not identified by the first MICR font template, using at least a second MICR font template to identify the MICR character in the detected position. The foregoing can be used with regard to financial items in general in the definition of the financial item analysis method recited above.

The present invention can also be defined as a computer-implemented method of analyzing a MICR line in a digital image, comprising: scanning the MICR line in the digital image to identify MICR characters therein; in response to identified characters, determining positions along the MICR line in the digital image where other MICR characters should be; and analyzing each determined position of the MICR line in the digital image to try to identify the respective MICR character at that position. This may further comprise digitally removing horizontal and vertical lines detected in the MICR line and not part of a possible MICR character.

Still another definition of the method of the present invention is as a computer-implemented method for digitally recognizing a plurality of characters across an area of a digital image containing character indicia at predetermined positions in the area and also containing non-character indicia in the area. This definition includes: detecting indicia in the digital image and using a first template on the detected indicia to distinguish at least some character indicia from non-character indicia across the area; in response to the predetermined positions of the character indicia and the character indicia distinguished using the first template, determining positions in the area at which other character indicia should be located but are not distinguished using the first template; and using at least a second template on indicia detected at the determined positions to try to identify character indicia thereat.

The present invention also provides a check processing method comprising: transporting a check through a check sorter; generating electrical signals in response to sensing a MICR line on a check in the check sorter; generating a digital image of the check in the check sorter; determining in a programmed computer whether the electrical signals represent a valid or an invalid MICR line; and in response to determining that the electrical signals represent an invalid MICR line, digitally processing the digital image of the check to identify MICR characters therein. This method can further comprise determining in the programmed computer whether identified MICR characters constitute a valid MICR line, and if so, digitally changing stored MICR line data for the check.

The present invention also provides a check sorting system. This system comprises: a check sorter including a MICR reader and a digital imager for checks transported by the check sorter; a controller connected to the check sorter, the controller including a MICR interpreter responsive to the MICR reader; a database connected to the check sorter to provide a repository for digital images of checks provided from the digital imager; and a digital image analyzer connected to the controller and to the database to analyze by digital processing a check digital image from the database for a check indicated by the MICR interpreter of the controller to have an invalid MICR line.

The present invention also provides analyzer tools, which may be used in the aforementioned system. One definition of such a tool is as a financial item analyzer tool which comprises: means for applying character recognition processing to an invalidated MICR line in a digital image of a financial item; and memory means for containing in digitally encoded form the means for applying such that the means for applying is accessible by a digital computer.

The tool can also be defined as a check analyzer tool comprising: a detector to detect a digital image of a MICR line in a digital image of a check; and an image orienter, responsive to the detector, to change an orientation of the digital image of the check.

The check analyzer tool can also be defined as comprising: a first MICR font template to identify MICR characters;

a missing MICR character position detector responsive to the first MICR font template to detect a position of a missing MICR character relative to at least one MICR character identified by the first MICR font template; and a second MICR font template responsive to the missing MICR character position detector to identify a MICR character in a position detected by the missing MICR character position detector. This tool can further comprise a third MICR font template responsive to the second MICR font template to identify a MICR character in a position detected by the missing MICR character position detector.

Therefore, from the foregoing, it is a general object of the present invention to provide a novel and improved automated analysis method and tool for a digitally imaged financial item, such as a check having a MICR line. It is also a general object of the present invention to provide a computer-implemented method for digitally recognizing a plurality of characters across an area of a digital image containing character indicia at predetermined positions in the area and also containing non-character indicia in the area. It is also a general object of the present invention to provide a check processing method and a check sorting system. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 illustrates a conventional check.

FIG. 2 illustrates a conventional check marked with additional MICR symbols indicating the amount of the check, and the drawing also shows in dot-dash lines a reject repair strip attached to the check.

FIG. 3 illustrates markings into part of a MICR line, which markings may cause an invalidated MICR line read or at least create difficulty in trying to identify MICR characters from a digital image of the item.

FIG. 4 is a block diagram of a preferred embodiment check sorter system of the present invention.

FIG. 5 is a block diagram of a preferred embodiment of the digital image analyzer tool of the system shown in FIG. 4.

FIG. 6 is a block diagram of a preferred embodiment of the means for applying character recognition processing to an invalidated MICR line in a digital image shown in FIG. 5.

DETAILED DESCRIPTION OF THE INVENTION

Figure 7:
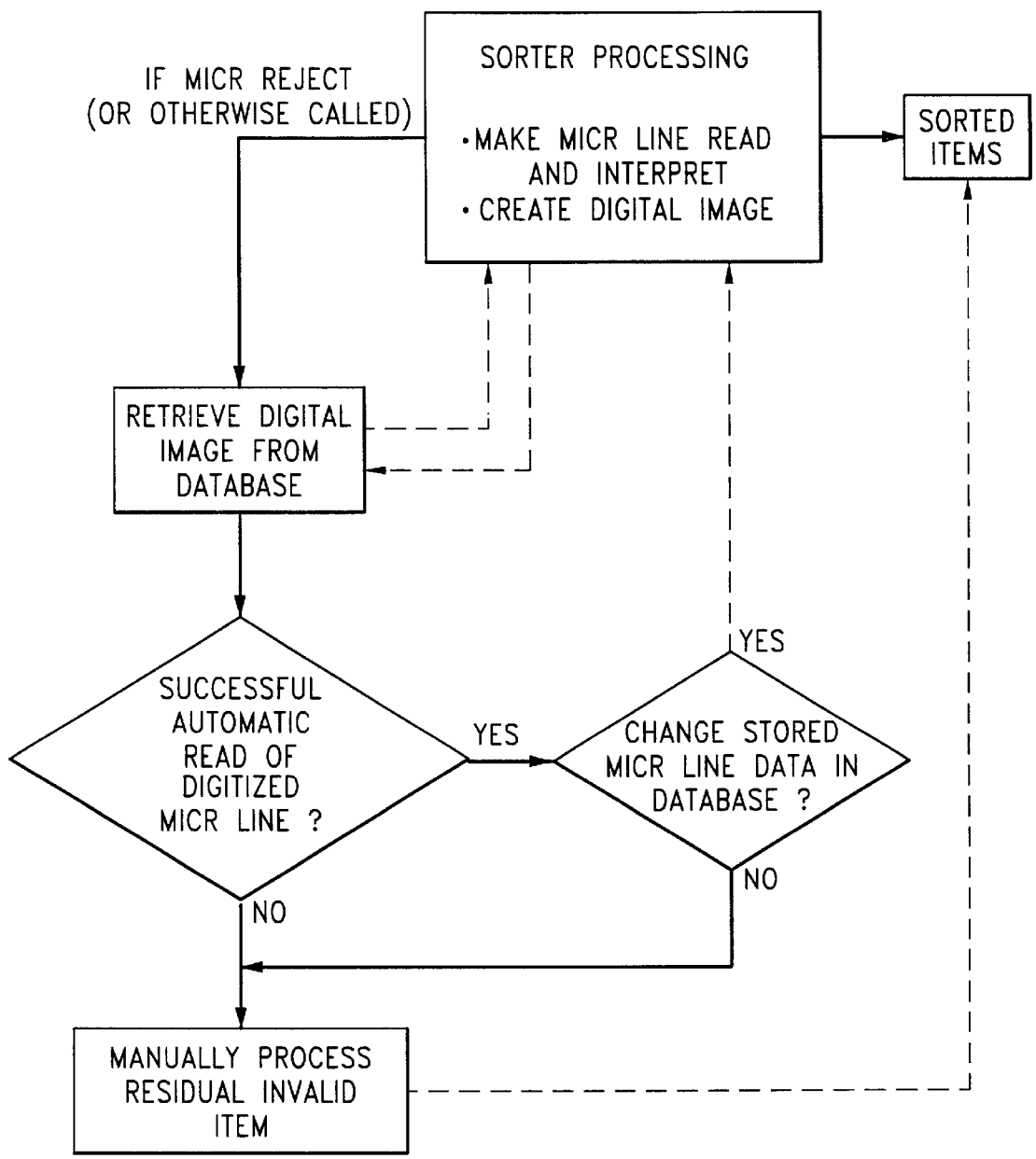
FIG. 7 is a flow diagram of a preferred embodiment of a financial item processing method of the present invention.

The present invention broadly applies to digitally recognizing a plurality of characters across an area of a digital image containing character indicia at predetermined positions in the area and also possibly containing non-character indicia in the area. Character indicia is defined by one or more predetermined characteristics. Examples include characters for machine (e.g., computer) readable forms, such as characters detectable by optical character readers. Applications include, without limitation, test forms, income tax forms, postal items (e.g., addresses thereon), loan applications, etc. The preferred embodiments described below particularly refer to MICR characters, which have known predetermined forms and which are used at known predetermined locations on checks, for example.

One particular application of the digital recognition of the present invention is analyzing a MICR line (i.e., a line of characters in the font and material suitable for Magnetic Ink Character Recognition processing) in a digital image, such as analyzing MICR information on a financial item (e.g., deposit slips, cash tickets, batch tickets, block tickets). A specific example of this is with regard to a check that has undergone a sorting process in which the MICR line of the check has been read and a digital image of the check has been made. It will be in this specific context of check analysis that the preferred embodiments of the present invention will be described; however, broader aspects of the invention are not limited to just this context.

As mentioned in the background above, MICR lines used on checks in the United States are made from the MICR character symbol set including numerals 0 through 9, financial institution designation symbol 6 shown in FIG. 1, individual account number designation symbol 8 shown in FIG. 1, amount designation symbol 10 shown in FIG. 2, and a hyphen (not shown). On the check shown in FIG. 1, the two symbols 6 define the limits of portion 12 of the MICR line 4 within which the nine-digit financial institution identification number in MICR numerals (not shown) is preprinted on the check 2. The symbol 8 delimits to the right (as viewed in FIG. 1) portion 14 of the MICR line 4 within which the nine-digit individual account number in MICR numerals (not shown) is preprinted on the check 2. To the right (as viewed in FIG. 1) of the symbol 8 is portion 16 of the MICR line 4 in which the check number is preprinted in MICR format (not shown). During processing of the check subsequent to it being used by the account holder to draw on the holder's account, the symbols 10 and a ten-digit number in MICR format are printed in portion 18 of MICR line 4 shown in FIG. 2 to indicate the amount of the check (the number shown illustrates certain MICR numeral forms, and it represents a check amount of $525.00). The MICR line 4 is located in the lower one-half inch of conventional check 2.

In conventional check processing, an additional MICR line might be added to the check 2 below the conventional MICR line 4. This is illustrated by the reject repair strip 20 attached to the main check body as illustrated in FIG. 2. One form of this strip is five-eighths inch high; therefore, the MICR line on the strip 20 of this size is within what then becomes the bottom one-half inch of the check with the strip 20.

Another aspect pertinent to the present invention is illustrated in FIG. 3. It was mentioned above that random marks 22 or letters 24 ("non-character" indicia relative to the desired MICR "character" indicia) impinging on MICR line 26 in FIG. 3 might be the cause of an invalidation of the MICR line. Whether this occurs during a MICR read, the markings 22, 24 do at least represent interference in analyzing a digital image for the MICR characters. That is, in a conventional MICR read process, the non-MICR markings might not interfere because the MICR reader senses magnetically; and if the non-MICR marks do not interfere magnetically, they will not likely result in invalidation of the MICR read. In a digital image of the check, however, both the MICR and non-MICR markings are merely digitally encoded pixel information representing lightness/darkness values (white or black in a two-tone scale). Thus, FIG. 3 illustrates one of the difficulties to be overcome in the analysis performed by the present invention; however, the present invention has application even if there are no interfering markings in the analyzed area.

Referring to FIG. 4, there is illustrated a preferred embodiment of a financial item sorting system 50 in accordance with the present invention which is capable of overcoming the aforementioned difficulty regarding character versus non-character recognition if such interference exists. One specific application of the system 50 is as a check sorting system.

The sorting system 50 includes a sorter 52. The sorter 52 includes a MICR reader 54 and a digital imager 56. Items 58 to be processed (e.g., checks) are loaded into an input bin of the sorter 52, and the sorter 52 physically transports each item $58_n$ through the sorter to an output location, referred to as pockets in a particular type of check sorter, from which the items 58 are physically disposed (e.g., bundled and sent to respective financial institutions) as indicated at reference numeral 60 in FIG. 4.

When an item $58_n$ is moved through the sorter 52, the MICR reader 54 senses magnetic characters on the item and generates electrical signals, which are communicated to a controller 62, where the signals may be used to store digitally encoded MICR line data representing MICR characters detected in the MICR line read by the MICR reader 54. Also during this movement of an item 58n, the digital imager 56 generates electrical signals which are communicated to a database 64 in which responsive digitally encoded signals are stored in a computer memory providing a repository of the digital images for all the processed items. Associated (either physically within a common computer or memory thereof, or at least by some identifier linking the two for retrieval when searches of respective encoded MICR line data and encoded digital image databases are made) with the digital images in the database 64 is the information obtained from the MICR reader 54 as communicated to the controller 62. Thus, the act of running a document through a check sorter generates two distinct sets of data; the first is a character representation of the MICR line, and the second is a digital image representation of the entire check.

The controller 62 of the preferred embodiment includes a programmed computer which applies a predetermined set of rules to the MICR line data from the reader 54. Compliance or non-compliance with the rules determines whether the read MICR line is validated or invalidated. Examples of possible rules include: is the bank number valid, does the account number self-check, is the amount exactly ten digits long, is the account number valid. A "flag" bit (or bits) associated with the MICR line data for the respective check may be set or not set to indicate the validation/invalidation determination, or other indicators may be used.

The foregoing components are implemented and function in the preferred embodiment using conventional equipment and in known manner. Examples for the sorter 52 include check sorting equipment manufactured by Banctec Inc. (e.g., E Series transports, TRACE transports), Unisys (e.g., NDP series transports), or IBM (3890 Document Processors). An example for the controller 62 and the database 64 includes known equipment using ImageVision brand software from Advanced Financial Solutions, Inc.

Added to the foregoing in the present invention is a digital image analyzer 66 connected to the controller 62 and to the database 64. Such "connection" can be in any suitable manner (e.g., included in programming of the controller 62 or in separate equipment communicating with the controller 62 and the database 64). In whatever form, the analyzer 66 converts a digital representation of the respective image from the database 64 to a common image format, such as TIFF, JPEG or ABIC, and writes the data to its own database or computer file. The digital image analyzer 66 does this, and then it analyzes the digital image using digital processing. More particularly, the digital image analyzer 66 receives or retrieves from the controller 62 one or more control signals (e.g., the set or not set status of the aforementioned MICR line data flag) informing the analyzer 66 of an at least initially indicated invalidated item passing through the sorter 52; depending on the speed of the sorter 52, for example, this may occur in real time so that the analyzer 66 can take part in the validation/invalidation determination, or it may occur after that determination has been otherwise made (e.g., based on only the input received from the reader 54). When the digital image analyzer 66 is to perform its function, it sends one or more control signals to the database 64 to retrieve the respective digital image for that processed item such as described above. The analyzer 66 then analyzes the resulting digital image and if in doing so the analyzer 66 determines by its own programming that it has found a MICR line in the digital image, the analyzer 66 notifies the controller 62 of this and sends its MICR line data to the controller 62. After receiving this from the analyzer 66, the controller 62 applies its set of rules (in the preferred embodiment, the same rules as were applied to the data from the reader 54) to determine if the MICR line data from the analyzer represents a valid MICR line. If it is a valid MICR line, the controller 62 writes that data to the MICR data record for the respective imaged item to replace the original invalidated data.

A preferred embodiment of the digital image analyzer 66 is represented in FIG. 5. This provides a financial item analyzer tool which itself is inventive as well as being a part of the overall system 50 represented in FIG. 4. This tool includes means 68 for applying character recognition processing to the retrieved digital image of the item. This preferably includes, for the check or other MICR character containing item of the illustrative context, means for distinguishing MICR characters from a combination of the MICR characters and interfering marks (e.g., the interfering marks illustrated in FIG. 3), if any. A particular implementation of the means 68 includes a machine useable form of the computer programs appended hereto.

FIG. 5 shows that the means 68 is in memory means 72 for containing in digitally encoded form the means for applying such that the means is accessible by a digital computer, such as the computer implementing the controller 62. The memory means 72 can be implemented in any suitable manner. One example is in a memory of the one or more computers in which the controller 62, the database 64 and the digital image analyzer 66 may be implemented. Another example is as a portable memory device (e.g., a diskette) by which the means for applying can be physically transferred from one location to another. Another example of a suitable memory is a suitable storage device or system permitting remote access from a storage or retrieval facility, such as via the Internet or other telecommunications link.

A preferred embodiment of the means 68 represented in FIG. 5 is shown in FIG. 6. This embodiment is as a means for applying character recognition processing to an invalidated (or potentially invalidated if the means is operating in real time in conjunction with the controller 62 to make that determination) MICR line in the digital image, and it includes a detector 74 to detect a digital image of a MICR line in the retrieved digital image for the respective item under analysis. The means 68 further includes in the preferred embodiment an image orienter 76 which changes an orientation of the digital image if the detector 74 is unable to detect a digital image of the MICR line in at least the initial orientation of the digital image. The detector 74 and the orienter 76 are implemented using computer programming code (see appended program for a particular implementation) that controls the computer with which it is used to find a MICR line in the converted retrieved digital image used by the analyzer 66.

This implementation of the detector 74 looks at the bottom one-half inch of the item (via the retrieved digital image thereof) and the MICR recognition process commences. If results are good, then the detector 74 has found the MICR line in the digital image. If not, the orienter 76 part of the program causes the upper one-half inch of the image to be rotated, and then it is searched as described above by the detector 74. If no suitable result is obtained, the orienter 76 causes the back of the document image to be searched by the detector 74, first in the low one-half inch, then the top one-half inch if needed. Once a MICR line is found, a high scan is performed five-eighth inch above the identified line; if another MICR line is found here, the item is deemed to be a "stripped" item (e.g., such as in FIG. 2 with strip 20 included), or enclosed in a document carrier having an integral strip, which is similar to the strip shown in FIG. 2. If a change in image orientation is required to find the MICR line, the means 68 of the preferred embodiment may set a "flag" in a header of the image to indicate proper orientation (normal, upside-down, backwards, backwards and upside-down). The image itself is not changed.

The detector 74 of the preferred embodiment includes at least a first MICR font template 78 which works with the area of the item under review (e.g., the respective one of the aforementioned one-half inch high areas in which the MICR line is considered to exist in a check). The first MICR font template 78 is used to identify MICR characters across the length of the selected area of the digital image. For this processing, the preferred embodiment of the detector 74 also includes a "missing" MICR character position detector 80. If the first MICR font template 78 is unable to identify each MICR character at all the possible positions for such characters in the MICR line, the position detector 80 detects the positions of those missing MICR characters relative to at least one MICR character identified by the first MICR font template 78. Further in this preferred embodiment, the detector 74 includes at least a second MICR font template 82 which responds to the missing MICR character position detector 80 by trying to identify a MICR character in a position detected by the detector 80. In the preferred embodiment of FIG. 6, a third MICR font template 84 is used to try to identify a MICR character in a position detected by the detector 80 if the second MICR font template 82 is unable to do so. Particular implementations of software for implementing these are included in the appended programs.

In performing the method of the present invention by using the sorting system 50 of FIGS. 4–6, the items 58 are processed through the sorter 52 in conventional manner, namely, sensing the item for a MICR line and characters therein and creating a digital image of the processed item 58$_n$ as indicated in FIG. 7. The foregoing occur while physically moving or transporting the item through the sorter 52. Respective electrical signals referred to above are generated and communicated to the controller 62 and the database 64, respectively. The programmed computer implementing the controller 62 determines in known manner whether the electrical signals from the MICR reader 54 represent a valid or an invalid MICR line (this may or may not occur in conjunction with use of the analyzer 66 as referred to above). If the method of the present invention is called upon because of the controller 62 determining that there is an invalid MICR line, the method includes digitally applying character recognition processing to the invalidated MICR line in the digital image of the processed item. Physical items 58 are sorted in known manner at the output of the sorter process as also indicated in FIG. 7.

As further indicated in FIG. 7, if an item is rejected due to the interpretation by the controller 62 that the MICR line is invalid, the method of the present invention continues as shown in FIG. 7. This includes retrieving the respective digital image from the database 64 and converting it to a useable form (if not already in such form) as described above. Preferably such form includes at least a 200 dots per inch (DPI) image in a suitable format, such as TIFF, JPEG or ABIC; any suitable microcomputer system, such as the current Pentium based systems running Windows NT, may be used in implementing or performing this. Such computer programmed in accordance with the present invention (e.g., with the appended programs) reads the digital image off of its hard disk, decompresses the image in memory, and tries to read the MICR line, possibly reading all four areas of the document (front bottom, front top, back bottom, back top) as described above and further explained below.

Once the digital image has been retrieved from the database, an automatic read is made of the selected area(s) as indicated in FIG. 7. This will be further described below with reference to FIGS. 8 and 9; however, if such automatic read is successful, the controller 62 is notified and it determines whether the successful read constitutes a valid MICR line (of course, this can be performed in the analyzer 66 or elsewhere, the main function being that an automated determination is made as to whether there is now valid MICR line data). If, on the other hand, the automatic read is not successful, or there is a successful read but it does not constitute a valid MICR line, that item remains invalidated and is left for subsequent processing, such as in FIG. 7 by manually processing as a residual invalid item in the same manner as invalidated items have heretofore been manually processed as described in the background portion of this specification. Although some residual invalid items may remain after use of the method or system of the present invention, any such residual invalid items should be significantly fewer than there were initial invalidated items processed by the present invention, whereby the aforementioned advantages of the invention are obtained.

Figure 8:
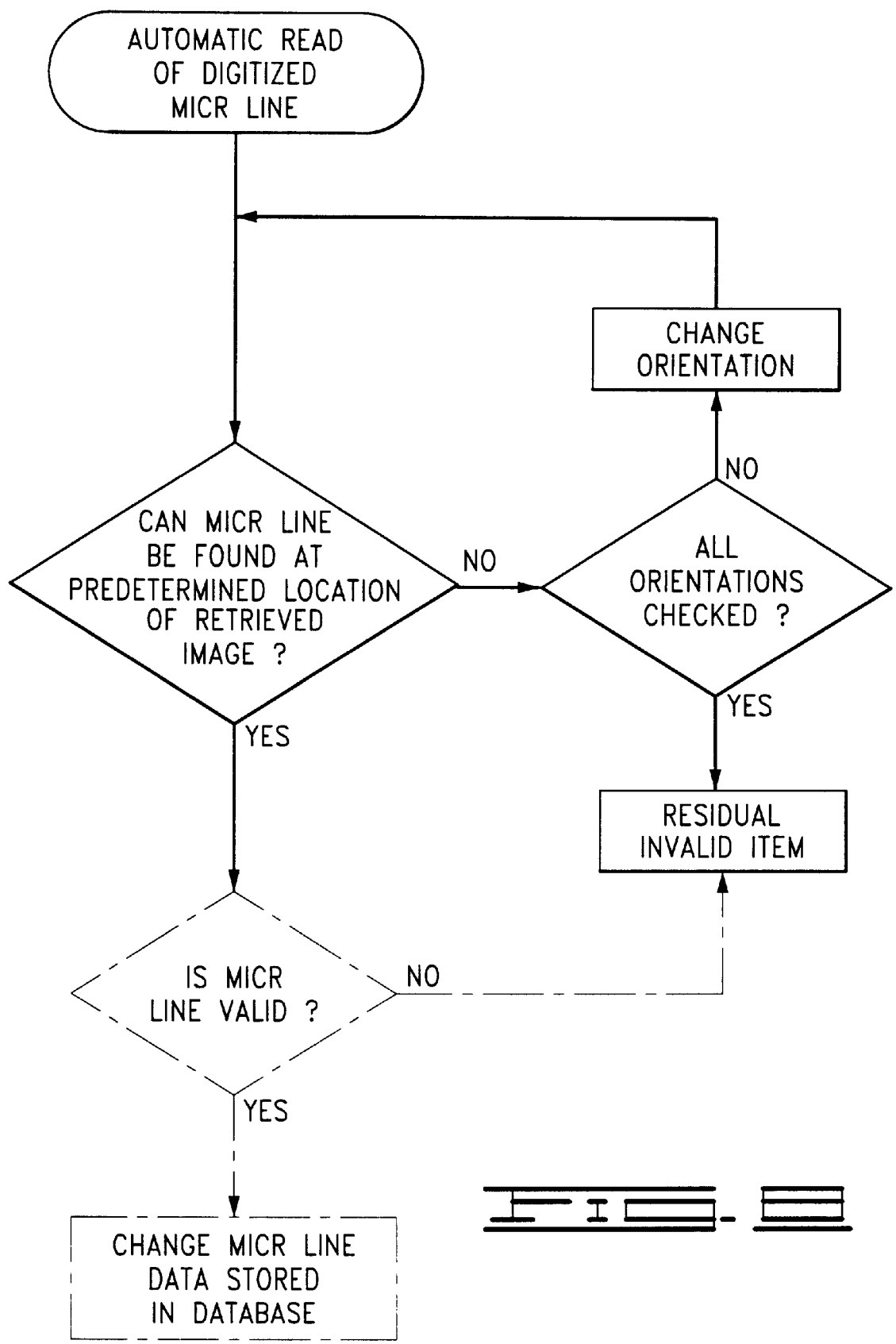
FIG. 8 is a flow diagram of a preferred embodiment of an automatic financial item analysis method of the present invention, which also forms part of the method represented in FIG. 7.

Referring to FIG. 8, the automatic reading to find or detect the digital image of the MICR line of the invalidated item, in the preferred embodiment of this illustration, uses the financial item analysis method of the present invention. This includes digitally applying character recognition processing to the respective digital image of the financial item, and preferably to the invalidated MICR line in the illustrative context being referred to. This more specifically includes digitally processing such digital image of the item to identify MICR characters and thereby to find a digital image of the MICR line in the digital image of the item. Thus, the first indicated decision of the preferred embodiment in FIG. 8 determines whether the MICR line can be found at a predetermined location of the retrieved image. If it cannot be found, the method continues as shown in FIG. 8 by determining whether all orientations of the digital image have been checked. If they have not, the orientation is changed by digital processing and the reoriented digital image is checked to see if the MICR line can then be found. If all the orientations have been checked in the manner described in more detail above and still the MICR line cannot be found, the method of the present invention concludes that the invalidated item remains a residual invalid item as indicated in FIG. 8.

If the foregoing results in MICR characters being identified, the automatic read method illustrated in FIG. 8 then determines whether that constitutes a MICR line. This is determined by the method's own parameters for defining what constitutes a MICR line (e.g., some minimum number of MICR characters being identified). If what has been read is not deemed a MICR line, the item becomes a residual invalid item. If the MICR line is deemed to have been read, one or more signals are generated for notifying the controller 62 (for the illustrated embodiment) and the digitally encoded MICR line data is analyzed to determine whether it constitutes a valid MICR line. As referred to above, in the illustrated embodiment this is performed in the controller 62 using the controller's known predetermined rules for validating MICR reads; however, such determination can be made in any other suitable manner. A preferred embodiment regarding whether the MICR line can be read, such as using the analyzer 66, will be. described with reference to FIGS. 9–11.

Figure 9:
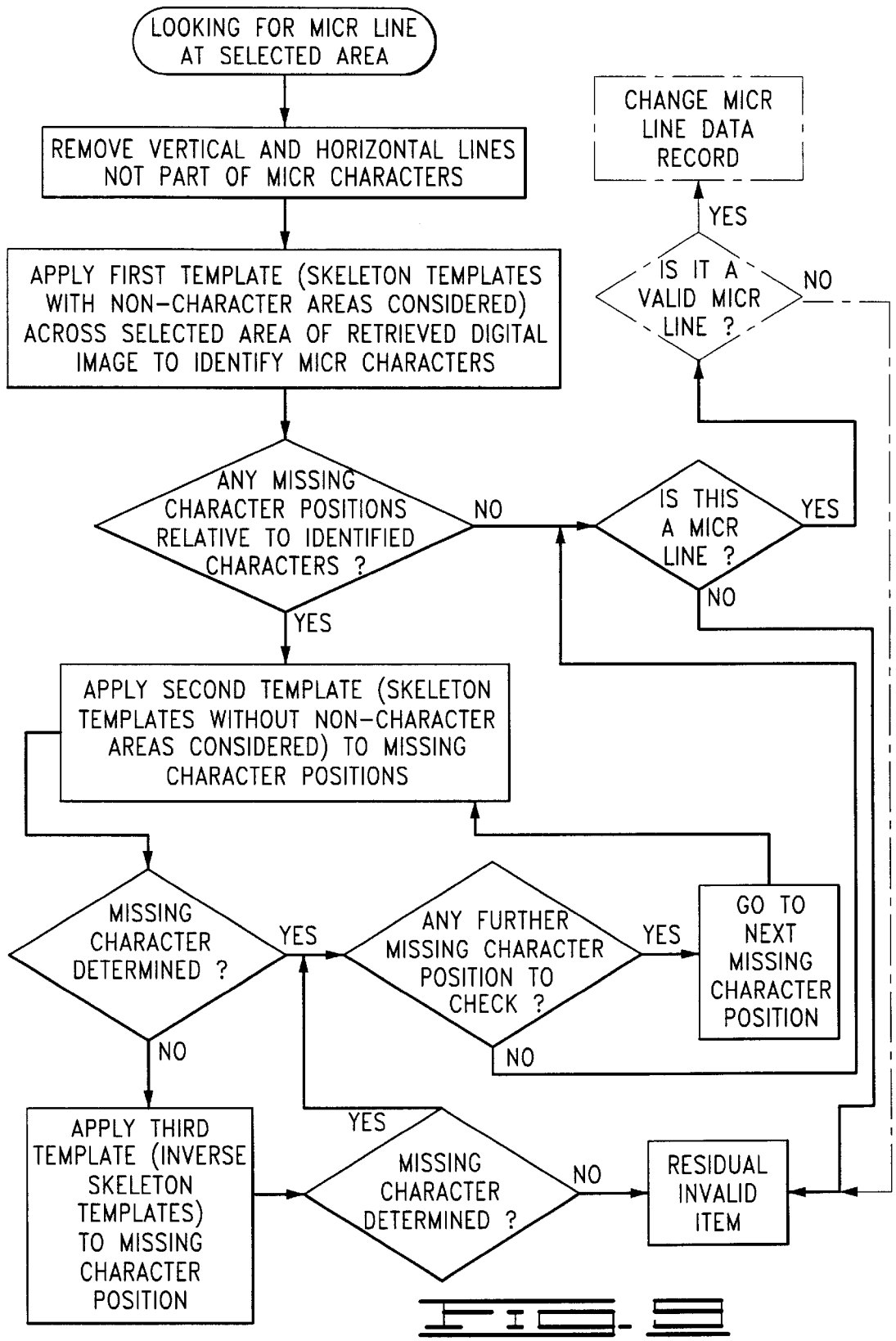
FIG. 9 is a flow diagram of a particular implementation of an automatic financial item analysis method of the present invention, which may be used with regard to whether the MICR line can be read in the method represented in FIG. 8.

A preferred embodiment of the method for finding or detecting a MICR line in accordance with the present invention is represented in FIG. 9. In the preferred embodiment, vertical and horizontal lines not part of MICR characters are removed. These are digitally removed by digitally distinguishing non-character indicia representing horizontal and vertical lines detected in the area of the digital image. This can be done by a number of means, but one particular implementation simply scans in two directions looking for connected black pixels. First, horizontal scans are performed for the entire length of the check within the selected search area, and any consecutive black pixels that exceed one-fourth inch in length are removed from the image (by setting their values to an invalid value). Then, vertical scans are performed in the same fashion, and any connected pixels that exceed one-fifth inch long are removed from the image (by setting their values to an invalid value). In the specific implementation using the appended programs, white pixels are represented by zeroes, black pixels by ones, and removed lines by twos. The character search will not allow a "two" to be a valid internal pixel for a MICR character.

Figure 10:
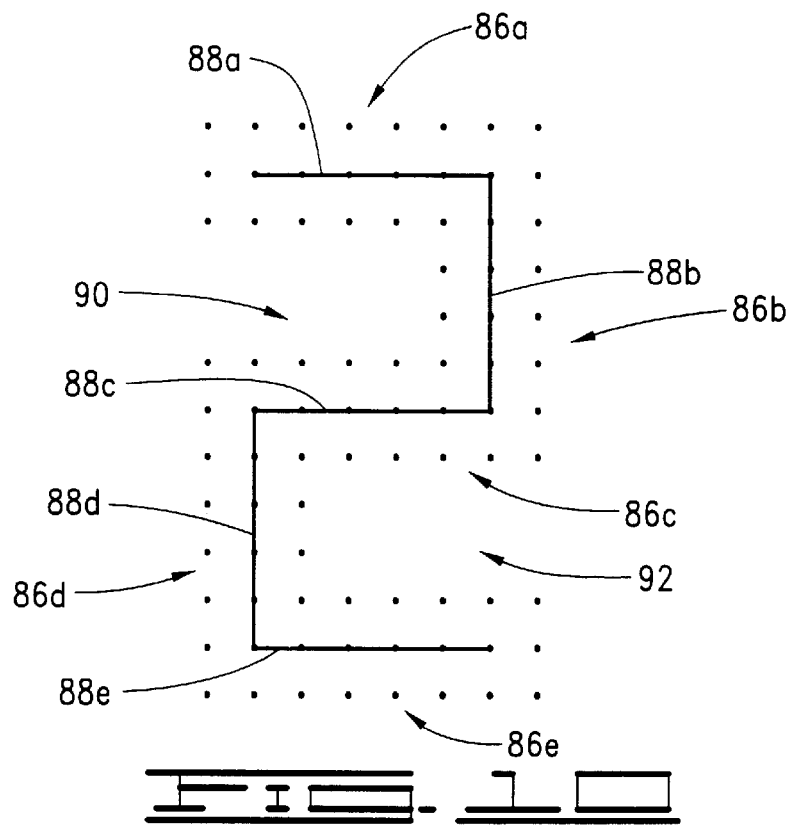
FIG. 10 illustrates a simplified version of the MICR numeral "2" and one embodiment of a skeleton template for the numeral.
Figure 11:
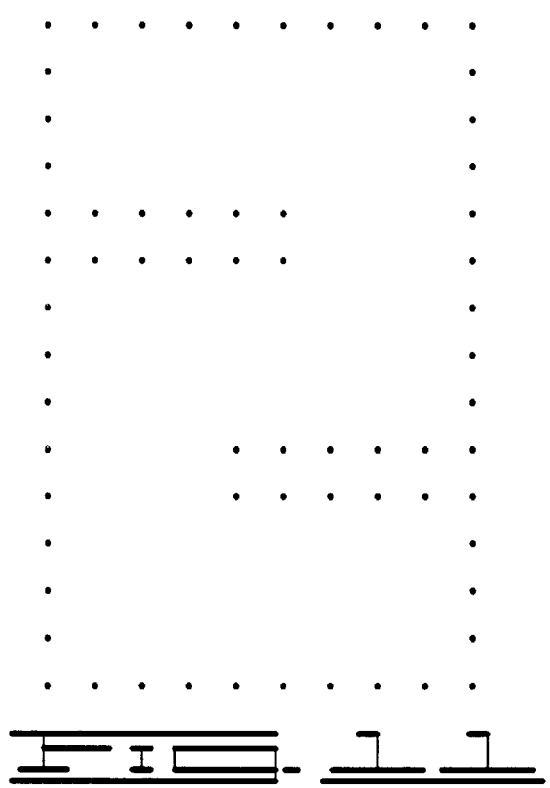
FIG. 11 illustrates a simplified version of one embodiment of a template for the inverse of the template represented in FIG. 10.

Once vertical and horizontal lines have been removed, a first MICR font template is used to identify MICR characters across the length of the selected area being searched for the MICR line. In a particular implementation, respective skeleton templates for the possible MICR characters are used. The method scans the MICR area from left to right and top to bottom looking for black pixels having at least five neighboring black pixels. These are deemed "good" pixels because being in such a neighborhood of other black pixels and located within the template skeleton region, they could be a MICR character. The number of these "good" pixels are added and from that there is subtracted "bad" black. pixels detected in regions of the character font template which should be "white" or empty pixels. If the sum of the "good" pixels minus the "bad" pixels exceeds a threshold, then the method considers that the respective MICR character has been identified. An example of a skeleton template for the MICR character "2" is illustrated in FIG. 10 in a simplified manner in which the MICR character is represented by three-pixel wide lines 86a–86e. The skeleton of the template includes the pixels shown connected by solid lines 88a–88e in FIG. 10. "Bad" pixels would be any black pixels detected in the blank areas 90, 92 shown in FIG. 10. Once a pixel is found to be contained in a five-pixel neighborhood, the top left of a respective character skeleton template is effectively overlaid on the image at that point, and the matching pixels that are black are counted, and the pixels that are "bad," or not supposed to be black, are subtracted from the total. If one skeleton template does not "fit," another one is tried and so on until one of these skeleton templates fits or these skeleton templates for all the MICR characters have been tried.

Continuing in FIG. 9, the method next determines whether there are any "missing" character positions between characters which have been identified in response to using the first MICR font template. That is, since a MICR line has a predetermined format (such as illustrated in FIGS. 1 and 2) and if the first template (i.e., any one of the first-used skeleton templates using "good" and "bad" pixels) is able to identify at least one of the characters. in this line, other positions relative to the identified character(s) can be determined where MICR characters should be but presently are "missing" because they were not detected by the first MICR font template. For example, consecutive MICR characters, such as those found in the amount field 18 encoding, are spaced exactly 0.12 inch apart. As a result of the first template pass, certain characters are identified and their positions noted. From these known positions, areas spaced 0.12 inch to the right or left are searched for a density of black pixels (at 200 DPI, 90 black pixels is a good number to search for, for example). If the number of pixels set in this area exceeds this value, then a possible "missing" character has been found, and a relaxed template searching algorithm commences (see below with regard to a second and possibly a third template). In this fashion, the image is "self-segmented" into character regions after the entire selected area was first scanned using the first template. If a character is identified next to a known good character, the process repeats itself with this new position as a reference until either a blank area or another known character is identified.

If there are no missing character positions between determined characters, all characters presumably have been read; and the method determines if those characters define a MICR line. If not, the item is a residual invalid item. If it is determined to be a MICR line, then a determination is made as to whether it is a valid MICR line. The foregoing are performed as described above.

If there are missing character positions between determined characters, the method illustrated in FIG. 9 applies a second MICR font template to identify the MICR character in the detected position. In the particular implementation represented in FIG. 9, the same skeleton templates as referred to above with regard to the first MICR font template are applied except in a "relaxed" manner wherein there is no subtraction made for "bad" pixels (i.e., the non-character areas, such as areas 90 and 92 in FIG. 10, are not considered). If the sum of the "good" pixels exceeds a predetermined threshold, the missing character is thereby identified by the respective character represented by that respective skeleton template. In the first template application in this implementation, the sum of the good minus the bad must be greater than 96 percent of a possible "perfect" score, which would consist of every possible black pixel being set and no "bad" pixels being set (black). When the "relaxed" version of the template is attempted, simply 87 percent of the black pixels must be set, with no regard for possible "bad" pixels. Since this template search is restricted to a small area where a possible character may be by prior black pixel density detection, the error rate for this procedure is made effectively small.

If the use of the second MICR font template does not successfully identify a character at respective position, a third MICR font template is applied in the particular implementation of FIG. 9. This is an inverse skeleton which is the inverse of the skeleton templates used in the first and second MICR font templates (see FIG. 11 as an example of such inverse for the illustration of FIG. 10, wherein the originally "white" dots become "black" and the originally "black" dots become "white" and with a rectangular border of "black" dots around it). The inverse template requires all the identified "black" pixels in a region to fit "inside" the template, and any pixels that are not supposed to be black are discounted. In the specific implementation of the appended programs, only two pixels are allowed to be black that should not be. This method is particularly useful for identifying "broken" characters where parts of the character are missing, and would cause the prior two template processes to fail.

If the missing character is still not determined, the item becomes, in this embodiment of the method, a residual invalid item as indicated in FIG. 9. If the missing character is determined by either the second MICR font template or the third MICR font template, the method checks to see if there is any further missing character position to check. If not, all the characters presumably have been identified and the data validation steps represented in FIG. 9 are performed. If there are further missing characters, the method goes to the next position and repeats the use of the second and third MICR font templates as needed and as indicated in FIG. 9.

If the result of the foregoing is that a valid MICR line has been found, the encoded MICR line data for the item being analyzed is digitally modified in the appropriate database by writing the data from the aforementioned character detection process into the appropriate storage locations in the database, whereby the MICR line data file contains all the correct, identified MICR characters. With regard to the digital image of the item, it is not changed, but simply an orientation identifier is altered if reorienting was required to find the MICR line in the image. For example, using the TIFF image format, there is an image "orientation" tag. This is simply altered to indicate the proper orientation of the image. Any software displaying this image would look at the "orientation" tag and rotate the image to the proper format before display.

The method of the present invention can be more broadly stated as a computer-implemented method of analyzing a MICR line in a digital image. This method comprises scanning the MICR line in the digital image to identify MICR characters therein; in response to identified characters, determining positions along the MICR line in the digital image where other MICR characters should be; and analyzing each determined position of the MICR line in the digital image to try to identify the respective MICR character at that position. A preferred embodiment of this method uses the aforementioned steps shown in FIG. 9.

Another definition of the present invention as supported by the foregoing disclosure is as a computer-implemented method for digitally recognizing a plurality of characters across an area of a digital image containing character indicia at predetermined positions in the area and also containing non-character indicia in the area. This method comprises detecting indicia in the digital image (e.g., the black pixels) and using a first template on the detected indicia to distinguish at least some character indicia from non-character indicia across the area. This method also includes, in response to the predetermined positions of the character indicia and the character indicia distinguished using the first template, determining positions in the area at which other character indicia should be located but are not distinguished using the first template. This method further comprises using at least a second template on indicia detected at the determined positions to try to identify character indicia thereat. This can further comprise digitally distinguishing non-character indicia representing horizontal and vertical lines detected in the area of the digital image.

Thus, the preferred embodiments of the analysis method and tool of the present invention apply character recognition processing first to the entire area under analysis to determine at least one of the predetermined characters. With this determination, the method then self-segments by identifying individual positions where other characters should be located given the predetermined format for the area under examination and the previously determined character(s). At each such position, at least one other analysis is made to determine whether the character can be identified. If all such characters can be identified with regard to an invalidated-MICR-line check, for example, the invalidated check becomes a validated one and stored MICR line data for the check can be repaired by digitally inserting the respective characters in the respective positions of the stored data. This automated process can greatly reduce manual processing heretofore required in trying to validate checks which have been automatically processed and determined to be invalid.

In the appended program listings, "micrread.cpp" is C++ source code used in a specific implementation of the invention as a programmer's toolkit module and "micrfont.h" is the C++ representation of a particular implementation of the template skeletons and the inverse templates for both a 200 DPI and a 240 DPI implementation.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

```
// MicrRead.cpp: implementation of the CMicrRead class.
//
//////////////////////////////////////////////////////////////////////
#include "stdafx.h"
#include "MicrRead.h"
#include "Image.h"
#include "micrfont.h"
#include "Tiff.h"
#ifdef _DEBUG
#undef THIS_FILE
```

-continued

```
static char THIS_FILE[ ]=_FILE_;
#define new DEBUG_NEW
#endif
#define STRIP_HEIGHT_200          95
#define BOTTOM_HEIGHT_200         10
#define ZIPSTRIP_OFFSET_200       128
#define STRIP_HEIGHT_240          110
#define BOTTOM_HEIGHT_240         12
#define ZIPSTRIP_OFFSET_240       154
#define MAX_ALLOWABLE_READS       100
#ifndef MICRDUMMY
static DWORD dwLow [ ] = {
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x00000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101,
            0x00000000, 0x01000000, 0x00010000, 0x01010000,
0x00000100, 0x01000100, 0x00010100, 0x01010100,
            0x00000001, 0x01000001, 0x00010001, 0x01010001,
0x00000101, 0x01000101, 0x00010101, 0x01010101};
static DWORD dwHigh [ ] = {
            0x00000000, 0x00000000, 0x00000000, 0x00000000,
0x00000000, 0x00000000, 0x00000000, 0x00000000,
```

-continued

```
                       0x00000000, 0x00000000, 0x00000000, 0x00000000,
0x00000000, 0x00000000, 0x00000000, 0x00000000,
                       0x01000000, 0x01000000, 0x01000000, 0x01000000,
0x01000000, 0x01000000, 0x01000000, 0x01000000,
                       0x01000000, 0x01000000, 0x01000000, 0x01000000,
0x01000000, 0x01000000, 0x01000000, 0x01000000,
                       0x00010000, 0x00010000, 0x00010000, 0x00010000,
0x00010000, 0x00010000, 0x00010000, 0x00010000,
                       0x00010000, 0x00010000, 0x00010000, 0x00010000,
0x00010000, 0x00010000, 0x00010000, 0x00010000,
                       0x01010000, 0x01010000, 0x01010000, 0x01010000,
0x01010000, 0x01010000, 0x01010000, 0x01010000,
                       0x01010000, 0x01010000, 0x01010000, 0x01010000,
0x01010000, 0x01010000, 0x01010000, 0x01010000,
                       0x00000100, 0x00000100, 0x00000100, 0x00000100,
0x00000100, 0x00000100, 0x00000100, 0x00000100,
                       0x00000100, 0x00000100, 0x00000100, 0x00000100,
0x00000100, 0x00000100, 0x00000100, 0x00000100,
                       0x01000100, 0x01000100, 0x01000100, 0x01000100,
0x01000100, 0x01000100, 0x01000100, 0x01000100,
                       0x01000100, 0x01000100, 0x01000100, 0x01000100,
0x01000100, 0x01000100, 0x01000100, 0x01000100,
                       0x00010100, 0x00010100, 0x00010100, 0x00010100,
0x00010100, 0x00010100, 0x00010100, 0x00010100,
                       0x00010100, 0x00010100, 0x00010100, 0x00010100,
0x00010100, 0x00010100, 0x00010100, 0x00010100,
                       0x01010100, 0x01010100, 0x01010100, 0x01010100,
0x01010100, 0x01010100, 0x01010100, 0x01010100,
                       0x01010100, 0x01010100, 0x01010100, 0x01010100,
0x01010100, 0x01010100, 0x01010100, 0x01010100,
                       0x00000001, 0x00000001, 0x00000001, 0x00000001,
0x00000001, 0x00000001, 0x00000001, 0x00000001,
                       0x00000001, 0x00000001, 0x00000001, 0x00000001,
0x00000001, 0x00000001, 0x00000001, 0x00000001,
                       0x01000001, 0x01000001, 0x01000001, 0x01000001,
0x01000001, 0x01000001, 0x01000001, 0x01000001,
                       0x01000001, 0x01000001, 0x01000001, 0x01000001,
0x01000001, 0x01000001, 0x01000001, 0x01000001,
                       0x00010001, 0x00010001, 0x00010001, 0x00010001,
0x00010001, 0x00010001, 0x00010001, 0x00010001,
                       0x00010001, 0x00010001, 0x00010001, 0x00010001,
0x00010001, 0x00010001, 0x00010001, 0x00010001,
                       0x01010001, 0x01010001, 0x01010001, 0x01010001,
0x01010001, 0x01010001, 0x01010001, 0x01010001,
                       0x01010001, 0x01010001, 0x01010001, 0x01010001,
0x01010001, 0x01010001, 0x01010001, 0x01010001,
                       0x00000101, 0x00000101, 0x00000101, 0x00000101,
0x00000101, 0x00000101, 0x00000101, 0x00000101,
                       0x00000101, 0x00000101, 0x00000101, 0x00000101,
0x00000101, 0x00000101, 0x00000101, 0x00000101,
                       0x01000101, 0x01000101, 0x01000101, 0x01000101,
0x01000101, 0x01000101, 0x01000101, 0x01000101,
                       0x01000101, 0x01000101, 0x01000101, 0x01000101,
0x01000101, 0x01000101, 0x01000101, 0x01000101,
                       0x00010101, 0x00010101, 0x00010101, 0x00010101,
0x00010101, 0x00010101, 0x00010101, 0x00010101,
                       0x00010101, 0x00010101, 0x00010101, 0x00010101,
0x00010101, 0x00010101, 0x00010101, 0x00010101,
                       0x01010101, 0x01010101, 0x01010101, 0x01010101,
0x01010101, 0x01010101, 0x01010101, 0x01010101,
                       0x01010101, 0x01010101, 0x01010101, 0x01010101,
0x01010101, 0x01010101, 0x01010101, 0x01010101};
#endif
///////////////////////////////////////////////////////////
// Construction/Destruction
///////////////////////////////////////////////////////////
CMicrRead::CMicrRead( )
{
#ifndef MICRDUMMY
    m__pbUncompressed = new BYTE [512000];
    m__pbBytes        = new BYTE [500000];
    m__pbRecord       = new BYTE [32768];
    m__fp             = (FILE *) NULL;
    InitializeThresholds (95);
#endif
}
CMicrRead::~CMicrRead( )
{
#ifndef MICRDUMMY
```

-continued

```
    delete [ ] m_pbRecord;
    delete [ ] m_pbBytes;
    delete [ ] m_pbUncompressed;
#endif
}
int CMicrRead::MicrRead (PVOID pImageFront, ULONG ulFrontWidth, ULONG
ulFrontHeight, ULONG ulFrontResolution, ULONG ulFrontOrientation,
                                    PVOID pImageBack, ULONG ulBackWidth,
ULONG ulBackHeight, ULONG ulBackResolution, ULONG ulBackOrientation,
                                    BOOL fReadLow,
                                    BOOL fReadHigh,
                                    BOOL fDebug)
{
#ifdef MICRDUMMY
    m_strMICR . Empty ( );
    m_strHigh . Empty ( );
    return –1000;
#else
    int                     iStripHeight,
                            iBottomHeight,
                            iZipStripOffset,
                                iLineOffset,
                                iResult;
    m_strMICR . Empty ( );
    m_strHigh . Empty ( );
    if (pImageFront == NULL)
        return –1;
    if (!fReadLow && !fReadHigh)
        return –1;
    if (ulFrontResolution != 200 && ulFrontResolution != 240)
        return –1;
    if (ulFrontResolution == 200)
        {
        iStripHeight    = STRIP_HEIGHT_200;
        iBottomHeight = BOTTOM_HEIGHT_200;
        iZipStripOffset = ZIPSTRIP_OFFSET_200;
            if (fReadHigh && !fReadLow)
                iLineOffset = ZIPSTRIP_OFFSET_200;
            else
                iLineOffset = 0;
        }
    else
        {
        iStripHeight    STRIP_HEIGHT_240;
        iBottomHeight = BOTTOM_HEIGHT_240;
        iZipStripOffset = ZIPSTRIP_OFFSET_240;
            if (fReadHigh && !fReadLow)
                iLineOffset = ZIPSTRIP_OFFSET_240;
            else
                iLineOffset = 0;
        }
    if (G4toBmp (ulFrontWidth,
                ulFrontHeight,
                (PBYTE) pImageFront,
                m_pbUncompressed,
                0,
                1,
                0) != 0)
            return –1;
    if (ulFrontOrientation == 0)
            BitsToBytes (m_pbBytes, m_pbUncompressed + (ulFrontHeight –
(iStripHeight + iBottomHeight + iLineOffset)) * ((ulFrontWidth + 7) / 8),
(ulFrontWidth + 7) / 8, (ulFrontWidth + 7) / 8, ulFrontWidth, iStripHeight);
    else
        {
            BitsToBytes (m_pbBytes, m_pbUncompressed + (iBottomHeight +
iLineOffset) * ((ulFrontWidth + 7) / 8), (ulFrontWidth + 7) / 8, (ulFrontWidth +
7) / 8, ulFrontWidth, iStripHeight);
            FlipBuffer (ulFrontWidth, iStripHeight);
            {
    RemoveLongLines (ulFrontWidth, iStirpHeight, ulFrontResolution);
    if (fDebug)
            m_fp = fopen ("\\VISION\\MICRREAD.TXT", "w");
    DWORD dwStart = GetTickCount ( );
    iResult = ReadStrip (ulFrontWidth, iStripHeight, m_strMICR,
ulFrontResolution);
    TRACE1 ("Elapsed time is %d\n", GetTickCount ( ) – dwStart);
    if (iResult != 0)
            {
```

-continued

```
            if (ulFrontOrientation == 0)
                {
                BitsToBytes (m_pbBytes, m_pbUncompressed + iBottomheight *
((ulFrontWidth + 7) / 8), (ulFrontWidth + 7) / 8, (ulFrontWidth + 7) / 8,
ulFrontWidth, iStripHeight);
                FlipBuffer (ulFrontWidth, iStripHeight);
                }
            else
                BitsToBytes (m_pbBytes, m_pbUncompressed + (ulFrontHeight −
(iStripHeight + iBottomHeight)) * ((ulFrontWidth + 7) / 8), (ulFrontWidth + 7) /
8, (ulFrontWidth + 7) / 8, ulFrontWidth, iStripHeight);
            RemoveLongLines (ulFrontWidth, iStripHeight, ulFrontResolution);
            iResult = ReadStrip (ulFrontWidth, iStripHeight, m_strMICR,
ulFrontResolution);
            if (iResult != 0)
                {
                if (pImageBack == NULL || (ulBackResolution != 200 &&
ulBackResolution != 240))
                    {
                    if (fDebug)
                        {
                        fclose (m_fp);
                        m_fp = (FILE *) NULL;
                        }
                    return −1;
                    }
                if (ulBackResolution == 200)
                    {
                    iStripHeight    = STRIP_HEIGHT_200;
                    iBottomHeight   = BOTTOM_HEIGHT_200;
                    iZipStripOffset = ZIPSTRIP_OFFSET_200;
                    if (fReadHigh && !fReadLow)
                        iLineOffset = ZIPSTRIP_OFFSET_200;
                    else
                        iLineOffset = 0;
                    }
                else
                    {
                    iStripHeight    = STRIP_HEIGHT_240;
                    iBottomHeight   = BOTTOM_HEIGHT_240;
                    iZipStripOffset = ZIPSTRIP_OFFSET_240;
                    if (fReadHigh && !fReadLow)
                        iLineOffset = ZIPSTRIP_OFFSET_240;
                    else
                        iLineOffset = 0;
                    }
                if (G4toBmp (ulBackWidth,
                             ulBackHeight,
                             (PBYTE) pImageBack,
                             m_pbUncompressed,
                             0,
                             1,
                                 0) != 0)
                    {
                    if (fDebug)
                        {
                        fclose (m_fp);
                        m_fp = (FILE *) NULL;
                        }
                    return −1;
                    }
                BitsToBytes (m_pbBytes, m_pbUncompressed + (ulBackHeight −
(iStripHeight + iBottomHeight + iLineOffset)) * ((ulBackWidth + 7) / 8),
(ulBackWidth + 7) / 8, (ulBackWidth + 7) / 8, ulBackWidth, iStripHeight);
                RemoveLongLines (ulBackWidth, iStripHeight, ulBackResolution);
                iResult = ReadStrip (ulBackWidth, iStripHeight, m_strMICR,
ulBackResolution);
                if (iResult != 0)
                    {
                    BitsToBytes (m_pbBytes, m_pbUncompressed +
(iBottomHeight + iLineOffset) * ((ulBackWidth + 7) / 8, (ulBackWidth + 7) / 8,
(ulBackWidth + 7) / 8, ulBackWidth, iStripHeight);
                    FlipBuffer (ulBackWidth, iStripHeight);
                    RemoveLongLines (ulBackWidth, iStripHeight,
ulBackResolution);
                    iResult = ReadStrip (ulBackWidth, iStripHeight,
m_strMICR, ulBackResolution);
                    if (iResult != 0)
                        {
```

```
                    if (fDebug)
                    {
                        fclose (m_fp);
                        m_fp = (FILE *) NULL;
                    }
                    return -1;
                }
                else
                {
                    if (fDebug)
                        DumpBuffer (ulBackWidth, iStripHeight);
                    if (fReadLow && fReadHigh)
                    {
                        BitsToBytes (m_pbBytes, m_pbUncompressed +
(iBottomHeight + iZipStripOffset) * ((ulBackWidth + 7) / 8, (ulBackWidth + 7) /
8, (ulBackWidth + 7) / 8, ulBackWidth, iStripHeight);
                        FlipBuffer (ulBackWidth, iStripHeight);
                        RemoveLongLines (ulBackWidth, iStripHeight,
ulBackResolution);
                        ReadStrip (ulBackWidth, iStripHeight,
m_strHigh, ulBackResolution);
                    }
                }
                if (fDebug)
                {
                    fclose (m_fp);
                    m_fp = (FILE *) NULL;
                }
                return 3;
            }
            else
            {
                if (fDebug)
                    DumpBuffer (ulBackWidth, iStripHeight);
                if (fReadLow && fReadHigh)
                {
                    BitsToBytes (m_pbBytes, m_pbUncompressed +
(ulBackHeight - (iStripHeight + iBottomHeight + iZipStripOffset)) *
((ulBackWidth + 7) / 8), (ulBackWidth + 7) / 8, (ulBackWidth + 7) / 8,
ulBackWidth, iStripHeight);
                    RemoveLongLines (ulBackWidth, iStripHeight,
ulBackResolution);
                    ReadStrip (ulBackWidth, iStripHeight, m_strHigh,
ulBackResolution);
                    if (fDebug)
                        DumpBuffer (ulBackWidth, iStripHeight);
                }
            }
            if (fDebug)
            {
                fclose (m_fp);
                m_fp = (FILE *) NULL;
            }
            return 2;
        }
        else
        {
            if (fDebug)
                DumpBuffer (ulFrontWidth, iStripHeight);
            if (fReadLow && fReadHigh)
            {
                BitsToBytes (m_pbBytes, m_pbUncompressed +
(iBottomHeight + iZipStripOffset) * ((ulFrontWidth + 7) / 8), (ulFrontWidth + 7)
/ 8, (ulFrontWidth + 7) / 8, ulFrontWidth, iStripHeight);
                FlipBuffer (ulFrontWidth, iStripHeight);
                RemoveLongLines (ulFrontWidth, iStripHeight,
ulFrontResolution);
                ReadStrip (ulFrontWidth, iStripHeight, m_strHigh,
ulFrontResolution);
            }
        }
        if (fDebug)
        {
            fclose (m_fp);
            m_fp = (FILE *) NULL;
        }
        return 1;
    }
    else
```

```
                {
                if (fDebug)
                    DumpBuffer (ulFrontWidth, iStripHeight);
                if (fReadLow && fReadHigh)
                    {
                    BitsToBytes (m_pbBytes, m_pbUncompressed + (ulFrontHeight −
(iStripHeight + iBottomHeight + iZipStripOffset)) * ((ulFrontWidth + 7) / 8),
(ulFrontWidth + 7) / 8, (ulFrontWidth + 7) / 8, ulFrontWidth, iStripHeight);
                    RemoveLongLines (ulFrontWidth, iStripHeight,
ulFrontResolution);
                    ReadStrip (ulFrontWidth, iStripHeight, m_strHigh,
ulFrontResolution);
                    if (fDebug)
                        Dumpbuffer (ulFrontWidth, iStripHeight);
                    }
                }
        if (fDebug)
            {
            fclose (m_fp);
            m_fp = (FILE *) NULL;
            }
        return 0;
#endif
}
int CMicrRead::ReadStrip(int iWidth, int iHeight, CString &strResult, ULONG
ulResolution)
{
#ifdef MICRDUMMY
    return −1000;
#else
        int             i,
                        j,
                                k,
                                m,
                                z,
                                iLast,
                                iStart,
                                iXStart,
                                iState,
                                iCount,
                                iChars,
                                iRejCount,
                                iCharCount,
                                iControlCount,
                                iPixels,
                                iDirection,
                                iUse,
                                iGap,
                                iThreshold,
                                iCharWidth,
                                iCharHeight,
                                iResults,
                                iScore,
                                iHighScore,
                                iLowScore,
                                iHighCharacter,
                                iLowCharacter,
                                iPercentage,
                                iX;
        MICRResultType Char [MAX_ALLOWABLE_READS],
                            Result[MAX_ALLOWABLE_READS];
        CharacterType *Characters = (ulResolution == 200 ? Characters200 :
Characters240);
        CharacterType *Shadows = (ulResolution == 200 ? Shadows 200 :
Shadows240);
        PBYTE       pbArray,
                            pbBytes = m_pbBytes;
        strResult . Empty ( );
        iChars = 0;
        TRACE0 ("\n");
        // Now search and find the characters
        for (i = 20; i < iWidth − 20; i++)
            {
            for (j = 1; j < iHeight − (ulResolution == 200 ? 24 : 28); j++)
                {
                if (m_pbBytes[j * iWidth + i] == 1)
                    {
// This next piece of assembly calculates the total number of the 8 neighborhood
pixels that are set on.
```

-continued

```
            __asm
                {
                mov     ecx,0x01010101
                mov     eax,j
                mul     iWidth
                add     eax,i
                mov     esi,pbBytes
                add     esi,eax
                dec     esi
                sub     esi,iWidth
                mov     eax,[esi]
                and     eax,ecx
                movzx   ebx,al
                add     bl,ah
                bswap   eax
                add     bl,ah
                add     esi,iWidth
                mov     eax,[esi]
                and     eax,ecx
                add     bl,al
                bswap   eax
                add     bl,ah
                add     esi,iWidth
                mov     eax,[esi]
                and     eax,ecx
                add     bl,al
                add     bl,ah
                bswap   eax
                add     bl,ah
                mov     k,ebx
                }
            if (k < 5)               // If 5 aren't set
at least, this probably isn't a character
                continue;
            iResults = 0;
            for (k = 0); k < sizeof (Characters200) / sizeof
(Characters200[0]); k++)
                {
                iThreshold   = Characters[k] . iDifference;
                iCharWidth   = Characters[k] . iWidth;
                iCharHeight  = Characters[k] . iHeight;
                pbArray      = Characters[k] . pbArray;
                iX           = Characters[k] . iX;
/*
This section is replaced by the assembly block below for speed
                for (y = 0; y < iCharHeight && iThreshold > 0;
y++)
                    {
                    for (x = 0; x < iCharWidth && iThreshold >
0; x++)
                        {
                        if (pbArray[y * iCharWidth + x] == 1)
                            {
                            if (m_pbBytes [(j + y) * iWidth +
i + x - iX] == 0)
                                iThreshold -= 1;
                            }
                        else if (pbArray[y * iCharWidth + x]
== 2)
                            {
                            if (m_pbBytes[(j + y) * iWidth +
i + x - iX] != 0)
                                iThreshold -= 1;
                            }
                        }
                    }
*/
            __asm
                {
                mov     eax,j
                mul     iWidth
                add     eax,i
                sub     eax,iX
                mov     edi,eax
                add     edi,pbBytes     ;This is
&m_pbBytes[(j + (y = 0)) * iWidth + i + (x = 0) - iX]
                mov     esi,pbArray     ;This is
&pbArray[(y = 0) * iCharWidth]
                mov     edx,iWidth
```

-continued

```
                        sub    edx,iCharWidth    ;Adds to EDI
at end of each line
                        mov    ebx,iCharHeight
                 11:    mov    ecx,iCharWidth
                 12:    cmp    byte ptr [esi],1
                        je     13                ;Check
to count up
                        jg     14                ;Check
to count down
                        inc    esi
                        inc    edi
                        sub    ecx,1
                        jg     12
                        add    edi,edx
                        sub    ebx,1
                        jg     11
                        jmp    16
                 13:    cmp    byte ptr [edi],0
                        jne    15
                        dec    iThreshold        ;Count as
missing pel
                        jle    16                ;If too
many, we're done
                        inc    esi
                        inc    edi
                        sub    ecx,1
                        jg     12
                        add    edi,edx
                        sub    ebx,1
                        jg     11
                        jmp    16
                 14:    cmp    byte ptr [edi],0
                        je     15
                        dec    iThreshold        ;Count as
'extra' pel
                        jle    16                ;If too
many, we're done
                 15:    inc    esi
                        inc    edi
                        sub    ecx,1
                        jg     12
                        add    edi,edx
                        sub    ebx,1
                        jg     11
                 16:
                        }
                        if (iThreshold > 0 && j - Characters[k] . iY >= 0)
                        {
                                Result[iResults]     . iX           = i -
Characters[k] . iX + Characters[k] . iRightSide;
                                Result[iResults]     . iY           = j -
Characters[k] . iY;
                                Result[iResults]     . iIndex       = k;
                                Result[iResults]     . fValid       = TRUE;
                                Result[iResults]     . fHidden      = FALSE;
                                Result[iResults]     . fShadow      = FALSE;
                                Result[iResults]      . iScore       =
iThreshold;
                                Result[iResults]     .cInsertBefore= 0;
                                Result[iResults]     . cInsertAfter = 0;
                                Result[iResults++]    . cCharacter   =
Characters[k] . cCharacter;
                        }
                }
                if (iResults > 0)                    //    Got
SOMETHING, figure out what it is
                {
                        BOOL fUsed = TRUE;
                        if (iResults == 1)
                        {
                                if (Result[0] . cCharacter == '—')
                                {
                                        if (iChars > 0 &&
                                            Char[iChars - 1] . cCharacter >=
'0' &&
                                            Char[iChars - 1] . cCharacter <=
'9' &&
                                            abs    (Result[0] . iY -
Char[iChars - 1] . iY) <= (ulResolution == 203 ? 3 : 4))
```

-continued

```
                                        Char[iChars] = Result[0];
                                else
                                        fUsed = FALSE;
                                }
                        else
                                Char[iChars] = Result[0];
                        }
                else if (iResults == 2)
                        {
                        if (Result[0] . cCharacter == '5' &&
Result[1] . cCharacter == '8')
                                Char[iChars] = Result[1];
                        else if (Result[0] . cCharacter == '8' &&
Result[1] . cCharacter == '9')
                                Char[iChars] = Result[0];
                        else if (Result[0] . cCharacter == '4' &&
Result[1] . cCharacter == '6')
                                Char[iChars] = Result[1];
                        else
                                {
                                Char[iChars] =
Result[iResults - 1];

Char[iChars] . cCharacter = '?';
                                }
                        }
                else if (iResults == 3)
                        {
                        if (Result[0] . cCharacter == '3' &&
Result[1] . cCharacter == '5' && Result[2] . cCharacter == '8')
                                Char[iChars] = Result[2];
                        else if (Result[0] . cCharacter == '5' &&
Result[1] . cCharacter == '8' && Result[2] . cCharacter == '9')
                                Char[iChars] = Result[1];
                        else
                                {
                                Char[iChars] =
Result[iResults - 1];

Char[iChars] . cCharacter = '?';
                                }
                        }
                else
                        {
                        Char[iChars] = Result[iResults
- 1];

Char[iChars] . cCharacter = '?';
                        }
                if (fUsed)
                        {
                        iChars += 1;
                        i += (ulResolution == 200 ? 5 : 6);
        // Skip over some
                        j += (ulResolution == 200 ? 23 : 27);
        // Jump vertically as well
                        }
                break;
                }
            }
        }
    if (m_fp != (FILE *) NULL)
        {
        fprintf (m_fp, "BEFORE post processing\n");
        for (i = 0; i < iChars; i++)
            fprintf (m_fp, "Char %c at X=%d, Y=%d\n", Char[i] .
cCharacter, Char[i] . iX, Char[i] . iY);
        fprintf (m_fp, "--------------------\n");
        }
    // First, go through and remove any significantly above and below
characters
    for (i = 1; i < iChars - 1; i++)
        {
        if ((ulResolution == 200 && abs (Char[i + 1] . iY - Char[i - 1] .
iY) <= 3 && abs (Char[i] . iY - Char[i - 1] . iY) >= 8) ||
            (ulResolution == 240 && abs (Char[i + 1] . iY - Char[i - 1] .
iY) <= 5 && abs (Char[i] . iY - Char[i - 1] . iY) >= 10))
            {
            for (j = i; j < iChars; j++)
                Char[j] = Char[j + 1];
            iChars -= 1;
```

```
                }
            }
            if (m_fp != (FILE *) NULL)
            {
                fprintf (m_fp, "After Above/Below removal\n");
                for (i = 0; i < iChars; i++)
                {
                    if (!Char[i] . fValid)
                        continue;
                    fprintf (m_fp, "Char %c at X=%d, Y=%d\n", Char[i] .
cCharacter, Char[i] . iX, Char[i] . iY);
                }
                fprintf (m_fp, "--------------------\n");
            }
            // Whip through and remove any internal weird reads
            for (i = 1; i < iChars - 1; i++)
            {
                if (Char[i + 1] . iX - Char[i - 1] . iX < (ulResolution == 200 ? 29
: 35)) // This is between two apparently 'real' characters
                {
                    if (Char[i] . iX - Char[i - 1] . iX > (ulResolution == 200 ?
22 : 26))
                        Char[++i] . fValid = FALSE;
                    else
                        Char[i] . fValid = FALSE;
                }
            }
            if (m_fp != (FILE *) NULL)
            {
                fprintf (m_fp, "After Internal (inter character) read removal\n");
                for (i = 0; i < iChars; i++)
                {
                    if (!Char[i] . fValid)
                        continue;
                    fprintf (m_fp, "Char %c at X=%d, Y=%d\n", Char[i] .
cCharacter, Char[i] . iX, Char[i] . iY);
                fprintf (m_fp, "--------------------\n");
            }
            // Next, strip out any characters after a valid amount
            for (iState = iCount = i = 0; i < iChars; i++)
            {
                if (!Char[i] . fValid)
                    continue;
                switch (iState)
                {
                    case 0:
                        if (Char[i] . cCharacter == '$')
                            iState = 1;
                        break;
                    case 1:
                        if (Char[i] . cCharacter == '$')
                        {
                            if (iCount > 8)
                                iState = 2;
                        }
                        else
                            iCount += 1;
                        break;
                    case 2:
                        Char[i] . fValid = FALSE;
                        break;
                }
            }
            if (m_fp != (FILE *) NULL)
            {
                fprintf (m_fp, "After post amount removal\n");
                for (i = 0; i < iChars; i++)
                {
                    if (!Char[i] . fValid)
                        continue;
                    fprintf (m_fp, "Char %c at X=%d, Y=%d\n", Char[i] .
cCharacter, Char[i] . iX, Char[i] . iY);
                }
                fprintf (m_fp, "--------------------\n");
            }
            // Now, remove any leading and trailing reject characters
            for (i = 0; i < iChars; i++)
            {
                if (!Char[i] . fValid)
```

```
                    continue;
                else if (Char[i] . cCharacter == '?')
                    Char[i] . fValid = FALSE;
                else
                    break;
            }
        for (i = iChars - 1; i >= 0; i--)
            {
            if (!Char[i] . fValid)
                continue;
            else if (Char[i] . cCharacter == '?')
                Char[i] . fValid = FALSE;
            else
                break;
            }
        if (m_fp != (FILE *) NULL)
            {
            fprintf (m_fp, "After leading/trailing reject removal\n");
            for (i = 0; i < iChars; i++)
                {
                if (!Char[i] . fValid)
                    continuer;
                fprintf (m_fp, "Char %c at X=%d, Y=%d\n", Char[i] .
cCharacter, Char[i] . iX, Char[i] . iY);
                }
            fprintf (m_fp, "-------------------\n");
            }
        // Remove any leading and trailing multiple control characters
        for (iLast = -1, i = 0; i < iChars; i++)
            {
            if (!Char[i] . fValid)
                continue;
            else if (Char[i] . cCharacter == '<' ||
                    Char[i] . cCharacter == '#' ||
                        Char[i] . cCharacter == '$' ||
                        Char[i] . cCharacter == '-')
                {
                if (iLast >= 0)
                    Char[iLast] . fValid = FALSE;
                iLast = i;
                }
            else
                break;
            }
        for (iLast = -1, i = iChars - 1; i >= 0; i--)
            {
            if (!Char[i] . fValid)
                continue;
            else if (Char[i] . cCharacter == '<' ||
                    Char[i] . cCharacter == '#' ||
                        Char[i] . cCharacter == '$' ||
                        Char[i] . cCharacter == '-')
                {
                if (iLast >= 0)
                    Char[iLast] . fValid = FALSE;
                iLast = i;
                }
            else
                break;
            }
        if (m_fp != (FILE *) NULL)
            {
            fprintf (m_fp, "After leading/trailing multiple delimiter
removal\n");
            for (i = 0; i < iChars; i++)
                {
                if (!Char[i] . fValid)
                    continue;
                fprintf (m_fp, "Char %c at X=%d, Y=%d\n", Char[i] .
cCharacter, Char[i] . iX, Char[i] . iY);
                }
            fprintf (m_fp, "-------------------\n");
            }
        // Pack the file character array before the next step
        for (i = j = 0; i < iChars; i++)
            {
            if (Char[i] . fValid)
                Char[j++] = Char[i];
            }
        iChars = j;
```

-continued

```
        // Then strip any single characters left of the TR field that are not '2'
(for Qualified Returns)
        if (iChars >= 12 && Char[1] . cCharacter == '<' && Char[0] . cCharacter !=
'2')
                {
                for (i = 0; i < iChars; i++)
                        Char[i] = Char[i + 1];
                iChars -= 1;
                }
        if (m_fp != (FILE *) NULL)
                {
                fprintf (m_fp, "After non RIC removal\n");
                for (i = 0; i < iChars; i++)
                        {
                        if (!Char[i] . fValid)
                                continue;
                        fprintf (m_fp, "Char %c at X=%d, Y=%d\n", Char[i] .
cCharacter, Char[i] . iX, Char[i] . iY);
                        }
                fprintf (m_fp, "--------------------\n");
                }
        // Now go through the string and remove any consecutive strings of three
or more delimiters. Remove the middles
        for (iLast = -1, i = 0; i < iChars; i++)
                {
                if (Char[i] . cCharacter == '<' ||
                    Char[i] . cCharacter == '#' ||
                    Char[i] . cCharacter == '$' ||
                    Char[i] . cCharacter == '-')
                        {
                        if (i + 1 >= iChars)
                                {
                                if (iLast >= 0 && i - iLast >= 2)
                                        {
                                        for (j = iLast + 1; j < i; j++)
                                                Char[i] . fValid = FALSE;
                                        }
                                }
                        else if (iLast == -1)
                                iLast = i;
                        }
                else
                        {
                        if (iLast >= 0 && i - iLast > 2)
                                {
                                for (j = iLast + 1; j + 1 < i; j++)
                                        Char[i] . fValid = FALSE;
                                }
                        iLast = -1;
                        }
                }
        if (m_fp != (FILE *) NULL)
                {
                fprintf (m_fp, "After multiple delimiter removal\n");
                for (i = 0; i < iChars; i++)
                        fprintf (m_fp, "Char %c at X=%d, Y=%d\n", Char[i] .
cCharacter, Char[i] . iX, Char[i] . iY);
                fprintf (m_fp, "--------------------\n");
                }
        // Pack the file character array before the next step, also verify we're
on the right track
        for (i = j = 0; i < iChars; i++)
                {
                if (Char[i] . fValid)
                        Char[j++] = Char[i];
                }
        iChars = j;
        for (iRejCount = iCharCount = iControlCount = i = 0; i < iChars; i++)
                {
                if (Char[i] . cCharacter >= '0' && Char[i] . cCharacter <= '9')
                        iCharCount += 1;
                else if (Char[i] . cCharacter == '?')
                        iRejCount += 1;
                else if (Char[i] . cCharacter != '-')
                        iControlCount += 1;
                }
        if (iChars < 7 || iControlCount == 0 || iRejCount > iCharCount)
                return -1;
        // As a final step, check the gaps for any 'hidden' characters we might
```

-continued

```
have missed.
        for (z = 0; z <= iChars; z++)
            {
            for (iGap = 1000, iDirection = 0; iDirection < 2;)
                {
                if (z == 0)
                    {
                    if (Char[z] . cCharacter < '0' | | Char[z] . cCharacter >
'9')
                        break;
                    else
                        iDirection = 1;          // Go left from here
                    if (Char[z] . iY > 2)
                        iStart = Char[z] . iY - 2;
                    else
                        iStart = 1;
                    iXStart = Char[z] . iX - (ulResolution == 200 ? 25 :
30);
                    }
                else if (z == iChars)
                    {
                    if (Char[z - 1] . cCharacter < '0' | | Char[z - 1] .
cCharacter > '9' | | iDirection == 1)
                        break;
                    if (Char[z - 1] . iY > 2)
                        iStart = Char[z - 1] . iY - 2;
                    else
                        iStart = 1;
                    iXStart = Char[z - 1] . iX + (ulResolution == 200 ? 25 :
30);
                    }
                else
                    {
                    if ((Char[z] . cCharacter < '0' | | Char[z] .
cCharacter > '9') &&    // Neither is a digit, skip this gap
                        (Char[z - 1] . cCharacter < '0' | | Char[z - 1] .
                        cCharacter > '9'))
                        break;
                    iGap = Char[z] . iX - Char[z - 1] . iX;
                    if (iGap < (ulResolution == 200 ? 40 : 48))
    // No excessive gap here
                        break;
                    if (iDirection == 0)        // Go right from the last
character
                        {
                        if (Char[z - 1] . iY > 2)
                            iStart = Char[z - 1] . iY - 2;
                        else
                            iStart = 1;
                        iXStart = Char[z - 1] . iX + (ulResolution == 200
? 25 : 30);
                        }
                    else if (iDirection ==1) // Go left from the
current character
                        {
                        if (iGap < (ulResolution == 200 ? 65 : 78) &&
                            iDirection > 0 &&
                            Char[z - 1] . cInsertAfter != 0)
                            break;
                        if (Char[z] . iY > 2;
                            iStart = Char[z] . iY - 2;
                        else
                            iStart = 1;
                        iXStart = Char[z] . iX - (ulResolution == 200 ? 25
: 30);
                        }
                    }
                    // This piece of assembly adds up the number of black pixels
where the
                    // suspect missing character 'may' be
                if (iXStart < (ulResolution == 200 ? 25 : 30))      //
Too far left, don't try it
                    break;
                else if (iXStart > iWidth - (ulResolution == 200 ? 25 : 30))
    // Too far right, don't try it
                    break;
                j = iStart * iWidth + iXStart - (ulResolution == 200 ? 20 :
24) + 2;
                __asm
```

```
        {
        sub     ebx,ebx
        mov     edx,0x01010101
        mov     esi,pbBytes
        add     esi,j
        cmp     ulResolution,200
        jne     s1
        mov     ecx,24
        jmp     s2
s1:     mov     ecx,28
s2:     mov     eax,[esi]
        and     eax,edx
        add     bl,al
        adc     bh,0
        add     bl,ah
        adc     bh,0
        bswap eax
        add     bl,al
        adc     bh,0
        add     bl,ah
        adc     bh,0
        mov     eax,[esi + 4]
        and     eax,edx
        add     bl,al
        adc     bh,0
        add     bl,ah
        adc     bh,0
        bswap eax
        add     bl,al
        adc     bh,0
        add     bl,ah
        adc     bh,0
        mov     eax,[esi + 8]
        and     eax,edx
        add     bl,al
        adc     bh,0
        add     bl,ah
        adc     bh,0
        bswap eax
        add     bl,al
        adc     bh,0
        add     bl,ah
        adc     bh,0
        mov     eax,[esi + 12]
        and     eax,edx
        add     bl,al
        adc     bh,0
        add     bl,ah
        adc     bh,0
        bswap eax
        add     bl,al
        adc     bh,0
        add     bl,ah
        adc     bh,0
        mov     eax,[esi + 16]
        and     eax,edx
        add     bl,al
        adc     bh,0
        add     bl,ah
        adc     bh,0
        bswap eax
        add     bl,al
        adc     bh,0
        add     bl,ah
        adc     bh,0
        cmp     ulResolution,200
        je      s3
        mov     eax,[esi + 20]
        and     eax,edx
        add     bl,al
        adc     bh,0
        add     bl,ah
        adc     bh,0
        bswap eax
        add     bl,al
        adc     bh,0
        add     bl,ah
        adc     bh,0
s3:     add     esi,iWidth
```

-continued

```
                        dec     ecx
                        jg      s2
                        mov     iPixels, ebx
                    }
                    if (iPixels >= (ulResolution == 200 ? 80 : 96))      // Do a
more relaxed check since we kind of know where this is
                    {
                        if (z == iChars)
                            TRACE2 ("There may be someting at the end after
%c, density %d\n", Char[z - 1] . cCharacter, iPixels);
                        else if (z > 0)
                            TRACE3 ("There may be something between the %c and
%c, density %d\n", Char[z - 1] . cCharacter, Char[z] . cCharacter, iPixels);
                        else
                            TRACE2 ("There may be something at the start
before %c, density %d\n", Char[z] . cCharacter, iPixels);
                        iResults    = 0;
                        iHighScore  = 0;
                        for (i = iXStart - 4; i < iXStart - 4 + (ulResolution ==
200 ? 9 : 10); i++)
                        {
                            for (j = iStart; j < iStart + (ulResolution == 200
? 8 : 9); j++)
                            {
                                for (k = 0; k < (sizeof (Characters200) /
sizeof (Characters200[0]) - 1); k++)
                                {
                                    iScore       = 0;
                                    iCharWidth   = Characters[k] . iWidth;
                                    iCharHeight  = Characters[k] . iHeight;
                                    pbArray      = Characters[k] . pbArray;
                                    iX           = Characters[k] .
iRightSide;
                                    _asm
                                    {
                                        mov     eax,j
                                        mul     iWidth
                                        add     eax,i
                                        sub     eax,iX
                                        mov     edi,eax
                                        add     edi,pbBytes
            ;This is &m_pbBytes[(j + (y = 0)) * iWidth + i + (x = 0) +
iAlignmentOffset]
                                        mov     esi,pbArray
                ;This is &pbArray[(y = 0) * iCharWidth]
                                        mov     edx,iWidth
                                        sub     edx,iCharWidth
                ;Adds to EDI at end of each line
                                        mov     ebx,iCharHeight
                                    r1: mov     ecx,iCharWidth
                                    r2: cmp     byte ptr [esi],1
                                        je      r3
                ;Check to count up
                                        inc     esi
                                        inc     edi
                                        sub     ecx,1
                                        jg      r2
                                        add     edi,edx
                                        sub     ebx,1
                                        jg      r1
                                        jmp     r5
                                    r3: cmp     byte ptr [edi],1
                                        jl      r4
                                        inc     iScore
;Count as matched pixel
                                    r4: inc     esi
                                        inc     edi
                                        sub     ecx,1
                                        jg      r2
                                        add     edi,edx
                                        sub     ebx,1
                                        jg      r1
                                    r5:
                                    }
                                    iPercentage = (iScore * 100) /
Characters[k] . iPossible;
                                    if (iPercentage > iHighScore)
                                    {
                                        iHighScore   = iPercentage;
```

-continued

```
                                    iHighCharacter   = k;
                                }
                                if (iPercentage >= Characters[k] .
iRelaxedPercentage)
                                {
                                    for (m = 0; m < iResults; m++)
                                    {
                                        if (Characters[k] .
cCharacter == Result[m] . cCharacter
                                        {
                                            if (iPercentage >
Result[m] . iScore)
                                            {
                                                Result[m] .
iX            = i;
                                                Result[m] .
iY            = j – Characters[k] . iY;
                                                Result[m] .
iScore         = iPercentage;
                                            }
                                            break;
                                        }
                                    }
                                    if (m >= iResults)
                                    {
                                        Result[iResults] . iX
= i;
                                        Result[iResults] . iY
= j – Characters[k] . iY;
                                        Result[iResults] .
iIndex          = k;
                                        Result[iResults] .
fValid          = TRUE;
                                        Result[iResults] .
fHidden         = TRUE;
                                        Result[iResults] .
fShadow         = FALSE;
                                        Result[iResults] .
iScore          = iPercentage;
                                        Result[iResults] .
cInsertBefore   = 0;
                                        Result[iResults] .
cInsertAfter    = 0;
                                        Result[iResults++] .
cCharacter      = Characters[k] . cCharacter;
                                    }
                                }
                            }
                            if (iResults > 0 && iPixels < (ulResolution == 200 ? 500
: 600))       // Got SOMETHING, figure out what it is
                            {
                                for (i = 0; i < iResults; i++)
                                    TRACE3 (" May be %c, score %d, possible
%d\n", Result[i] . cCharacter, Result[i] . iScore, Characters[Result[i] .
iIndex] . iPossible);
                                for (iUse = 0, i = 1; i < iResults; i++)
                                {
                                    if (Result[i] . cCharacter == '8')
                                    {
                                        iUse = i;
                                        break;
                                    }
                                    else if (Result[iUse] . cCharacter == '8')
                                        break;
                                    else if (Result[i] . iScore > Result[iUse] .
iScore)
                                        iUse = i;
                                    else if (Result[i] . iScore == Result[iUse] .
iScore && Characters[Result[i] . iIndex] . iPossible > Characters[Result[iUse] .
iIndex] . iPossible)
                                        iUse = i;
                                }
                                TRACE3 (" Substituting %c, score %d, possible
$d\n", Result[iUse] . cCharacter, Result[iUse] . iScore, Characters[Result[iUse] .
iIndex] . iPossible)
                                for (i = iChars; i > z; i--) // Shift the string
right one character
                                    Char[i] = Char[i – 1];
```

```
                iChars += 1;
                Char[z] = Result[iUse];
                if (iDirection == 0)                           // Need to use this new character as the reference
                    z += 1;
            }
            else if (iHighScore >= 70)                         // Try final shadow masks for unique match
            {
                iResults   = 0;
                iLowScore  = 1000000;
                if (iStart > 2)
                    iStart -= 2;
                else
                    iStart = 0;
                for (i = iXStart - 4; i < iXStart - 4 + (ulResolution == 200 ? 9 : 10); i++)
                {
                    for (j = iStart; j < iStart + (ulResolution == 200 ? 8 : 9); j++)
                    {
                        for (k = 0; k < (sizeof (Shadows200) / sizeof (Shadows200[0]) - 1); k++)
                        {
                            iScore       = 0;
                            iCharWidth   = Shadows[k] . iWidth;
                            iCharHeight  = Shadows[k] . iHeight;
                            pbArray      = Shadows[k] . pbArray;
                            iX           = Shadows[k] . iRightSide;
                            if (i - iX < 0)
                                continue;
                            else if (i - iX + iCharWidth > iWidth)
                                continue;
                            __asm
                            {
                                mov    eax,j
                                mul    iWidth
                                add    eax,i
                                sub    eax,iX
                                mov    edi,eax
                                add    edi,pbBytes
                ;This is &m_pbBytes[(j + (y = 0)) * iWidth + i + (x = 0) + iAlignmentOffset]
                                mov    esi,pbArray
                ;This is &pbArray[(y = 0) * iCharWidth]
                                mov    edx,iWidth
                                sub    edx,iCharWidth
                ;Adds to EDI at end of each line
                                mov    ebx,iCharHeight
                            q1: mov    ecx,iCharWidth
                            q2: cmp    byte ptr [esi],1
                ;Check to count up
                                je     q3
                                inc    esi
                                inc    edi
                                sub    ecx,1
                                jg     q2
                                add    edi,edx
                                sub    ebx,1
                                jg     q1
                                jmp    q5
                            q3: cmp    byte ptr [edi],1
                                jl     q4
                                inc    iScore
                ;Count as matched pixel
                            q4: inc    esi
                                inc    edi
                                sub    ecx,1
                                jg     q2
                                add    edi,edx
                                sub    ebx,1
```

-continued

```
                            jg      q1
                    q5:
                        }
                    if (iScore <= 2)
                        {
                        if (iScore < iLowScore)
                            {
                            iLowScore = iScore;
                            iLowCharacter = k;
                            }
                        for (m = 0; m < iResults; m++)
                            {
                            if (Shadows[k] . cCharacter == Result[m] . cCharacter)
                                {
                                if (iScore < Result[m] . iScore)
                                    {
                                    Result[m] . iX    = i;
                                    Result[m] . iY    = j + 2;
                                    Result[m] . iScore = iScore;
                                    }
                                break;
                                }
                            }
                        if (m >= iResults)
                            {
                            Result[iResults] . iX          = i;
                            Result[iResults] . iY          = j + 2;
                            Result[iResults] . iIndex      = k;
                            Result[iResults] . fValid      = TRUE;
                            Result[iResults] . fHidden     = FALSE;
                            Result[iResults] . fShadow     = TRUE;
                            Result[iResults] . iScore      = iScore;
                            Result[iResults] . cInsertBefore = 0;
                            Result[iResults] . cInsertAfter  = 0;
                            Result[iResults] . iPriority   = Shadows[k] . iPriority;
                            Result[iResults++] . cCharacter = Shadows[k] . cCharacter;
                            }
                        }
                    }
                }
            }
        if (iResults > 0)
            {
            if (iResults == 1)
                iUse = 0;
            else if (iResults == 2)
                {
                if (Result[0] . cCharacter == '8')
                    iUse = 1;
                else if (Result[1] . cCharacter == '8')
                    iUse = 0;
                else if (Result[0] . cCharacter == '1')
                    iUse = 0;
                else if (Result[1] . cCharacter == '1')
                    iUse = 1;
                else
                    iUse = -1;
                }
            else        // We have 3 or more results, use the lowest score if by itself
                {
```

-continued

```
                              for (iUse = -1, i = 0; i < iResults;
i++)
                              {
                                   if (Result[i] . iScore ==
iLowScore)
                                        {
                                             if (iUse == -1)
                                                  iUse = i;
                                             else
                                                  {
                                                       if (Result[i] .
iPriority == Result[iUse] . iPriority)
                                                            {
                                                            iUse = -1;
                                                            break;
                                                            }
                                                       else if (Result[i] .
iPriority < Result[iUse] . iPriority)
                                                            iUse = i;
                                                  }
                                        }
                              }
                         if (iUse >= 0 && iResults > 0)
                              {
                                   TRACE2 (" Shadow substituting %c, score
%d\n", Result[iUse] . cCharacter, Result[iUse] . iScore);
                                   for (i = iChars; i > z; i--) // Shift the
string right one character
                                        Char[i] = Char[i - 1];
                                   iChars += 1;
                                   Char[z] = Result[iUse];
                                   if (iDirection == 0)
          // Need to use this new character as the reference
                                        z += 1;
                              }
                         else
                              {
                                   TRACE3 (" Inserting a direction %d
misread, score was %d for '%c'\n", iDirection, iHighScore,
Characters[iHighCharacter] . cCharacter);
                                   if (iResults == 0)
                                        TRACE0 (" Shadows had NO
results\n");
                                   else
                                        TRACE3 (" Shadows had %d results,
score was %d for '%c'\n", iResults, iLowScore, Shadows[iLowCharacter] .
cCharacter);
                                   if (iResults > 1)
                                        {
                                        TRACE0 (" Shadows may have been
");
                                        for (i = 0; i < iResults; i++)
                                             TRACE2 ("%c,%d ", Result[i] .
cCharacter, Result[i] . iScore);
                                        TRACE0 ("\n");
                                        }
                                   if (iDirection == 0)
                                        Char[z - 1] . cInsertAfter = '?';
                                   else
                                        Char[z] . cInsertBefore = '?';
                                   iDirection += 1;
                              }
                    }
               else
                    iDirection += 1;
               }
          else
               iDirection += 1;
          }
     }
if (m_fp != (FILE *) NULL)
     {
     fprintf (m_fp, "After hidden character extraction\n");
     for (i = 0; i < iChars; i++)
          if (Char[i] . fHidden)
               fprintf (m_fp, "Char %c at X=%d, Y=%d, HIDDEN Score
%d\n", Char[i] . cCharacter, Char[i] . iX, Char[i] . iY, Char[i] . iScore);
```

```
                else if (Char[i] . fShadow)
                        fprintf (m_fp, "Char %c at X=%d, Y=%d, SHADOW Score
%d\n", Char[i] . cCharacter, Char[i] . iX, Char[i] . iY, Char[i] . iScore);
                else
                        fprintf (m_fp, "Char %c at X=%d, Y=%d\n", Char[i] .
cCharacter, Char[i] . iX, Char[i] . iY);
        fprintf (m_fp, "--------------------\n");
        }
    // LAST THING TO DO BEFORE BUILDING RESULT STRING. If amount is missing
left or right symbols, create one
    for (iCount = iState = 0, i = iChars − 1; i >= 0; i−−)
        {
        if (!Char[i] . fValid)
            continue;
        switch (iState)
            {
            case 0:
                if (Char[i] . cCharacter == '$')
                    {
                    iLast = Char[i] . iX;
                    iState = 1;
                    }
                else if (Char[i] . cCharacter >= '0' && Char[i] .
cCharacter <= '9')
                    {
                    iCount = 1;
                    iLast = Char[i] . iX;
                    iState = 2;
                    }
                else
                    i = 0;          // We're all done
                break;
            case 1:
                if (iCount < 10 && Char[i] . cCharacter >= '0' &&
Char[i] . cCharacter <= '9')
                    {
                    if (iLast − Char[i] . iX < (ulResolution == 200 ?
32 : 38) &&
                        iLast − Char[i] . iX > (ulResolution == 200
? 17 : 20))
                        iCount += 1;
                    else
                        i = 0;
                    }
                else if (iCount == 10 && Char[i] . cCharacter != '$')
                    {
                    Char[i + 1] . cInsertBefore = '$';
                    i = 0;          // We're all done
                    }
                else
                    {
                    if (Char[i] . cCharacter == '-')
                        Char[i] . fValid = FALSE;
                    i = 0;          // All done
                    }
                iLast = Char[i] . iX;
                break;
            case 2:
                if (iCount < 10 && Char[i] . cCharacter >= '0' &&
Char[i] . cCharacter <= '9')
                    {
                    if (iLast − Char[i] . iX < (ulResolution == 200 ?
29 : 35 ) &&
                        iLast − Char[i] . iX > (ulResolution == 200
? 22 : 26))
                        iCount += 1;
                    else
                        i = 0;
                    }
                else if (iCount == 10)
                    {
                    Char[iChars − 1] . cInsertAfter = '$';
                    if (Char[i] . cCharacter != '$')
                        Char[i + 1] . cInsertBefore = '$';
                    i = 0;          // We're all done
                    }
                else
                    i = 0;          // All done
                iLast = Char[i] . iX;
```

```
                    break;
                }
            }
        // Now simply build the result string
        strResult . Empty ( );
        for (z = 0; z < iChars; z++)
            {
            if (!Char[z] . fValid)
                continue;
            if (z > 0 && Char[z] . iX - iLast >= (ulResolution == 200 ? 40 : 48))
                {
                if (Char[z] . iX - iLast >= (ulResolution == 200 ? 65 : 78))
                    strResult += ' ';
                else if (Char[z] . cInsertBefore == 0 && Char[z - 1] . cInsertAfter == 0)
                    strResult += ' ';
                }
            if (Char[z] . cInsertBefore != 0)
                strResult += Char[z] . cInsertBefore;
            strResult += Char[z] . cCharacter;
            if (Char[z] . cInsertAfter != 0)
                strResult += Char[z] . cInsertAfter;
            iLast     = Char[z] . iX;
            }
        if (m_fp != (FILE *) NULL)              // Dump where the chars are
            {
            int x,
                y;
            for (k = 0; k < iChars; k++)
                {
                iCharWidth   = Characters[Char[k] . iIndex] . iWidth;
                iCharHeight  = Characters[Char[k] . iIndex] . iHeight;
                pbArray      = Characters[Char[k] . iIndex] . pbArray;
                j = Char[k] . iY + Characters[Char[k] . iIndex] . iY;
                i = Char[k] . iX - Characters[Char[k] . iIndex] . iRightSide;
                for (y = 0; y < iCharHeight; y++)
                    {
                    if (j + y < 0)              // Too near the top
                        continue;
                    for (x = 0; x < iCharWidth; x++)
                        {
                        if (pbArray[y * iCharWidth + x] == 1)
                            {
                            if (m_pbBytes[(j + y) * iWidth + i + x] != 0)
                                m_pbBytes[(j + y) * iWidth + i + x] = Char[k] . cCharacter;
                            else
                                m_pbBytes[(j + y) * iWidth + i + x] = 8;
                            }
                        else if (pbArray[y * iCharWidth + x] == 2)
                            {
                            if (m_pbBytes[(j + y) * iWidth + i + x] != 0)
                                m_pbBytes[(j + y) * iWidth + i + x] = 16;
                            }
                        }
                    }
                }
            }
    return 0;
#endif
}
void CMicrRead::BitsToBytes (PBYTE pbDest, PBYTE pbSrc, DWORD dwSrcWidth, DWORD
dwByteWidthSrc, DWORD dwByteWidthOut, DWORD dwHeight)
{
#ifndef MICRDUMMY
    _asm            // This routine converts bits to bytes
        {
        mov     esi, pbSrc
        mov     edi, pbDest
        sub     ebx, ebx
        mov     edx, dwHeight
    11: mov     ecx, dwByteWidthSrc
    12: mov     bl, byte ptr [esi]
        inc     esi
```

```
            mov   eax, dwHigh[4 * ebx]
            mov   [edi], eax
            mov   eax, dwLow [4 * ebx]
            mov   [edi + 4], eax
            add   edi,8
            dec   ecx
            jg    12
            mov   esi, pbSrc
            add   esi, dwSrcWidth
            mov   pbSrc, esi
            mov   edi, pbDest
            add   edi, dwByteWidthOut
            mov   pbDest, edi
            dec   edx
            jg    11
        }
#endif
}
void CMicrRead::FlipBuffer (int iWidth, int iHeight)
{
#ifndef MICRDUMMY
    BYTE bTemp;
    int i,
        j;
    for (j = 0; j < iHeight / 2; j++)
    {
        for (i = 0; i < iWidth; i++)
        {
            bTemp = m_pbBytes[j * iWidth + i];
            m_pbBytes[j * iWidth + i] = m_pbBytes[(iHeight - j) * iWidth -
i - 1];
            m_pbBytes[(iHeight - j) * iWidth - i - 1] = bTemp;
        }
    }
    if (iHeight & 1)
    {
        for (i = 0; i < iWidth / 2; i++)
        {
            bTemp = m_pbBytes[j * iWidth + i];
            m_pbBytes[j * iWidth + i] = m_pbBytes[(j + 1) * iWidth - i -
1];
            m_pbBytes[(j + 1) * iWidth - i - 1] = bTemp;
        }
    }
#endif
}
void CMicrRead::DumpBuffer (int iWidth, int iHeight)
{
#ifndef MICRDUMMY
    int i,
        j;
    for (j = 0; j < iHeight; j++)
    {
        for (i = 0; i < iWidth; i++)
        {
            switch (m_pbBytes[j * iWidth + i])
            {
                case 0:
                    fprintf (m_fp, " ");
                    break;
                case 1:
                    fprintf (m_fp, ".");
                    break;
                case 2:
                    fprintf (m_fp, "-");
                    break;
                case 4:
                    fprintf (m_fp, "*");
                    break;
                case 8:
                    fprintf (m_fp, "o");
                    break;
                case 16:
                    fprintf (m_fp, "B");
                    break;
                default:
                    fprintf (m_fp, "%c", m_pbBytes[j * iWidth + i]);
                    break;
            }
```

```
                }
            fprintf (m_fp, "\n");
        }
        for (i = 0; i < iWidth; i++)
            fprintf (m_fp, "-");
        fprintf (m_fp, "\n");
#endif
}
void CMicrRead::RemoveLongLines (int iWidth, int iHeight, ULONG ulResolution)
{
#ifndef MICRDUMMY
    int i,
        j,
        k,
        iStart,
        iState,
        iMaxLength,
        iMaxHeight,
        iMinClose,
        iRef,
        y;
    if (ulResolution == 200)
        {
        iMaxLength = 50;
        iMaxHeight = 40;
        iMinClose = 15;
        }
    else
        {
        iMaxLength = 60;
        iMaxHeight = 48;
        iMinClose = 18;
        }
    // First do horizontal lines
    for (y = j = 0; j < iHeight; j++, y += iWidth)
        {
        for (i = 0; i < iWidth; i++)
            {
            if (m_pbBytes[y + i] == 1)
                {
                iStart = i;
                for (;i < iWidth && m_pbBytes[y + i] == 1; i++);
                if (i - iStart >= iMaxLength)
                    memset (m_pbBytes + y + iStart, 3, i - iStart);
                }
            }
        }
    // Any two horizontal lines too close together, remove all between stuff
    for (i = 0; i < iWidth; i++)
        {
        for (y = j = iState = 0; j < iHeight; j++, y += iWidth)
            {
            switch (iState)
                {
                case 0:
                    if (m_pbBytes[y + i] == 3)
                        {
                        iState = 1;
                        iStart = j;
                        iRef = y;
                        }
                    break;
                case 1:
                    if (m_pbBytes[y + i] != 3)
                        iState = 2;
                    else
                        {
                        iStart = j;
                        iRef = y;
                        }
                    break;
                case 2:
                    if (m_pbBytes[y + 1] == 3)
                        {
                        if (j - iStart - 1 < iMinClose)
                            {
                            for (iStart += 1, iRef += iWidth; iStart < j; iStart++, iRef += iWidth)
                                m_pbBytes(iRef + i] = 3;
```

-continued

```
                                }
                                iStart = j;
                                iRef = y;
                                iState = 1;
                                }
                            break;
                            }
                    }
            }
        // Now remove vertical lines
        for (i = 0; i < iWidth; i++)
            {
            for (y = j = 0; j < iHeight; j++, y += iWidth)
                {
                if (m_pbBytes[y + i] > 0)
                    {
                    iStart = j;
                    iRef = y;
                    for (; j < iHeight && m_pbBytes[y + i] > 0; j++, y +=
iWidth);
                    if (j - iStart >= iMaxHeight)
                        {
                        for (y = iRef, k = iStart; k < j; k++, y +=
iWidth)
                            m_pbBytes[y + i] = 3;
                        }
                    }
                }
            }
#endif
}
void CMicrRead::InitializeThresholds(int iPercentage)
{
#ifndef MICRDUMMY
        int k,
            y,
            x,
            iMin,
            iMax,
            iMaxFontWidth,
            iFirst;
        iMaxFontWidth = 0;
        for (k = 0; k < sizeof (Characters200) / sizeof (Characters200[0]); k++)
            {
            Characters200[k] . iPossible    = 0;
            Characters200[k] . iNeeded      = 0;
            Characters200[k] . iDifference  = 0;
            for (iFirst = -1, iMin = 50, iMax = y = 0; y < Characters200[k] .
iHeight; y++)
                {
                for (x = 0; x < Characters200[k] . iWidth; x++)
                    {
                    if (Characters200[k] . pbArray[y * Characters200[k] .
iWidth + x] == 1)
                        {
                        if (iFirst == -1)
                            iFirst = x;
                        Characters200[k] . iPossible += 1;
                        if (x < iMin)
                            iMin = x;
                        if (x > iMax)
                            iMax = x;
                        }
                    }
                }
            Characters200[k] . iX          = iFirst;
            Characters200[k] . iNeeded     = (Characters200[k] . iPossible *
iPercentage ) / 100;
            Characters200[k] . iDifference = Characters200 [k] . iPossible -
Characters200 [k] . iNeeded;
            Characters200[k] . iFontWidth  = iMax - iMin + 1;
            Characters200[k] . iLeftSide   = iMin;
            Characters200[k] . iRightSide  = iMax;
            if (Characters200[k] . iFontWidth > iMaxFontWidth)
                iMaxFontWidth = Characters200[k] . iFontWidth;
            }
        for (k = 0; k < sizeof (Characters200) / sizeof (Characters200[0]); k++)
            Characters200[k] . iAlignmentOffset = iMaxFontWidth -
Characters200[k] . iRightSide - 1;
```

-continued

```
            // Now do this for the 240 DPI versions
            iMaxFontWidth = 0;
            for (k = 0; k < sizeof (Characters240) / sizeof (Characters240[0]); k++)
                {
                Characters240[k] . iPossible    = 0;
                Characters240[k] . iNeeded      = 0;
                Characters240[k] . iDifference  = 0;
                for (iFirst = -1, iMin = 50, iMax = y = 0; y < Characters240[k] .
iHeight; y++)
                    {
                    for (x = 0; x < Characters240[k] . iWidth; x++)
                        {
                        if (Characters240[k] . pbArray[y * Characters240[k] .
iWidth + x] == 1)
                            {
                            if (iFirst == -1)
                                iFirst = x;
                            Characters240[k] . iPossible += 1;
                            if (x < iMin)
                                iMin = x;
                            if (x > iMax)
                                iMax = x;
                            }
                        }
                    }
                Characters240[k] . iX           = iFirst;
                Characters240[k] . iNeeded      = (Characters240[k] . iPossible *
iPercentage) / 100;
                Characters240[k] . iDifference  = Characters240[k] . iPossible -
Characters240 [k] . iNeeded;
                Characters240[k] . iFontWidth   = iMax - iMin + 1;
                Characters240[k] . iLeftSide    = iMin;
                Characters240[k] . iRightSide   = iMax;
                if (Characters240[k] . iFontWidth > iMaxFontWidth)
                    iMaxFontWidth = Characters240[k] . iFontWidth;
                }
            for (k = 0; k < sizeof (Characters240) / sizeof (Characters240[0]); k++)
                Characters240[k] . iAlignmentOffset = iMaxFontWidth -
Characters240[k] . iRightSide - 1;
#endif
}
int CMicrRead::MicrRead (PVOID pImage, BOOL fReadHigh, BOOL fDebug)
{
#ifdef MICRDUMMY
            return -1000;
#else
            TiffItemHeaderType *TiffHeader;
            TiffItemDataType   *TiffData,
                               *TiffFront = (TiffItemDataType *) NULL,
                               *TiffBack  = (TiffItemDataType *) NULL;
            TiffHeader = (TiffItemHeaderType *) pImage;
            if (TiffHeader —> usTagCount != 10)
                return -1;
            TiffData = (TiffItemDataType *) ((PBYTE) pImage + sizeof
(TiffItemHeaderType));
            if (TiffData —> usTagCount              != 14                                 ||
                TiffData —> usNewSubFileTag         != TIFF_TAG_NEW_SUBFILE_TYPE           ||
                TiffData —> usStripByByteCountsTag  != TIFF_TAG_STRIP_BYTE_COUNTS          ||
                TiffData —> usGroup4OptionsTag      != TIFF_TAG_GROUP4_OPTIONS             ||
                TiffData —> usXResolutionTag        != TIFF_TAG_X_RESOLUTION               ||
                TiffData —> ulHeightValue           < 300)
                return -1;
            if (TiffHeader —> szDocName[0] == 'F')
                TiffFront = TiffData;
            else if (TiffHeader —> szDocName[0] == 'B')
                Tiffback = TiffData;
            else
                return -1;
            if (TiffHeader —> szDocName[1] == 'F' || TiffHeader —> szDocName[1] ==
'B')
                {
                TiffData = (TiffItemDataType *) ((PBYTE) TiffData + (sizeof
(TiffItemDataType) - 1) + TiffData —> ulStripByteCountValue);
                if (TiffData —> usTagCount              != 14
||
                    TiffData —> usNewSubFileTaq         != TIFF_TAG_NEW_SUBFILE_TYPE
||
                    TiffData —> usStripByteCountsTag    != TIFF_TAG_STRIP_BYTE_COUNTS
||
```

-continued

```
                        TiffData —> usGroup4OptionsTag    != TIFF_TAG_GROUP4_OPTIONS
||
                        TiffData —> usXResolutionTag      != TIFF_TAG_X_RESOLUTION
||
                        TiffData —> ulHeightValue         < 300)
                           return −1;
                    if (TiffHeader —> szDocName[1] == 'F')
                        TiffFront = TiffData;
                    else
                        TiffBack = TiffData;
                }
            if (TiffFront == (TiffItemDataType *) NULL)
                return −1;
            if (TiffFront —> ulXRes[0] != 200 && TiffFront —> ulXRes[0] != 240)
                return −1;
            if (TiffBack != (TiffItemDataType *) NULL)
                {
                if (TiffBack —> ulXRes[0] != 200 && TiffBack —> ulXRes[0] != 240)
                    TiffBack = (TiffItemDataType *) NULL;
                }
            if (TiffBack != (TiffItemDataType *) NULL)
                return MicrRead (TiffFront —> bData,
                                 TiffFront —> ulWidthValue,
                                 TiffFront —> ulHeightValue,
                                 TiffFront —> ulXRes[0],
                                 0,
                                 TiffBack —> bData,
                                 TiffBack —> ulWidthValue,
                                 TiffBack —> ulHeightValue,
                                 TiffBack —> ulXRes[0],
                                 0,
                                 TRUE,
                                 fReadHigh,
                                 fDebug);
            else
                return MicrRead (TiffFront —> bData,
                                 TiffFront —> ulWidthValue,
                                 TiffFront —> ulHeightValue,
                                 TiffFront —> ulXRes[0],
                                 0,
                                 NULL,
                                 0,
                                 0,
                                 0,
                                 0,
                                 TRUE,
                                 fReadHigh,
                                 fDebug);
#endif
}
int CMicrRead::RejectRepair(PVOID ptrImage, RecordDefHdr *recDefHdr, PVOID
ptrRecord, IVHPATTERN hPat, BOOL fReadHigh, BOOL fDebug)
{
#ifdef MICRDUMMY
            return −1000;
#else
            BYTE        bOEMIBuffer[256];
            char        szBuffer1 [128],
                        szBuffer2 [128];
            DWORD       dwResult;
            int         iResult,
                        iRdrLengthOffset,
                        i,
                        iLength;
            if ((iResult = MicrRead (ptrImage, fReadHigh || hPat —> Pattern . Features
. flUseHighMICR, fDebug)) >= 0)
                {
                CopyRecord (recDefHdr, (PBYTE) ptrRecord, 1, SEARCH_FLG_KEYCORRECT);
                memcpy (bOEMIBuffer, "\x09\xB0\x00\x40\x00\x00\x00\x00\x01\xE0",
10);
                iRdrLengthOffset = (int) bOEMIBuffer[0] − 1;
                for (i = m_strMICR.GetLength( ) − 1; i >= 0; i−−)
                    {
                    BYTE bChar = (BYTE) m_strMICR.GetAt(i);
                    if (bChar != ' ')
                        {
                        bOEMIBuffer[bOEMIBuffer[0] + 1] = bChar;
                        bOEMIBuffer[0]                  += 1;
                        bOEMIBuffer[iRdrLengthOffset]   += 1;
```

-continued

```
            }
        }
        if (fReadHigh || hPat —> Pattern . Features . flUseHighMICR)
            {
            bOEMIBuffer[bOEMIBuffer[0] + 1] = 0x01;
            bOEMIBuffer[bOEMIBuffer[0] + 2] = 0xD8;
            bOEMIBuffer[0] += 2;
            iRdrLengthOffset = (int) bOEMIBuffer[0] - 1;
            for (i = m_strHigh.GetLength( ) - 1; i >= 0; i--)
                {
                BYTE bChar = (BYTE) m_strHigh.GetAt(i);
                if (bChar != ' ')
                    {
                    bOEMIBuffer[bOEMIBuffer[0] + 1] = bChar;
                    bOEMIBuffer[0]                  += 1;
                    bOEMIBuffer[iRdrLengthOffset]   += 1;
                    }
                }
            }
        ParseCheck (hPat, bOEMIBuffer, m_pbRecord);
        for (i = 0; i < (int) recDefHdr —> sFieldCount; i++)
            {
            if ((recDefHdr —> fldDef[i] . usFlags & DB_FFLG_EDITABLE) &&
                (recDefHdr —> fldDef[i] . usFlags & DB_FFLG_FLGBYTE))
                continue;
            iLength = (int) recDefHdr —> fldDef[i] . usFieldLength;
            if (recDefHdr —> fldDef[i] . usFlags & DB_FFLG_VARLEN)
                iLength += 1;
            if (recDefHdr —> fldDef[i] . usFlags & DB_FFLG_FLGBYTE)
                iLength += 1;
            memcpy (m_pbRecord + recDefHdr —> fldDef[i] . usOffset,
                    (PBYTE) ptrRecord + recDefHdr —> fldDef[i].
usOffset,
                    iLength);
            }
        dwResult = SearchPattern (hPat, 0, m_pbRecord,
SEARCH_FLG_KEYCORRECT, NULL);
        if (iResult > 0 ||
            (dwResult == SRCH_OK ||
            (dwResult < SRCH_INVALID_PATTERN_HANDLE     &&
             dwResult >= SRCH_EXIT_SEARCH               &&
             dwResult != SRCH_REJECT_ITEM)))
            {
            if (iResult > 0 || !(*((PUSHORT) m_pbRecord) &
DB_RFLG_REJECT))
                {
                for (i = 0; i < (int) recDefHdr —> FieldCount; i++)
                    {
                    if (!(recDefHdr —> fldDef[i] . usFlags &
DB_FFLG_EDITABLE) ||
                        !(recDefHdr —> fldDef[i] . usFlags &
DB_FFLG_FLGBYTE))
                        continue;
                    DbFieldToString (&(recDefHdr —> fldDef[i]),
                            ptrRecord,
                        szBuffer1,
                            DB_FMT_DEFAULT);
                    DbFieldToString (&(recDefHdr —> fldDef[i]),
                            (PVOID) m_pbRecord,
                        szBuffer2,
                            DB_FMT_DEFAULT);
                    if (strcmp (szBuffer1, szBuffer2) != 0)
                        {
                        if (!(*((PUSHORT) m_pbRecord) &
DB_RFLG_REJECT))
                            *(m_pbRecord + recDefHdr —> fldDef[i]
. usOffset) |= DB_DFLG_CORRECTED;
                        if (*((PUSHORT) ptrRecord) & DB_RFLG_REJECT)
                            {
                            if (!(*((PUSHORT) m_pbRecord) &
DB_RFLG_REJECT))
                                *((PUSHORT) m_pbRecord) |=
DB_RFLG_TOUCHED;
                            }
                        }
                    }
                }
            memcpy (ptrRecord, m_pbRecord, recDefHdr —>
ulMaxRecordLength);
            return iResult;
```

-continued

```
                    }
                else
                    return -1;
                }
            else
                return -1;
            }
        return iResult;
#endif
}
int CMicrRead::InlineRepair(PVOID pFront, ULONG ulLengthFront, PVOID pBack,
ULONG ulLengthBack, RecordDefHdr *recDefHdr, PVOID ptrRecord, IVHPATTERN hPat,
BOOL fReadHigh, BOOL fDebug)
{
#ifdef MICRDUMMY
        return -1000;
#else
        return GeneralInlineRepair (pFront, ulLengthFront, 0,
                                    pBack, ulLengthBack, 0,
                                            recDefHdr,
                                            ptrRecord,
                                            hPat,
                                            fReadHigh,
                                            fDebug);
#endif
}
int CMicrRead::GeneralInlineRepair(PVOID pFront, ULONG ulLengthFront, ULONG
ulOrientationFront,
                                                PVOID pBack, ULONG
ulLengthBack, ULONG ulOrientationBack,
                                            RecordDefHdr *recDefHdr,
                                            PVOID ptrRecord,
                                            IVHPATTERN hPat,
                                            BOOL fReadHigh,
                                            BOOL fDebug)
{
#ifdef MICRDUMMY
        return -1000;
#else
        BYTE            bOEMIBuffer[256];
        char            szBuffer1 [128],
                        szBuffer2 [128];
        DWORD           dwResult;
        int             iResult,
                        iRdrLengthOffset,
                        i,
                        iLength;
        PVOID           pImageFront = NULL,
                        pImageBack = NULL;
        ULONG           ulFrontWidth,
                        ulBackWidth,
                        ulFrontHeight,
                        ulBackHeight,
                        ulFrontResolution,
                        ulBackResolution;
        FillInTiffData (pFront, ulLengthFront, pImageFront, ulFrontWidth,
ulFrontHeight, ulFrontResolution);
        FillInTiffData (pBack, ulLengthBack, pImageBack, ulBackWidth,
ulBackHeight, ulBackResolution);
        iResult = MicrRead (pImageFront,
                                    ulFrontWidth,
                                    ulFrontHeight,
                                    ulFrontResolution,
                                    ulOrientationFront,
                                    pImageBack,
                                    ulBackWidth,
                                    ulBackHeight,
                                    ulBackResolution,
                                    ulOrientationBack,
                                    hPat —> Pattern . Features . flUseMICR,
                                    fReadHigh | | hPat —> Pattern . Features .
flUseHighMICR,
                                    fDebug);
        if (iResult >= 0)
            {
            CopyRecord (recDefHdr, (PBYTE) ptrRecord, 1, SEARCH_FLG_NULL);
            memcpy (bOEMIBuffer, "\x09\xB0\x00\x40\x00\x00\x00\x00\x01\xE0",
10);
            iRdrLengthOffset = (int) bOEMIBuffer[0] - 1;
```

```
            for (i = m_strMICR.GetLength( ) - 1; i >= 0; i--)
            {
                BYTE bChar = (BYTE) m_strMICR.GetAt(i);
                if (bChar != ' ')
                {
                    bOEMIBuffer[bOEMIBuffer[0] - 1] = bChar;
                    bOEMIBuffer[0]                  += 1;
                    bOEMIBuffer[iRdrLengthOffset]   += 1;
                }
            }
            if (fReadHigh || hPat —> Pattern . Features . flUseHighMICR)
            {
                bOEMIBuffer[bOEMIBuffer[0] + 1] = 0x01;
                bOEMIBuffer[bOEMIBuffer[0] + 2] = 0xD8;
                bOEMIBuffer[0] += 2;
                iRdrLengthOffset = (int) bOEMIBuffer[0] - 1;
                for (i = m_strHigh.GetLength( ) - 1; i >= 0; i--)
                {
                    BYTE bChar = (BYTE) m_strHigh.GetAt(i);
                    if (bChar != ' ')
                    {
                        bOEMIBuffer[bOEMIBuffer[0] + 1] = bChar;
                        bOEMIBuffer[0]                  += 1;
                        bOEMIBuffer[iRdrLengthOFfset]   += 1;
                    }
                }
            }
            ParseCheck (hPat, bOEMIBuffer, m_pbRecord);
            for (i = 0; i < (int) recDefHdr —> sFieldCount; i++)
            {
                if ((recDefHdr —> fldDef[i] . usFlags & DB_FFLG_EDITABLE) &&
                    (recDefHdr —> fldDef[i] . usFlags & DB_FFLG_FLGBYTE)
                    continue;
                iLength = (int) recDefHdr —> fldDef[i] . usFieldLength;
                if (recDefHdr —> fldDef[i] . usFlags & DB_FFLG_VARLEN)
                    iLength += 1;
                if (recDefHdr —> fldDef[i] . usFlags & DB_FFLG_FLGBYTE)
                    iLength += 1;
                memcpy (m_pbRecord + recDefHdr —> fldDef[i] . usOffset,
                        (PBYTE) ptrRecord + recDefHdr —> fldDef[i] . usOffset,
                        iLength);
            }
            dwResult = SearchPattern (hPat, 0, m_pbRecord, SEARCH_FLG_NULL, NULL);
            if (iResult > 0 ||
                (dwResult == SRCH_OK ||
                (dwResult < SRCH_INVALID_PATTERN_HANDLE   &&
                 dwResult >= SRCH_EXIT_SEARCH             &&
                 dwResult != SRCH_REJECT_ITEM)))
            {
                if (iResult > 0 || !(*((PUSHORT) m_pbRecord) & DB_RFLG_REJECT))
                {
                    for (i = 0; i < (int) recDefHdr —> sFieldCount; i++)
                    {
                        if (!(recDefHdr —> fldDef[i] . usFlags & DB_FFLG_EDITABLE) ||
                            !(recDefHdr —> fldDef[i] . usFlags & DB_FFLG_FLGBYTE))
                            continue;
                        DbFieldToString (&(recDefHdr —> fldDef[i]),
                                         ptrRecord,
                                         szBuffer1,
                                         DB_FMT_DEFAULT);
                        DbFieldToString (&(recDefHdr —> fldDef[i]),
                                         (PVOID) m_pbRecord,
                                         szBuffer2,
                                         DB_FMT_DEFAULT);
                        if (strcmp (szBuffer1, szBuffer2) != 0)
                        {
                            if (!(*((PUSHORT) m_pbRecord) & DB_RFLG_REJECT))
                                *(m_pbRecord + recDefHdr —> fldDef[i] . usOffset) != DB_DFLG_CORRECTED;
                            if (*((PUSHORT) ptrRecord) & DB_RFLG_REJECT)
                            {
                                if (!(*((PUSHORT) m_pbRecord) & DB_RFLG_REJECT))
```

-continued

```
                    *((PUSHORT) m_pbRecord) |=
DB_RFLG_TOUCHED;
                    }
                }
            }
            memcpy (ptrRecord, m_pbRecord, recDefHdr —>
ulMaxRecordLength);
            return iResult;
            }
        else
            return −1;
        }
    else
        return −1;
    }
    return iResult;
#endif
}
void CMicrRead::FillInTiffData (PVOID pInput,
                                LONG lLength,
                                PVOID &pData,
                                ULONG &ulWidth,
                                ULONG &ulHeight,
                                ULONG &ulResolution)
{
#ifndef MICRDUMMY
    TiffTagType         *TiffTag;
    TiffClassFHeaderType *TiffHdr = (TiffClassFHeaderType *) pInput;
    USHORT usTag;
    PUSHORT pusTagCount;
    pData       = NULL;
    ulWidth     = 0;
    ulHeight    = 0;
    ulResolution = 0;
    if (pInput == NULL)
        return;
    pusTagCount = (PUSHORT) ((PBYTE) pInput + TiffHdr —> ulIFDOffset);
    TiffTag = (TiffTagType *) ((PBYTE) pInput + TiffHdr —> ulIFDOffset +
sizeof (USHORT));
    for (usTag = 0; usTag < *pusTagCount; usTag++, TiffTag++)
        {
        switch (TiffTag —> usTag)
            {
            case TIFF_TAG_IMAGE_WIDTH:
                ulWidth = TiffTag —> ulValue;
                break;
            case TIFF_TAG_IMAGE_LENGTH:
                ulHeight = TiffTag —> ulValue;
                break;
            case TIFF_TAG_STRIP_OFFSETS:
                pData = (PVOID) ((PBYTE) pInput + TiffTag —> ulValue);
                break;
            case TIFF_TAG_X_RESOLUTION:
                ulResolution = *(PULONG) ((PBYTE) pInput + TiffTag —>
ulValue);
                break;
            case TIFF_TAG_Y_RESOLUTION:
                ulResolution = *(PULONG) ((PBYTE) pInput + TiffTag —>
ulValue);
                break;
            }
        }
#endif
}
microfont.h
BYTE bZero240 [19 * 25] = {
0,0,1,1,1,1,1,1,1,1,1,1,1,1,1,1,1,0,0,
0,1,0,0,0,0,0,0,0,0,0,0,0,0,0,0,0,1,0,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,2,2,0,0,0,0,0,2,2,0,0,0,0,1,
```

-continued

```
1,0,0,0,0,2,2,0,0,0,0,0,2,2,0,0,0,0,0,1,
1,0,0,0,2,2,2,2,0,0,0,2,2,2,2,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
0,1,0,0,0,0,0,0,0,0,0,0,0,0,0,0,0,0,1,0,
0,0,1,1,1,1,1,1,1,1,1,1,1,1,1,1,1,1,0,0,};
BYTE bOne240 [11 * 25] = {
0,0,1,1,0,0,0,0,2,0,0,
0,0,1,1,0,0,0,0,2,0,0,
0,0,0,1,1,0,0,0,2,0,0,
0,0,0,0,1,0,0,0,2,0,0,
0,0,0,0,1,0,0,0,2,0,0,
2,2,0,0,1,0,0,0,2,0,0,
2,2,0,0,1,0,0,0,2,0,0,
2,2,0,0,1,0,0,0,2,0,0,
2,2,0,0,1,0,0,0,2,0,0,
2,2,0,0,1,0,0,0,2,0,0,
2,2,0,0,1,0,0,0,2,0,0,
2,2,0,0,1,0,0,0,2,0,0,
0,0,0,0,1,0,0,0,0,0,0,
0,0,0,0,1,0,0,0,0,0,0,
0,0,0,0,1,0,0,0,0,0,0,
0,0,0,0,1,0,0,0,0,0,0,
0,0,1,1,1,1,1,1,1,1,1,
0,0,1,1,1,1,1,1,1,1,1,
0,0,1,1,1,1,1,1,1,1,1,
0,0,1,1,1,1,1,1,1,1,1,
0,0,1,1,1,1,1,1,1,1,1,
0,0,1,1,1,1,1,1,1,1,1,
0,0,1,1,1,1,1,1,1,1,1,
0,0,1,1,1,1,1,1,1,1,1,
0,0,1,1,1,1,1,1,1,1,1};
BYTE bTwo240 [11 * 24] = {
1,1,1,1,1,1,1,1,1,1,0,
0,0,0,0,0,0,0,0,0,0,1,
0,0,0,0,0,0,0,0,0,0,1,
0,0,0,0,0,0,0,0,0,0,1,
0,0,0,0,0,0,0,0,0,0,1,
2,2,2,2,2,2,0,0,0,0,1,
2,2,2,2,2,2,0,0,0,0,1,
2,2,2,2,2,2,0,0,0,0,1,
0,0,0,0,0,0,0,0,0,0,1,
0,0,0,0,0,0,0,0,0,0,1,
0,0,0,0,0,0,0,0,0,0,1,
0,0,0,0,0,0,0,0,0,0,1,
0,1,1,1,1,1,1,1,1,1,0,
1,0,0,0,0,0,0,0,0,0,0,
1,0,0,0,0,0,0,0,0,0,0,
1,0,0,0,0,0,0,0,0,0,0,
1,0,0,0,0,0,0,0,0,0,0,
1,0,0,0,0,2,2,2,2,2,2,
1,0,0,0,0,2,2,2,2,2,2,
1,0,0,0,0,0,0,0,0,0,0,
1,0,0,0,0,0,0,0,0,0,0,
1,0,0,0,0,0,0,0,0,0,0,
1,0,0,0,0,0,0,0,0,0,0,
0,1,1,1,1,1,1,1,1,1,0};
BYTE bThree240 [15 * 25] = {
0,0,0,1,1,1,1,1,1,1,1,1,0,0,0,
0,0,0,0,0,0,0,0,0,0,0,0,1,0,0,
0,0,0,0,0,0,0,0,0,0,0,0,1,0,0,
0,0,0,0,0,0,0,0,0,0,0,0,1,0,0,
0,0,0,0,0,0,0,0,0,0,0,0,1,0,0,
0,0,0,0,0,0,0,0,0,0,0,0,1,0,0,
2,0,0,0,0,0,0,0,0,0,0,0,1,0,0,
2,2,2,2,2,2,0,0,0,0,0,0,1,0,0,
2,2,2,0,0,0,0,0,0,0,0,0,1,0,0,
2,0,0,0,0,0,0,0,0,0,0,0,1,0,0,
2,0,0,0,0,0,0,0,0,0,0,0,1,0,0,
2,0,0,0,0,0,0,0,0,0,0,0,1,0,0,
2,0,0,0,0,0,0,0,0,0,0,0,1,0,0,
2,0,0,1,1,1,1,1,1,1,1,1,1,0,0,
2,0,0,0,0,0,0,0,0,0,0,0,1,0,
2,0,0,0,0,0,0,0,0,0,0,0,1,1,
```

```
2,0,0,0,0,0,0,0,0,0,0,0,0,1,1,
2,0,0,0,0,0,0,0,0,0,0,0,0,1,1,
2,2,2,0,0,0,0,0,0,0,0,0,0,1,1,
2,2,2,2,2,0,0,0,0,0,0,0,0,1,1,
2,0,0,0,0,0,0,0,0,0,0,0,0,1,1,
0,0,0,0,0,0,0,0,0,0,0,0,0,1,1,
0,0,0,0,0,0,0,0,0,0,0,0,0,1,1,
0,0,0,0,0,0,0,0,0,0,0,0,0,1,1,
0,0,0,0,0,0,0,0,0,0,0,0,0,1,1,
0,0,0,1,1,1,1,1,1,1,1,1,1,1,0};
BYTE bFour240 [19 * 24] = {
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,2,2,2,2,2,2,2,
1,1,0,0,0,0,0,0,0,0,0,0,2,2,2,2,2,2,2,
1,1,0,0,0,0,0,2,2,2,0,0,2,2,2,2,2,2,2,
1,1,0,0,0,0,0,2,2,2,0,0,2,2,2,2,2,2,2,
1,1,0,0,0,0,0,2,2,2,0,0,2,2,2,2,2,2,2,
1,1,0,0,0,0,0,2,2,2,0,0,2,2,2,2,2,2,2,
1,1,0,0,0,0,0,2,2,2,0,0,2,2,2,2,2,2,2,
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,0,0,0,0,0,0,0,
1,1,0,0,0,0,0,0,0,0,0,0,1,1,1,0,0,0,0,
1,1,0,0,0,0,0,0,0,0,0,0,1,1,1,0,0,2,2,
0,1,1,1,1,1,1,1,1,1,1,1,1,1,1,0,0,2,2,
0,1,1,1,1,1,1,1,1,1,1,1,1,1,1,0,0,2,2,
0,0,0,0,0,0,0,0,0,0,0,0,1,1,0,0,2,2,
0,0,0,0,0,0,0,0,0,0,0,0,1,1,0,0,0,0,
0,0,0,0,0,0,0,0,0,0,0,0,1,1,0,0,0,0,
2,2,2,0,0,0,2,2,2,0,0,0,1,1,0,0,0,0,
2,2,2,0,0,0,2,2,2,0,0,0,1,1,0,0,0,0};
BYTE bFive240 [13 * 26] = {
0,1,1,1,1,1,1,1,1,1,1,1,1,
1,0,0,0,0,0,0,0,0,0,0,0,0,
1,0,0,0,0,0,0,0,0,0,0,0,0,
1,0,0,0,0,0,0,0,0,0,0,0,0,
1,0,0,0,0,0,0,0,0,0,0,0,0,
1,0,0,0,0,0,0,0,0,0,0,0,0,
1,0,0,0,0,0,0,2,2,2,2,2,2,
1,0,0,0,0,0,0,2,2,2,2,2,2,
1,0,0,0,0,0,0,2,2,2,2,2,2,
1,0,0,0,0,0,0,0,0,0,0,0,0,
1,0,0,0,0,0,0,0,0,0,0,0,0,
1,0,0,0,0,0,0,0,0,0,0,0,0,
1,0,0,0,0,0,0,0,0,0,0,0,0,
0,1,1,1,1,1,1,1,1,1,1,1,0,
0,0,0,0,0,0,0,0,0,0,0,0,1,
0,0,0,0,0,0,0,0,0,0,0,0,1,
0,0,0,0,0,0,0,0,0,0,0,0,1,
0,0,0,0,0,0,0,0,0,0,0,0,1,
2,2,2,2,2,2,0,0,0,0,0,0,1,
2,2,2,2,2,2,0,0,0,0,0,0,1,
2,2,2,2,2,2,0,0,0,0,0,0,1,
2,2,2,2,2,2,0,0,0,0,0,0,1,
0,0,0,0,0,0,0,0,0,0,0,0,1,
0,0,0,0,0,0,0,0,0,0,0,0,1,
0,0,0,0,0,0,0,0,0,0,0,0,1,
0,0,0,0,0,0,0,0,0,0,0,0,1,
1,1,1,1,1,1,1,1,1,1,1,1,0};
BYTE bSix240 [17 * 25] = {
0,1,1,1,1,1,1,1,1,0,0,0,0,0,0,0,0,
1,0,0,0,0,0,0,0,0,1,0,0,0,0,0,0,0,
1,0,0,0,0,0,0,0,0,1,0,0,0,0,0,0,0,
1,0,0,0,0,0,0,0,0,1,0,0,0,0,0,0,0,
1,0,0,0,0,0,0,0,0,1,0,0,0,0,0,2,2,
1,0,0,0,0,0,0,0,0,1,0,0,0,0,0,2,2,
1,0,0,0,0,0,0,0,0,1,0,0,0,0,0,2,2,
1,0,0,0,0,0,0,0,0,1,0,0,0,0,0,2,2,
1,0,0,0,0,0,0,0,0,1,0,0,0,0,0,2,2,
1,0,0,0,0,2,2,2,0,0,0,0,0,0,0,2,2,
1,0,0,0,0,2,2,2,0,0,0,0,0,0,0,2,2,
1,0,0,0,0,0,0,0,0,0,0,0,0,0,0,0,0,
1,0,0,0,0,0,0,0,0,0,0,0,0,0,0,0,0,
1,0,0,0,0,0,0,0,0,0,0,0,0,0,0,0,0,
1,0,0,0,0,0,0,0,0,0,0,0,0,0,0,0,0,
1,1,1,1,1,1,1,1,1,1,1,1,1,1,1,0,0,
```

```
1,0,0,0,0,0,0,0,0,0,0,0,0,0,1,0,
1,0,0,0,0,0,0,0,0,0,0,0,0,0,0,1,
1,0,0,0,0,0,0,0,0,0,0,0,0,0,0,1,
1,0,0,0,0,0,0,0,0,0,0,0,0,0,0,1,
1,0,0,0,0,0,2,2,2,2,2,0,0,0,0,1,
1,0,0,0,0,0,0,0,0,0,0,0,0,0,0,1,
1,0,0,0,0,0,0,0,0,0,0,0,0,0,0,1,
1,0,0,0,0,0,0,0,0,0,0,0,0,0,0,1,
0,1,1,1,1,1,1,1,1,1,1,1,1,1,1,0};
BYTE bSeven240 [14 * 25] = {
0,1,1,1,1,1,1,1,1,1,1,1,1,0,
1,0,0,0,0,0,0,0,0,0,0,0,0,1,
1,0,0,0,0,0,0,0,0,0,0,0,0,1,
1,0,0,0,0,0,0,0,0,0,0,0,0,1,
1,0,0,0,0,2,2,2,2,0,0,0,0,1,
1,0,0,0,0,2,2,2,2,0,0,0,0,1,
0,0,0,0,0,2,2,2,2,0,0,0,0,1,
0,0,0,0,0,2,2,0,0,0,0,0,0,1,
0,0,0,0,2,2,2,0,0,0,0,0,0,1,
0,0,0,2,0,0,0,0,0,0,0,0,0,1,
0,0,2,0,0,0,0,0,0,0,0,1,0,
0,2,0,0,0,0,0,0,0,0,1,1,0,0,
2,2,0,0,0,0,0,0,1,1,0,0,0,0,
2,0,0,0,0,0,0,1,0,0,0,0,0,0,
2,0,0,0,0,0,1,0,0,0,0,0,0,0,
2,0,0,0,0,0,1,0,0,0,0,0,0,0,
2,0,0,0,0,0,1,0,0,0,0,0,0,0,
2,0,0,0,0,0,1,0,0,0,0,0,0,2,
2,0,0,0,0,0,1,0,0,0,0,0,0,2,
2,0,0,0,0,0,1,0,0,0,0,0,0,2,
2,0,0,0,0,0,1,0,0,0,0,0,0,2,
2,0,0,0,0,0,1,0,0,0,0,0,0,2,
2,0,0,0,0,0,1,0,0,0,0,0,0,2,
2,0,0,0,0,0,1,0,0,0,0,0,0,2,
2,0,0,0,0,0,1,0,0,0,0,0,0,2};
BYTE bEight240 [17 * 25] = {
0,0,0,1,1,1,1,1,1,1,1,1,1,1,0,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,2,2,2,0,0,0,0,1,0,0,
0,0,1,0,0,0,0,2,2,2,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,0,0,0,0,0,0,0,0,0,0,0,1,0,0,
0,0,1,1,1,1,1,1,1,1,1,1,1,1,1,0,0,
0,1,0,0,0,0,0,0,0,0,0,0,0,0,0,1,0,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,2,2,2,2,2,0,0,0,0,1,
1,0,0,0,0,0,0,2,2,2,2,2,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
0,1,1,1,1,1,1,1,1,1,1,1,1,1,1,1,0};
BYTE bNine240 [17 * 25] = {
0,1,1,1,1,1,1,1,1,1,1,1,1,1,1,1,0,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,2,2,2,2,2,0,0,0,0,1,
1,0,0,0,0,0,0,2,2,2,2,2,0,0,0,0,1,
1,0,0,0,0,0,0,2,2,2,2,2,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
0,1,1,1,1,1,1,1,1,1,1,1,1,1,1,1,0,
0,0,0,0,0,0,0,0,0,0,0,0,0,0,1,1,0,
0,0,0,0,0,0,0,0,0,0,0,0,0,0,1,1,0,
0,0,0,0,0,0,0,0,0,0,0,0,0,0,1,1,0,
0,0,0,0,0,0,0,0,0,0,0,0,0,0,1,1,0,
```

```
0,0,0,0,0,0,0,0,0,0,0,0,0,0,1,1,0,
0,0,0,0,0,0,2,2,2,0,0,0,0,0,1,1,0,
0,0,0,0,0,0,2,2,2,0,0,0,0,0,1,1,0,
0,0,0,0,0,0,2,2,2,0,0,0,0,0,1,1,0,
2,2,0,0,0,0,0,0,0,0,0,0,0,0,1,1,0,
2,2,0,0,0,0,0,0,0,0,0,0,0,0,1,1,0,
2,2,0,0,0,0,0,0,0,0,0,0,0,0,1,1,0,
2,2,0,0,0,0,0,0,0,0,0,0,0,0,1,1,0};
BYTE bTR240 [18 * 25] = {
0,0,0,0,0,0,0,0,0,0,0,0,1,1,1,1,1,1,
0,0,0,0,0,0,0,0,0,0,0,0,1,1,1,1,1,1,
0,0,0,0,0,0,0,0,0,0,0,0,1,1,1,1,1,1,
0,0,0,0,0,0,0,0,0,0,0,0,1,1,1,1,1,1,
1,1,0,0,0,0,0,0,0,0,0,0,1,1,1,1,1,1,
1,1,0,0,0,0,0,0,0,0,0,0,1,1,1,1,1,1,
1,1,0,0,0,0,2,2,0,0,0,0,1,1,1,1,1,1,
1,1,0,0,0,0,2,2,0,0,0,0,1,1,1,1,1,1,
1,1,0,0,0,0,2,2,0,0,0,0,0,0,0,0,0,0,
1,1,0,0,0,0,2,2,0,0,0,0,0,0,0,0,0,0,
1,1,0,0,0,0,2,2,0,0,0,0,0,0,0,0,0,0,
1,1,0,0,0,0,2,2,0,0,0,0,0,0,0,0,0,0,
1,1,0,0,0,0,2,2,0,0,0,0,2,2,2,2,2,2,
1,1,0,0,0,0,2,2,0,0,0,0,2,2,2,2,2,2,
1,1,0,0,0,0,2,2,0,0,0,0,2,2,2,2,2,2,
1,1,0,0,0,0,2,2,0,0,0,0,0,0,0,0,0,0,
1,1,0,0,0,0,2,2,0,0,0,0,0,0,0,0,0,0,
1,1,0,0,0,0,2,2,0,0,0,0,0,0,0,0,0,0,
1,1,0,0,0,0,2,2,0,0,0,0,0,0,0,0,0,0,
1,1,0,0,0,0,2,2,0,0,0,0,1,1,1,1,1,1,
1,1,0,0,0,0,2,2,0,0,0,0,1,1,1,1,1,1,
1,1,0,0,0,0,2,2,0,0,0,0,1,1,1,1,1,1,
0,0,0,0,0,0,2,2,0,0,0,0,1,1,1,1,1,1,
0,0,0,0,0,0,2,2,0,0,0,0,1,1,1,1,1,1,
0,0,0,0,0,0,2,2,0,0,0,0,1,1,1,1,1,1,
0,0,0,0,0,0,2,2,0,0,0,0,1,1,1,1,1,1};
BYTE bOnus240 [19 * 21] = {
0,0,0,0,0,0,0,0,0,0,0,0,0,0,1,1,1,1,1,
0,0,0,0,0,0,0,0,0,0,0,0,0,0,1,1,1,1,1,
0,0,0,0,0,0,0,0,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,1,1,1,1,1,
1,1,0,0,0,0,1,1,0,0,0,0,0,0,0,0,0,0,0,
1,1,0,0,0,0,1,1,0,0,0,0,0,0,0,0,0,0,0,
1,1,0,0,0,0,1,1,0,0,0,0,0,0,0,0,0,0,0,
1,1,0,0,0,0,1,1,0,0,0,0,0,0,0,0,0,0,0,
1,1,0,0,0,0,1,1,0,0,0,0,0,0,0,0,0,0,0,
1,1,0,0,0,0,1,1,0,0,0,0,0,0,2,2,2,2,2,
1,1,0,0,0,0,1,1,0,0,0,0,0,0,2,2,2,2,2,
1,1,0,0,0,0,1,1,0,0,0,0,0,0,2,2,2,2,2,
0,0,0,0,0,0,0,0,0,0,0,0,0,0,2,2,2,2,2,
0,0,0,0,0,0,0,0,0,0,0,0,0,0,2,2,2,2,2,
0,0,0,0,0,0,0,0,0,0,0,0,0,0,2,2,2,2,2};
BYTE bAmount240 [18 * 24] = {
2,2,2,2,0,0,0,0,0,0,0,0,0,0,0,0,1,1,
2,2,2,2,0,0,0,0,0,0,0,0,0,0,0,0,1,1,
2,2,2,2,0,0,0,0,0,0,0,0,0,0,0,0,1,1,
2,2,2,2,0,0,0,0,0,0,0,0,0,0,0,0,1,1,
2,2,2,2,0,0,0,0,0,0,0,0,0,0,0,0,1,1,
0,0,0,2,0,0,0,0,0,0,0,0,0,0,0,0,1,1,
0,0,0,2,0,0,0,0,0,0,0,0,0,0,0,0,1,1,
0,0,0,2,0,0,0,0,1,1,0,0,0,0,0,0,1,1,
0,0,0,2,0,0,0,0,1,1,0,0,0,0,0,0,1,1,
0,0,0,2,0,0,0,0,1,1,0,0,0,0,0,0,1,1,
0,0,0,0,0,0,0,0,1,1,0,0,0,0,0,0,0,0,
0,0,0,0,0,0,0,0,1,1,0,0,0,0,0,0,0,0,
0,0,0,0,0,0,0,0,1,1,0,0,0,0,0,0,0,0,
0,0,0,0,0,0,0,0,1,1,0,0,0,0,2,0,0,0,
1,1,0,0,0,0,0,0,1,1,0,0,0,0,2,0,0,0,
1,1,0,0,0,0,0,0,1,1,0,0,0,0,2,0,0,0,
1,1,0,0,0,0,0,0,1,1,0,0,0,0,2,0,0,0,
1,1,0,0,0,0,0,0,1,1,0,0,0,0,2,0,0,0,
1,1,0,0,0,0,0,0,0,0,0,0,0,0,2,0,0,0,
1,1,0,0,0,0,0,0,0,0,0,0,0,0,2,2,2,2,
1,1,0,0,0,0,0,0,0,0,0,0,0,0,2,2,2,2,
1,1,0,0,0,0,0,0,0,0,0,0,0,0,2,2,2,2,
```

-continued

```
1,1,0,0,0,0,0,0,0,0,0,0,0,0,2,2,2,2,
1,1,0,0,0,0,0,0,0,0,0,0,0,0,2,2,2,2};
BYTE bHyphen240 [20 * 13] = {
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
1,1,1,0,0,2,0,0,0,1,1,1,0,0,2,0,0,0,1,0,
0,0,0,0,0,2,0,0,0,0,0,0,0,0,2,0,0,0,0,0,
0,0,0,0,0,2,0,0,0,0,0,0,0,0,2,0,0,0,0,0,
2,2,2,0,0,2,0,0,0,2,2,2,0,0,2,0,0,0,2,0,
    };
typedef struct
    {
        PBYTE   pbArray;
        int     iWidth;
        int     iHeight;
        int     iX;
        int     iY;
        char    cCharacter;
        int     iPossible;
        int     iNeeded;
        int     iDifference;
        int     iRelaxedPercentage;
        int     iAlignmentOffset;
        int     iFontWidth;
        int     iLeftSide;
        int     iRightSide;
        int     iPriority;
    } CharacterType;
CharacterType Characters240 [ ] =
        {
            {bZero240,    19, 25,  2, 0, '0', 0, 0, 0, 87, 0, 0, 0, 0,  7};
            {bOne240,     11, 25,  2, 1, '1', 0, 0, 0, 87, 0, 0, 0, 0,  1},
            {bTwo240,     11, 24,  0, 0, '2', 0, 0, 0, 87, 0, 0, 0, 0,  3},
            {bThree240,   15, 25,  3, 0, '3', 0, 0, 0, 87, 0, 0, 0, 0,  7};
            {bFour240,    19, 24,  0, 1, '4', 0, 0, 0, 87, 0, 0, 0, 0,  4},
            {bFive240,    13, 26,  1, 0, '5', 0, 0, 0, 87, 0, 0, 0, 0,  3},
            {bSix240,     17, 25,  1, 0, '6', 0, 0, 0, 87, 0, 0, 0, 0,  6},
            {bSeven240,   14, 25,  1, 0, '7', 0, 0, 0, 90, 0, 0, 0, 0,  2},
            {bEight240,   17, 25,  3, 0, '8', 0, 0, 0, 87, 0, 0, 0, 0,  8},
            {bNine240,    17, 25,  1, 1, '9', 0, 0, 0, 87, 0, 0, 0, 0,  5},
            {bTR240,      18, 25, 12, 3, '<', 0, 0, 0, 87, 0, 0, 0, 0,  2},
            {bOnus240,    19, 21, 15, 3, '#', 0, 0, 0, 87, 0, 0, 0, 0,  2},
            {bAmount240,  18, 24, 17, 0, '$', 0, 0, 0, 87, 0, 0, 0, 0,  2},
            {bHyphen240,  20, 13,  0, 6, '-', 0, 0, 0, 87, 0, 0, 0, 0,  9}
        };
typedef struct
    {
        int     iX;
        int     iY;
        int     iIndex;
        int     iScore;
        int     iPriority;
        char    cCharacter;
        char    cInsertBefore;
        char    cInsertAfter;
        BOOL    fValid;
        BOOL    fHidden;
        BOOL    fShadow;
    } MICRResultType;
BYTE bZero [17 * 21] = {
0,0,0,1,1,1,1,1,1,1,1,1,1,0,0,0,0,
0,0,1,0,0,0,0,0,0,0,0,0,0,0,1,0,0,
0,1,0,0,0,0,0,0,0,0,0,0,0,0,0,1,0,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,2,2,0,0,0,0,0,0,2,2,0,0,1,
1,0,0,0,0,0,0,0,0,0,0,0,0,0,0,0,1,
```

```
1,0,0,0,0,0,0,0,0,0,0,0,0,0,0,1,
1,0,0,0,0,0,0,0,0,0,0,0,0,0,0,1,
1,0,0,0,0,0,0,0,0,0,0,0,0,0,0,1,
1,0,0,0,0,0,0,0,0,0,0,0,0,0,0,1,
1,0,0,0,0,0,0,0,0,0,0,0,0,0,0,1,
1,0,0,0,0,0,0,0,0,0,0,0,0,0,0,1,
0,1,0,0,0,0,0,0,0,0,0,0,0,0,1,0,
0,0,1,0,0,0,0,0,0,0,0,0,0,1,0,0,
0,0,0,1,1,1,1,1,1,1,1,1,1,0,0,0};
BYTE bOne [13 * 21] = {
0,0,1,1,0,0,0,0,2,0,0,0,0,
0,0,1,1,0,0,0,0,2,0,0,0,0,
0,0,0,1,1,0,0,0,2,0,0,0,0,
0,0,0,0,1,0,0,0,2,0,0,0,0,
2,2,0,0,1,0,0,0,2,0,0,0,0,
2,2,0,0,1,0,0,0,2,0,0,0,0,
2,2,0,0,1,0,0,0,2,0,0,0,0,
2,2,0,0,1,0,0,0,2,0,0,0,0,
2,2,0,0,1,0,0,0,2,0,0,0,0,
2,2,0,0,1,0,0,0,2,0,0,0,0,
2,2,0,0,1,0,0,0,2,0,0,0,2,
0,0,0,0,1,0,0,0,0,0,0,0,2,
0,0,0,0,1,0,0,0,0,0,0,0,2,
0,0,0,0,1,1,1,0,0,0,0,0,2,
0,0,1,1,1,1,1,1,1,1,0,0,2,
0,0,1,1,1,1,1,1,1,1,0,0,2,
0,0,1,1,1,1,1,1,1,1,0,0,2,
0,0,1,1,1,1,1,1,1,1,0,0,2,
0,0,1,1,1,1,1,1,1,1,0,0,2,
0,0,1,1,1,1,1,1,1,1,0,0,2,
0,0,1,1,1,1,1,1,1,1,0,0,2};
BYTE bTwo [8 * 21] = {
1,1,1,1,1,1,1,1,
0,0,0,0,0,0,0,1,
0,0,0,0,0,0,0,1,
0,0,0,0,0,0,0,1,
2,2,2,2,0,0,0,1,
2,2,2,2,0,0,0,1,
2,2,2,2,0,0,0,1,
0,0,0,0,0,0,0,1,
0,0,0,0,0,0,0,1,
0,0,0,0,0,0,0,1,
1,1,1,1,1,1,1,1,
1,0,0,0,0,0,0,0,
1,0,0,0,0,0,0,0,
1,0,0,0,0,0,0,0,
1,0,0,0,2,2,2,2,
1,0,0,0,2,2,2,2,
1,0,0,0,2,2,2,2,
1,0,0,0,0,0,0,0,
1,0,0,0,0,0,0,0,
1,0,0,0,0,0,0,0,
1,1,1,1,1,1,1,1};
BYTE bThree [13 * 22] = {
0,0,0,1,1,1,1,1,1,1,1,0,0,
0,0,0,0,0,0,0,0,0,0,1,0,0,
0,0,0,0,0,0,0,0,0,0,1,0,0,
0,0,0,0,0,0,0,0,0,0,1,0,0,
0,0,2,2,2,0,0,0,0,0,1,0,0,
2,2,2,2,2,0,0,0,0,0,1,0,0,
2,2,0,0,0,0,0,0,0,0,1,0,0,
2,0,0,0,0,0,0,0,0,0,1,0,0,
2,0,0,0,0,0,0,0,0,0,1,0,0,
2,0,0,0,0,0,0,0,0,0,1,0,0,
2,0,0,1,1,1,1,1,1,1,1,0,
2,0,0,0,0,0,0,0,0,0,0,0,1,
2,2,0,0,0,0,0,0,0,0,0,1,1,
2,2,2,2,0,0,0,0,0,0,0,1,1,
2,2,2,2,0,0,0,0,0,0,0,1,1,
2,2,0,0,0,0,0,0,0,0,0,1,1,
0,0,0,0,0,0,0,0,0,0,0,1,1,
0,0,0,0,0,0,0,0,0,0,0,1,1,
0,0,0,0,0,0,0,0,0,0,0,1,1,
0,0,0,0,0,0,0,0,0,0,0,1,1,
0,0,0,1,1,1,1,1,1,1,1,1,};
BYTE bFour [17 * 21] = {
1,1,0,0,0,0,0,0,0,0,0,0,0,0,0,
1,1,0,0,0,0,0,0,0,0,0,0,0,0,0,
1,1,0,0,0,0,0,0,0,2,2,2,2,2,2,2,
```

```
1,1,0,0,2,2,2,0,0,0,2,2,2,2,2,2,2,2,
1,1,0,0,2,2,2,0,0,0,2,2,2,2,2,2,2,2,
1,1,0,0,2,2,2,0,0,0,2,2,2,2,2,2,2,2,
1,1,0,0,0,0,0,0,0,0,0,0,0,0,0,0,0,0,
1,1,0,0,0,0,0,0,0,0,0,0,0,0,0,0,0,0,
1,1,0,0,0,0,0,0,0,0,0,0,0,0,0,0,0,0,
1,1,0,0,0,0,0,0,0,0,0,0,0,0,0,0,0,0,
1,1,0,0,0,0,0,0,0,0,0,0,0,0,0,0,0,0,
1,1,0,0,0,0,0,0,0,0,0,0,0,0,0,0,0,0,
1,1,0,0,0,0,0,0,0,0,1,1,1,0,0,2,2,
1,1,0,0,0,0,0,0,0,0,1,1,1,0,0,2,2,
1,1,0,0,0,0,0,0,0,0,1,1,1,0,0,2,2,
1,1,1,1,1,1,1,1,1,1,1,1,1,0,0,2,2,
0,0,0,0,0,0,0,0,0,0,1,1,1,0,0,2,2,
0,0,0,0,0,0,0,0,0,0,1,1,1,0,0,2,2,
0,0,0,0,0,2,2,2,0,0,1,1,1,0,0,0,0,
2,2,0,0,0,2,2,2,0,0,1,1,1,0,0,0,0,
2,2,0,0,0,2,2,2,0,0,1,1,1,0,0,0,0};
BYTE bFive [12 * 21] = 55
0,1,1,1,1,1,1,1,1,1,1,0,
1,0,0,0,0,0,0,0,0,0,0,0,
1,0,0,0,0,0,0,0,0,0,0,0,
1,0,0,0,0,0,0,0,0,0,0,0,
1,0,0,0,0,0,0,2,2,2,2,2,
1,0,0,0,0,0,0,2,2,2,2,2,
1,0,0,0,0,0,0,2,2,2,2,2,
1,0,0,0,0,0,0,0,0,0,0,0,
1,0,0,0,0,0,0,0,0,0,0,0,
1,0,0,0,0,0,0,0,0,0,0,0,
0,1,1,1,1,1,1,1,1,1,1,0,
0,0,0,0,0,0,0,0,0,0,0,1,
0,0,0,0,0,0,0,0,0,0,0,1,
0,0,0,0,0,0,0,0,0,0,0,1,
2,2,2,2,2,0,0,0,0,0,0,1,
2,2,2,2,2,0,0,0,0,0,0,1,
2,2,2,2,2,0,0,0,0,0,0,1,
0,0,0,0,0,0,0,0,0,0,0,1,
0,0,0,0,0,0,0,0,0,0,0,1,
0,0,0,0,0,0,0,0,0,0,0,1,
1,1,1,1,1,1,1,1,1,1,1,0};
BYTE bSix [14 * 22] = {
0,0,1,1,1,1,1,1,0,0,0,0,0,0,
0,1,1,1,1,1,1,1,1,0,0,0,0,0,
1,0,0,0,0,0,0,1,1,0,0,0,0,0,
1,0,0,0,0,0,0,1,1,0,0,0,0,0,
1,0,0,0,0,0,0,1,1,0,0,0,0,0,
1,0,0,0,0,0,0,0,0,0,0,0,0,0,
1,0,0,0,0,0,0,0,0,0,0,0,0,0,
1,0,0,0,0,0,0,0,0,0,0,0,2,2,
1,0,0,0,0,0,0,0,0,0,0,0,2,2,
1,0,0,0,2,2,0,0,0,0,0,0,2,2,
1,0,0,0,2,2,0,0,0,0,0,0,2,2,
1,0,0,0,0,0,0,0,0,0,0,0,0,0,
1,0,0,0,0,0,0,0,0,0,0,0,0,0,
1,0,0,0,0,0,0,0,0,0,0,0,0,0,
1,1,1,1,1,1,1,1,1,1,1,1,1,0,
1,0,0,0,0,0,0,0,0,0,0,0,0,1,
1,0,0,0,0,0,0,0,0,0,0,0,0,1,
1,0,0,0,0,2,2,2,2,0,0,0,0,1,
1,0,0,0,0,0,0,0,0,0,0,0,0,1,
1,0,0,0,0,0,0,0,0,0,0,0,0,1,
1,0,0,0,0,0,0,0,0,0,0,0,1,0,
0,1,1,1,1,1,1,1,1,1,1,1,0,0,};
BYTE bSeven [10 * 21] = {
0,1,1,1,1,1,1,1,1,0,
1,0,0,0,0,0,0,0,0,1,
1,0,0,0,0,0,0,0,0,1,
1,0,0,0,0,0,0,0,0,1,
1,0,0,0,2,2,0,0,0,1,
1,0,0,0,2,2,0,0,0,1,
1,0,0,0,2,2,0,0,0,1,
0,0,0,0,2,0,0,0,0,1,
0,2,2,0,0,0,0,0,0,1,
2,2,2,0,0,0,0,1,1,0,
2,0,0,0,0,0,1,1,0,0,
2,0,0,0,1,1,0,0,0,0,
2,0,0,0,1,1,0,0,0,0,
2,0,0,0,1,1,0,0,0,0,
2,0,0,0,1,1,0,0,0,0,
2,0,0,0,1,1,0,0,0,2,
```

```
2,0,0,0,1,1,0,0,0,2,
2,0,0,0,1,1,0,0,0,2,
2,0,0,0,1,1,0,0,0,2,
2,0,0,0,1,1,0,0,0,2,
2,0,0,0,1,1,0,0,0,2};
BYTE bEight [16 * 21] = {
0,0,0,1,1,1,1,1,1,1,1,1,1,0,0,0,
0,0,1,0,0,0,0,0,0,0,0,0,0,1,0,0,
0,0,1,0,0,0,0,0,0,0,0,0,0,1,0,0,
0,0,1,0,0,0,0,0,0,0,0,0,0,1,0,0,
0,0,1,0,0,0,0,0,0,0,0,0,0,1,0,0,
0,0,1,0,0,0,2,2,2,0,0,0,0,1,0,0,
0,0,1,0,0,0,2,2,2,0,0,0,0,1,0,0,
0,0,1,0,0,0,2,2,2,0,0,0,0,1,0,0,
0,0,1,0,0,0,0,0,0,0,0,0,0,1,0,0,
0,0,1,0,0,0,0,0,0,0,0,0,0,1,0,0,
0,0,1,0,0,0,0,0,0,0,0,0,0,1,0,0,
0,0,1,1,1,1,1,1,1,1,1,1,1,1,0,0,
0,1,0,0,0,0,0,0,0,0,0,0,0,0,1,0,
1,1,0,0,0,0,0,0,0,0,0,0,0,0,1,1,
1,1,0,0,0,0,0,0,0,0,0,0,0,0,1,1,
1,1,0,0,0,0,2,2,2,2,0,0,0,0,1,1,
1,1,0,0,0,0,2,2,2,2,0,0,0,0,1,1,
1,1,0,0,0,0,2,2,2,2,0,0,0,0,1,1,
1,1,0,0,0,0,0,0,0,0,0,0,0,0,1,1,
1,1,0,0,0,0,0,0,0,0,0,0,0,0,1,1,
0,1,0,0,0,0,0,0,0,0,0,0,0,0,1,0,
0,0,1,1,1,1,1,1,1,1,1,1,1,1,0,0};
BYTE bNine [13 * 20] = {
0,1,1,1,1,1,1,1,1,1,1,1,0,
1,0,0,0,0,0,0,0,0,0,0,0,1,
1,0,0,0,0,0,0,0,0,0,0,0,1,
1,0,0,0,0,0,0,0,0,0,0,0,1,
1,0,0,0,0,0,2,0,0,0,0,0,1,
1,0,0,0,0,0,2,2,2,0,0,0,1,
1,0,0,0,0,0,2,0,0,0,0,0,1,
1,0,0,0,0,0,0,0,0,0,0,0,1,
1,0,0,0,0,0,0,0,0,0,0,0,1,
1,0,0,0,0,0,0,0,0,0,0,0,1,
0,1,1,1,1,1,1,1,1,1,1,1,0,
0,0,0,0,0,0,0,0,0,0,1,0,0,
0,0,0,0,0,0,0,0,0,0,1,0,0,
0,0,0,0,0,0,0,0,0,0,1,0,0,
0,0,0,0,0,0,0,0,0,0,1,0,0,
0,0,0,0,0,2,2,0,0,0,1,0,0,
0,0,0,0,0,0,0,0,0,0,1,0,0,
2,2,0,0,0,0,0,0,0,0,1,0,0,
2,2,0,0,0,0,0,0,0,0,1,0,0,
2,2,0,0,0,0,0,0,0,0,1,0,0};
BYTE bTR [16 * 21] = 55
0,0,0,0,0,0,0,0,0,0,0,1,1,1,1,1,
0,0,0,0,0,0,0,0,0,0,0,1,1,1,1,1,
0,0,0,0,0,0,0,0,0,0,0,1,1,1,1,1,
1,1,0,0,0,0,0,0,0,0,0,1,1,1,1,1,
1,1,0,0,0,0,0,0,0,0,0,1,1,1,1,1,
1,1,0,0,0,0,0,0,0,0,0,1,1,1,1,1,
1,1,0,0,0,2,2,0,0,0,0,1,1,1,1,1,
1,1,0,0,0,2,2,0,0,0,0,0,0,0,0,0,
1,1,0,0,0,2,2,0,0,0,0,0,0,0,0,0,
1,1,0,0,0,2,2,0,0,0,0,0,0,0,0,0,
1,1,0,0,0,2,2,0,0,0,0,2,2,2,2,2,
1,1,0,0,0,2,2,0,0,0,0,2,2,2,2,2,
1,1,0,0,0,2,2,0,0,0,0,2,2,2,2,2,
1,1,0,0,0,2,2,0,0,0,0,0,0,0,0,0,
1,1,0,0,0,2,2,0,0,0,0,0,0,0,0,0,
1,1,0,0,0,2,2,0,0,0,0,0,0,0,0,0,
1,1,0,0,0,2,2,0,0,0,0,1,1,1,1,1,
1,1,0,0,0,2,2,0,0,0,0,1,1,1,1,1,
1,1,0,0,0,2,2,0,0,0,0,1,1,1,1,1,
0,0,0,0,0,2,2,0,0,0,0,1,1,1,1,1,
0,0,0,0,0,2,2,0,0,0,0,1,1,1,1,1,
0,0,0,0,0,2,2,0,0,0,0,1,1,1,1,1};
BYTE bOnus [18 * 20] = {
0,0,0,0,0,0,0,0,0,0,0,1,1,1,1,1,1,
0,0,0,0,0,0,0,0,0,0,0,1,1,1,1,1,1,
0,1,1,0,0,0,1,1,0,0,0,1,1,1,1,1,1,
0,1,1,0,0,0,1,1,0,0,0,1,1,1,1,1,1,
0,1,1,0,0,0,1,1,0,0,0,1,1,1,1,1,1,
0,1,1,0,0,0,1,1,0,0,0,1,1,1,1,1,1,
0,1,1,0,0,0,1,1,0,0,0,1,1,1,1,1,1,
0,1,1,0,0,0,1,1,0,0,0,1,1,1,1,1,1,
```

-continued

```
0,1,1,0,0,0,1,1,0,0,0,0,1,1,1,1,1,1,
0,1,1,0,0,0,1,1,0,0,0,0,0,0,0,0,0,0,
0,1,1,0,0,0,1,1,0,0,0,0,0,0,0,0,0,0,
0,1,1,0,0,0,1,1,0,0,0,0,0,0,0,0,0,0,
0,1,1,0,0,0,1,1,0,0,0,0,0,0,0,0,0,0,
0,1,1,0,0,0,1,1,0,0,0,0,2,2,2,2,2,2,
0,1,1,0,0,0,1,1,0,0,0,0,2,2,2,2,0,0,
0,1,1,0,0,0,1,1,0,0,0,0,2,2,2,2,0,0,
0,0,0,0,0,0,0,0,0,0,0,0,2,2,2,2,0,0,
0,0,0,0,0,0,0,0,0,0,0,0,0,2,2,2,0,0,
0,0,0,0,0,0,0,0,0,0,0,0,0,2,2,2,0,0,
0,0,0,0,0,0,0,0,0,0,0,0,0,2,2,2,0,0};
BYTE bAmount [15 * 20] = {
2,2,2,2,0,0,0,0,0,0,0,0,0,1,1,
2,2,2,2,0,0,0,0,0,0,0,0,0,1,1,
2,2,2,2,0,0,0,0,0,0,0,0,0,1,1,
2,2,2,2,0,0,0,0,0,0,0,0,0,1,1,
2,2,2,2,0,0,0,0,0,0,0,0,0,1,1,
2,2,2,2,0,0,0,0,0,0,0,0,0,1,1,
0,0,0,2,0,0,0,1,0,0,0,0,0,1,1,
0,0,0,2,0,0,0,1,0,0,0,0,0,1,1,
0,0,0,2,0,0,0,1,0,0,0,0,0,0,0,
0,0,0,0,0,0,0,1,0,0,0,0,0,0,0,
0,0,0,0,0,0,0,1,0,0,0,0,0,0,0,
0,0,0,0,0,0,0,1,0,0,0,2,0,0,0,
0,0,0,0,0,0,0,1,0,0,0,2,0,0,0,
1,1,0,0,0,0,0,1,0,0,0,2,0,0,0,
1,1,0,0,0,0,0,1,0,0,0,2,2,2,2,
1,1,0,0,0,0,0,0,0,0,0,2,2,2,2,
1,1,0,0,0,0,0,0,0,0,0,2,2,2,2,
1,1,0,0,0,0,0,0,0,0,0,2,2,2,2,
1,1,0,0,0,0,0,0,0,0,0,2,2,2,2,
1,1,0,0,0,0,0,0,0,0,0,2,2,2,2};
BYTE bHyphen [18 * 21] = {
1,1,1,0,0,0,0,0,1,1,1,0,0,0,0,0,1,0,
1,1,1,0,0,0,0,0,1,1,1,0,0,0,0,0,1,0,
1,1,1,0,0,0,0,0,1,1,1,0,0,0,0,0,1,0,
1,1,1,0,0,2,0,0,1,1,1,0,0,2,0,0,1,0,
1,1,1,0,0,2,0,0,1,1,1,0,0,2,0,0,1,0,
1,1,1,0,0,2,0,0,1,1,1,0,0,2,0,0,1,0,
1,1,1,0,0,0,0,0,1,1,1,0,0,0,0,0,1,0,
1,1,1,0,0,0,0,0,1,1,1,0,0,0,0,0,1,0,
1,1,1,0,0,0,0,0,1,1,1,0,0,0,0,0,1,0,
0,0,0,0,0,0,0,0,0,0,0,0,0,0,0,0,0,0,
0,0,0,0,0,0,0,0,0,0,0,0,0,0,0,0,0,0,
2,2,2,0,0,0,0,0,2,2,2,0,0,0,0,0,2,0};
CharacterType Characters200 [ ] =
    {
        {bZero,    17, 21, 0, 0, '0', 0, 0, 0, 87, 0, 0, 0, 0, 7},
        {bOne,     13, 21, 0, 0, '1', 0, 0, 0, 87, 0, 0, 0, 0, 1},
        {bTwo,      8, 21, 0, 0, '2', 0, 0, 0, 87, 0, 0, 0, 0, 3},
        {bThree,   13, 22, 0, 0, '3', 0, 0, 0, 87, 0, 0, 0, 0, 7},
        {bFour,    17, 21, 0, 0, '4', 0, 0, 0, 87, 0, 0, 0, 0, 4},
        {bFive,    12, 21, 0, 0, '5', 0, 0, 0, 87, 0, 0, 0, 0, 3},
        {bSix,     14, 22, 0, 0, '6', 0, 0, 0, 87, 0, 0, 0, 0, 6},
        {bSeven,   10, 21, 0, 0, '7', 0, 0, 0, 90, 0, 0, 0, 0, 2},
        {bEight,   16, 21, 0, 0, '8', 0, 0, 0, 87, 0, 0, 0, 0, 8},
        {bNine,    13, 20, 0, 1, '9', 0, 0, 0, 87, 0, 0, 0, 0, 5},
        {bTR,      16, 21, 0, 0, '<', 0, 0, 0, 87, 0, 0, 0, 0, 2},
        {bOnus,    18, 20, 0, 3, '#', 0, 0, 0, 87, 0, 0, 0, 0, 2},
        {bAmount,  15, 20, 0, 1, '$', 0, 0, 0, 87, 0, 0, 0, 0, 2},
        {bHyphen,  18, 12, 0, 6, '-', 0, 0, 0, 87, 0, 0, 0, 0, 9},
    };
BYTE bInverseZero [24 * 30] = {
1,1,1,1,1,1,1,1,1,1,1,1,1,1,1,1,1,1,1,1,1,1,1,1,
1,1,1,0,0,0,0,0,0,0,0,0,0,0,0,0,0,0,0,0,0,1,1,1,
1,1,0,0,0,0,0,0,0,0,0,0,0,0,0,0,0,0,0,0,0,0,1,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,1,1,1,1,1,1,0,0,0,0,0,0,0,0,0,1,
1,0,0,0,0,0,0,0,1,1,1,1,1,1,1,0,0,0,0,0,0,0,0,1,
1,0,0,0,0,0,0,0,1,1,1,1,1,1,1,1,0,0,0,0,0,0,0,1,
1,0,0,0,0,0,0,0,1,1,1,1,1,1,1,1,0,0,0,0,0,0,0,1,
1,0,0,0,0,0,0,0,1,1,1,1,1,1,1,1,1,0,0,0,0,0,0,1,
1,0,0,0,0,0,0,0,1,1,1,1,1,1,1,1,1,0,0,0,0,0,0,1,
1,0,0,0,0,0,0,0,1,1,1,1,1,1,1,1,1,0,0,0,0,0,0,1,
```

```
1,0,0,0,0,0,0,1,1,1,1,1,1,1,1,1,0,0,0,0,0,0,1,
1,0,0,0,0,0,0,1,1,1,1,1,1,1,1,1,1,0,0,0,0,0,0,1,
1,0,0,0,0,0,0,1,1,1,1,1,1,1,1,1,1,0,0,0,0,0,0,1,
1,0,0,0,0,0,0,1,1,1,1,1,1,1,1,1,1,0,0,0,0,0,0,1,
1,0,0,0,0,0,0,1,1,1,1,1,1,1,1,1,1,0,0,0,0,0,0,1,
1,0,0,0,0,0,0,0,1,1,1,1,1,1,1,1,0,0,0,0,0,0,0,1,
1,0,0,0,0,0,0,0,1,1,1,1,1,1,1,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,1,0,0,0,0,0,0,0,0,0,0,0,0,0,0,0,0,0,0,0,0,1,1,
1,1,1,0,0,0,0,0,0,0,0,0,0,0,0,0,0,0,0,0,0,1,1,1,
1,1,1,1,1,1,1,1,1,1,1,1,1,1,1,1,1,1,1,1,1,1,1,1};
BYTE bInverseOne [17 * 29] = {
1,1,1,1,1,1,1,1,1,1,1,1,1,1,1,1,1,
1,0,0,0,0,0,0,0,0,0,0,1,1,1,1,1,1,
1,0,0,0,0,0,0,0,0,0,0,1,1,1,1,1,1,
1,0,0,0,0,0,0,0,0,0,0,1,1,1,1,1,1,
1,0,0,0,0,0,0,0,0,0,0,1,1,1,1,1,1,
1,0,0,0,0,0,0,0,0,0,0,1,1,1,1,1,1,
1,0,0,0,0,0,0,0,0,0,0,1,1,1,1,1,1,
1,0,0,0,0,0,0,0,0,0,0,1,1,1,1,1,1,
1,0,0,0,0,0,0,0,0,0,0,1,1,1,1,1,1,
1,1,0,0,0,0,0,0,0,0,0,1,1,1,1,1,1,
1,1,1,0,0,0,0,0,0,0,0,1,1,1,1,1,1,
1,1,1,0,0,0,0,0,0,0,0,1,1,1,1,1,1,
1,1,1,0,0,0,0,0,0,0,0,1,1,1,1,1,1,
1,1,1,0,0,0,0,0,0,0,0,0,1,1,1,1,1,
1,1,0,0,0,0,0,0,0,0,0,0,0,1,1,1,1,
1,0,0,0,0,0,0,0,0,0,0,0,0,0,0,1,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,1,1,1,1,1,1,1,1,1,1,1,1,1,1,1,1,};
BYTE bInverseTwo [17 * 29] = {
1,1,1,1,1,1,1,1,1,1,1,1,1,1,1,1,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,1,1,1,1,1,1,1,0,0,0,0,0,0,0,0,1,
1,1,1,1,1,1,1,1,0,0,0,0,0,0,0,0,1,
1,1,1,1,1,1,1,1,0,0,0,0,0,0,0,0,1,
1,1,1,1,1,1,1,1,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,1,1,1,1,1,1,1,1,1,
1,0,0,0,0,0,0,0,1,1,1,1,1,1,1,1,1,
1,0,0,0,0,0,0,0,1,1,1,1,1,1,1,1,1,
1,0,0,0,0,0,0,0,1,1,1,1,1,1,1,1,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,1,1,1,1,1,1,1,1,1,1,1,1,1,1,1,1};
BYTE bInverseThree [19 * 29] = {
1,1,1,1,1,1,1,1,1,1,1,1,1,1,1,1,1,1,1,
1,0,0,0,0,0,0,0,0,0,0,0,0,0,0,1,1,1,1,
1,0,0,0,0,0,0,0,0,0,0,0,0,0,0,1,1,1,1,
```

```
1,0,0,0,0,0,0,0,0,0,0,0,0,0,0,1,1,1,1,
1,0,0,0,0,0,0,0,0,0,0,0,0,0,0,1,1,1,1,
1,0,0,0,0,0,0,0,0,0,0,0,0,0,0,1,1,1,1,
1,0,0,0,0,0,0,0,0,0,0,0,0,0,0,1,1,1,1,
1,1,1,1,1,1,1,0,0,0,0,0,0,0,0,1,1,1,1,
1,1,1,1,1,1,1,0,0,0,0,0,0,0,0,1,1,1,1,
1,1,1,1,1,1,1,0,0,0,0,0,0,0,0,1,1,1,1,
1,1,1,1,1,1,1,0,0,0,0,0,0,0,0,1,1,1,1,
1,0,0,0,0,0,0,0,0,0,0,0,0,0,0,0,1,1,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,1,1,1,1,1,1,1,0,0,0,0,0,0,0,0,0,0,1,
1,1,1,1,1,1,1,1,1,0,0,0,0,0,0,0,0,0,1,
1,1,1,1,1,1,1,1,1,0,0,0,0,0,0,0,0,0,1,
1,1,1,1,1,1,1,1,1,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,1,1,1,1,1,1,1,1,1,1,1,1,1,1,1,1,1,1,};
BYTE bInverseFour [22 * 30] = {
1,1,1,1,1,1,1,1,1,1,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,1,1,1,1,1,1,1,1,1,1,
1,0,0,0,0,0,0,0,0,0,1,1,0,0,0,0,0,0,0,0,0,1,
1,0,0,0,0,0,0,0,0,0,1,1,0,0,0,0,0,0,0,0,0,1,
1,0,0,0,0,0,0,0,0,0,1,1,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,1,1,1,1,1,1,1,1,1,1,0,0,0,0,0,0,0,0,0,0,1,
1,1,1,1,1,1,1,1,1,1,1,0,0,0,0,0,0,0,0,0,0,1,
1,1,1,1,1,1,1,1,1,1,1,0,0,0,0,0,0,0,0,0,0,1,
1,1,1,1,1,1,1,1,1,1,1,0,0,0,0,0,0,0,0,0,0,1,
1,1,1,1,1,1,1,1,1,1,1,0,0,0,0,0,0,0,0,0,0,1,
1,1,1,1,1,1,1,1,1,1,1,1,1,1,1,1,1,1,1,1,1,1};
BYTE bInverseFive [19 * 31] = {
1,1,1,1,1,1,1,1,1,1,1,1,1,1,1,1,1,1,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,1,1,1,1,1,1,1,1,1,1,1,
1,0,0,0,0,0,0,0,1,1,1,1,1,1,1,1,1,1,1,
1,0,0,0,0,0,0,0,1,1,1,1,1,1,1,1,1,1,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,0,0,0,0,0,0,0,0,0,0,0,0,0,0,0,0,0,1,
1,1,1,1,1,1,1,1,1,1,0,0,0,0,0,0,0,0,1,
1,1,1,1,1,1,1,1,1,1,0,0,0,0,0,0,0,0,1,
```

```
1,1,1,1,1,1,1,1,1,1,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,0,0,0,0,0,0,0,0,0,0,0,0,0,0,0,0,1,
1,1,1,1,1,1,1,1,1,1,1,1,1,1,1,1,1,1};
BYTE bInverseSix [22 * 30] = {
1,1,1,1,1,1,1,1,1,1,1,1,1,1,1,1,1,1,1,1,1,1,1,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,0,0,0,0,0,0,0,0,0,0,0,0,0,0,1,1,1,1,1,1,1,
1,0,0,0,0,0,0,0,0,1,1,0,0,0,0,0,0,0,0,0,1,1,1,1,1,1,1,1,1,1,
1,0,0,0,0,0,0,0,0,1,1,0,0,0,0,0,0,0,0,0,1,1,1,1,1,1,1,1,1,1,
1,0,0,0,0,0,0,0,0,1,1,0,0,0,0,0,0,0,0,0,1,1,1,1,1,1,1,1,1,1,
1,0,0,0,0,0,0,0,0,1,1,1,1,1,1,1,1,1,1,1,1,1,1,1,1,1,1,1,1,1,
1,0,0,0,0,0,0,0,0,1,1,1,1,1,1,1,1,1,1,1,1,1,1,1,1,1,1,1,1,1,
1,0,0,0,0,0,0,0,0,1,1,1,1,1,1,1,1,1,1,1,1,1,1,1,1,1,1,1,1,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,1,
1,1,1,1,1,1,1,1,1,1,1,1,1,1,1,1,1,1,1,1,1,1,1,1,1,1,1,1,1,1};
BYTE bInverseSeven [19 * 31] = {
1,1,1,1,1,1,1,1,1,1,1,1,1,1,1,1,1,1,1,1,1,1,1,1,1,1,1,1,1,1,1,
1,0,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,0,0,0,0,1,
1,0,0,0,0,0,0,0,0,0,1,0,0,0,0,0,0,0,0,0,0,0,0,0,0,0,0,0,0,0,1,
1,0,0,0,0,0,0,0,0,0,1,0,0,0,0,0,0,0,0,0,0,0,0,0,0,0,0,0,0,0,1,
1,0,0,0,0,0,0,0,0,0,1,0,0,0,0,0,0,0,0,0,0,0,0,0,0,0,0,0,0,0,1,
1,0,0,0,0,0,0,0,0,0,1,0,0,0,0,0,0,0,0,0,0,0,0,0,0,0,0,0,0,0,1,
1,0,0,0,0,0,0,0,1,0,0,0,0,0,0,0,0,0,0,0,0,0,0,0,0,0,0,0,0,0,1,
1,1,1,1,1,1,1,1,0,0,0,0,0,0,0,0,0,0,0,0,0,0,0,0,0,0,0,0,0,0,1,
1,1,1,1,1,1,1,1,0,0,0,0,0,0,0,0,0,0,0,0,0,0,0,0,0,0,0,0,0,0,1,
1,1,1,1,1,1,1,1,0,0,0,0,0,0,0,0,0,0,0,0,0,0,0,0,0,0,0,0,0,1,1,
1,1,1,1,1,1,1,1,0,0,0,0,0,0,0,0,0,0,0,0,0,0,0,0,0,0,0,0,1,1,1,
1,1,1,1,1,1,1,1,0,0,0,0,0,0,0,0,0,0,0,0,0,0,0,0,0,0,0,1,1,1,1,
1,1,1,1,1,1,1,1,0,0,0,0,0,0,0,0,0,0,0,0,0,0,0,0,0,0,1,1,1,1,1,
1,1,1,1,1,1,1,1,0,0,0,0,0,0,0,0,0,0,0,0,0,0,0,0,0,1,1,1,1,1,1,
1,1,1,1,1,1,1,1,0,0,0,0,0,0,0,0,0,0,0,0,0,0,0,0,1,1,1,1,1,1,1,
1,1,1,1,1,1,1,1,0,0,0,0,0,0,0,0,0,0,0,0,0,0,0,1,1,1,1,1,1,1,1,
1,1,1,1,1,1,1,1,0,0,0,0,0,0,0,0,0,0,0,0,0,0,1,1,1,1,1,1,1,1,1,
1,1,1,1,1,1,1,1,0,0,0,0,0,0,0,0,0,0,0,0,0,1,1,1,1,1,1,1,1,1,1,
1,1,1,1,1,1,1,1,0,0,0,0,0,0,0,0,0,0,0,0,1,1,1,1,1,1,1,1,1,1,1,
1,1,1,1,1,1,1,1,0,0,0,0,0,0,0,0,0,0,0,1,1,1,1,1,1,1,1,1,1,1,1,
1,1,1,1,1,1,1,1,0,0,0,0,0,0,0,0,0,0,1,1,1,1,1,1,1,1,1,1,1,1,1,
1,1,1,1,1,1,1,1,0,0,0,0,0,0,0,0,0,1,1,1,1,1,1,1,1,1,1,1,1,1,1,
1,1,1,1,1,1,1,1,0,0,0,0,0,0,0,0,1,1,1,1,1,1,1,1,1,1,1,1,1,1,1,
1,1,1,1,1,1,1,1,1,1,1,1,1,1,1,1,1,1,1,1,1,1,1,1,1,1,1,1,1,1,1};
BYTE bInverseEight [23 * 31] = {
1,1,1,1,1,1,1,1,1,1,1,1,1,1,1,1,1,1,1,1,1,1,1,1,1,1,1,1,1,1,1,
1,1,1,1,0,0,0,0,0,0,0,0,0,0,0,0,0,0,0,0,0,0,0,0,0,0,1,1,1,1,1,
1,1,1,0,0,0,0,0,0,0,0,0,0,0,0,0,0,0,0,0,0,0,0,0,0,0,0,1,1,1,1,
1,1,1,0,0,0,0,0,0,0,0,0,0,0,0,0,0,0,0,0,0,0,0,0,0,0,0,1,1,1,1,
1,1,1,0,0,0,0,0,0,0,0,0,0,0,0,0,0,0,0,0,0,0,0,0,0,0,0,1,1,1,1,
```

```
1,1,1,0,0,0,0,0,0,0,0,0,0,0,0,0,0,0,0,0,1,1,1,
1,1,1,0,0,0,0,0,0,0,0,0,0,0,0,0,0,0,0,0,1,1,1,
1,1,1,0,0,0,0,0,0,0,0,0,0,0,0,0,0,0,0,0,1,1,1,
1,1,1,0,0,0,0,0,0,0,0,1,1,0,0,0,0,0,0,0,1,1,1,
1,1,1,0,0,0,0,0,0,0,0,1,1,0,0,0,0,0,0,0,1,1,1,
1,1,1,0,0,0,0,0,0,0,0,1,1,0,0,0,0,0,0,0,1,1,1,
1,1,1,0,0,0,0,0,0,0,0,1,1,0,0,0,0,0,0,0,1,1,1,
1,1,1,0,0,0,0,0,0,0,0,0,0,0,0,0,0,0,0,0,1,1,1,
1,1,0,0,0,0,0,0,0,0,0,0,0,0,0,0,0,0,0,0,0,1,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,1,1,0,0,0,0,0,0,0,0,0,1,
1,0,0,0,0,0,0,0,0,0,0,1,1,0,0,0,0,0,0,0,0,0,1,
1,0,0,0,0,0,0,0,0,0,0,1,1,0,0,0,0,0,0,0,0,0,1,
1,0,0,0,0,0,0,0,0,0,0,1,1,0,0,0,0,0,0,0,0,0,1,
1,0,0,0,0,0,0,0,0,0,0,1,1,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,1,1,1,1,1,1,1,1,1,1,1,1,1,1,1,1,1,1,1,1,1,1,};
BYTE bInverseNine [21 * 30] = {
1,1,1,1,1,1,1,1,1,1,1,1,1,1,1,1,1,1,1,1,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,1,1,1,1,0,0,0,0,0,0,0,0,1,
1,0,0,0,0,0,0,0,1,1,1,1,1,0,0,0,0,0,0,0,1,
1,0,0,0,0,0,0,1,1,1,1,1,1,0,0,0,0,0,0,0,1,
1,0,0,0,0,0,0,0,1,1,1,1,1,0,0,0,0,0,0,0,1,
1,0,0,0,0,0,0,0,1,1,1,1,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,0,0,0,0,0,0,0,0,0,1,
1,1,1,1,1,1,1,1,1,1,1,1,1,1,1,1,1,1,1,1,1};
BYTE bInverseTR [24 * 30] = }
1,1,1,1,1,1,1,1,1,1,1,1,1,1,1,1,1,1,1,1,1,1,1,1,
1,1,1,1,1,1,1,1,1,1,1,0,0,0,0,0,0,0,0,0,0,0,0,1,
1,1,1,1,1,1,1,1,1,1,1,0,0,0,0,0,0,0,0,0,0,0,0,1,
1,1,1,1,1,1,1,1,1,1,1,0,0,0,0,0,0,0,0,0,0,0,0,1,
1,1,1,1,1,1,1,1,1,1,1,0,0,0,0,0,0,0,0,0,0,0,0,1,
1,1,1,1,1,1,1,1,1,1,1,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,0,1,1,1,1,1,1,1,1,1,1,1,1,1,1,1,
1,0,0,0,0,0,0,0,0,1,1,1,1,1,1,1,1,1,1,1,1,1,1,1,
1,0,0,0,0,0,0,0,0,1,1,1,1,1,1,1,1,1,1,1,1,1,1,1,
1,0,0,0,0,0,0,0,0,1,1,1,1,1,1,1,1,1,1,1,1,1,1,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
1,0,0,0,0,0,0,0,1,1,0,0,0,0,0,0,0,0,0,0,0,0,0,1,
```

-continued

```
1,0,0,0,0,0,0,0,1,1,0,0,0,0,0,0,0,0,0,0,0,0,1,
1,0,0,0,0,0,0,0,1,1,0,0,0,0,0,0,0,0,0,0,0,0,1,
1,0,0,0,0,0,0,0,1,1,0,0,0,0,0,0,0,0,0,0,0,0,1,
1,0,0,0,0,0,0,0,1,1,0,0,0,0,0,0,0,0,0,0,0,0,1,
1,1,1,1,1,1,1,1,1,1,0,0,0,0,0,0,0,0,0,0,0,0,1,
1,1,1,1,1,1,1,1,1,1,0,0,0,0,0,0,0,0,0,0,0,0,1,
1,1,1,1,1,1,1,1,1,1,0,0,0,0,0,0,0,0,0,0,0,0,1,
1,1,1,1,1,1,1,1,1,1,0,0,0,0,0,0,0,0,0,0,0,0,1,
1,1,1,1,1,1,1,1,1,1,1,1,1,1,1,1,1,1,1,1,1,1,1};
BYTE bInverseOnus [23 * 24] = {
1,1,1,1,1,1,1,1,1,1,1,1,1,1,1,1,1,1,1,1,1,1,1,
1,1,1,1,1,1,1,1,1,1,1,0,0,0,0,0,0,0,0,0,0,0,1,
1,1,1,1,1,1,1,1,1,1,1,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,1,1,1,1,1,1,1,1,1,1,1,1,1,1,1,1,1,1,1,1,1,1,};
BYTE bInverseAmount [23 * 28] = {
1,1,1,1,1,1,1,1,1,1,1,1,1,1,1,1,1,1,1,1,1,1,1,
1,1,1,1,1,1,1,1,1,1,1,1,1,1,1,1,0,0,0,0,0,0,1,
1,1,1,1,1,1,1,1,1,1,1,1,1,1,1,1,0,0,0,0,0,0,1,
1,1,1,1,1,1,1,1,1,1,1,1,1,1,1,1,0,0,0,0,0,0,1,
1,1,1,1,1,1,1,1,1,1,1,1,1,1,1,1,0,0,0,0,0,0,1,
1,1,1,1,1,1,1,1,1,1,1,1,1,1,1,1,0,0,0,0,0,0,1,
1,1,1,1,1,1,1,1,1,1,1,1,1,1,1,1,0,0,0,0,0,0,1,
1,1,1,1,1,1,1,1,1,0,0,0,0,0,0,0,0,0,0,0,0,0,1,
1,1,1,1,1,1,1,1,1,0,0,0,0,0,0,0,0,0,0,0,0,0,1,
1,1,1,1,1,1,1,1,1,0,0,0,0,0,0,0,0,0,0,0,0,0,1,
1,1,1,1,1,1,1,1,1,0,0,0,0,0,0,0,0,0,0,0,0,0,1,
1,1,1,1,1,1,1,1,1,0,0,0,0,0,0,0,0,0,0,0,0,0,1,
1,1,1,1,1,1,1,1,1,0,0,0,0,0,0,0,0,0,0,0,0,0,1,
1,1,1,1,1,1,1,1,1,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,0,0,0,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,1,1,1,1,1,1,1,1,1,1,1,1,1,1,1,1,1,1,1,1,1,1,};
BYTE bInverseHyphen [25 * 16] = {
1,1,1,1,1,1,1,1,1,1,1,1,1,1,1,1,1,1,1,1,1,1,1,1,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
1,0,0,0,0,0,0,0,1,0,0,0,0,0,0,0,1,0,0,0,0,0,0,0,1,
```

```
1,1,1,1,1,1,1,1,1,1,1,1,1,1,1,1,1,1,1,1,1,1,1,1,1};
CharacterType Shadow200 [ ] =
         {
                  {bInverseZero,    24, 30, 0, 0, '0', 0, 0, 0, 100, 0, 0, 0, 20,  7},
                  {bInverseOne,     17, 29, 0, 0, '1', 0, 0, 0, 100, 0, 0, 0, 13,  1},
                  {bInverseTwo,     17, 29, 0, 0, '2', 0, 0, 0, 100, 0, 0, 0, 12,  3},
                  {bInverseThree,   19, 29, 0, 0, '3', 0, 0, 0, 100, 0, 0, 0, 14,  7},
                  {bInverseFour,    22, 30, 0, 0, '4', 0, 0, 0, 100, 0, 0, 0, 17,  4},
                  {bInverseFive,    19, 31, 0, 0, '5', 0, 0, 0, 100, 0, 0, 0, 14,  3},
                  {bInverseSix,     22, 30, 0, 0, '6', 0, 0, 0, 100, 0, 0, 0, 17,  6},
                  {bInverseSeven,   19, 31, 0, 0, '7', 0, 0, 0, 100, 0, 0, 0, 14,  2},
                  {bInverseEight,   23, 31, 0, 0, '8', 0, 0, 0, 100, 0, 0, 0, 18,  8},
                  {bInverseNine,    21, 30, 0, 0, '9', 0, 0, 0, 100, 0, 0, 0, 17,  5},
                  {bInverseTR,      24, 30, 0, 0, '<', 0, 0, 0, 100, 0, 0, 0, 17,  2},
                  {bInverseOnus,    23, 24, 0, 0, '#', 0, 0, 0, 100, 0, 0, 0, 17,  2},
                  {bInverseAmount,  24, 28, 0, 0, '$', 0, 0, 0, 100, 0, 0, 0, 18,  2},
                  {bInverseHyphen,  25, 16, 0, 0, '-', 0, 0, 0, 100, 0, 0, 0, 21,  9},
         };
BYTE bInverseZero240 [27 * 32] = {
1,1,1,1,1,1,1,1,1,1,1,1,1,1,1,1,1,1,1,1,1,1,1,1,1,1,1,
1,1,1,1,0,0,0,0,0,0,0,0,0,0,0,0,0,0,0,0,0,0,0,1,1,1,1,
1,1,1,0,0,0,0,0,0,0,0,0,0,0,0,0,0,0,0,0,0,0,0,0,1,1,1,
1,1,0,0,0,0,0,0,0,0,0,0,0,0,0,0,0,0,0,0,0,0,0,0,0,1,1,
1,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,0,1,
1,0,0,0,0,0,0,0,1,1,1,1,1,1,1,1,1,1,0,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,1,0,0,0,0,0,0,0,1,
1,0,0,0,0,0,0,0,1,1,1,1,1,1,1,1,1,1,0,0,0,0,0,0,0,0,1,
1,0,0,0,0,0,0,0,0,0,0,0,0,0,0,0,0,0,0,0,0,0,0,0,0,0,1,
1,1,0,0,0,0,0,0,0,0,0,0,0,0,0,0,0,0,0,0,0,0,0,0,0,1,1,
1,1,1,0,0,0,0,0,0,0,0,0,0,0,0,0,0,0,0,0,0,0,0,0,1,1,1,
1,1,1,1,0,0,0,0,0,0,0,0,0,0,0,0,0,0,0,0,0,0,0,1,1,1,1,
1,1,1,1,1,1,1,1,1,1,1,1,1,1,1,1,1,1,1,1,1,1,1,1,1,1,1,};
BYTE bInverseOne240 [17 * 31] = {
1,1,1,1,1,1,1,1,1,1,1,1,1,1,1,1,1,
1,0,0,0,0,0,0,0,0,0,1,1,1,1,1,1,1,
1,0,0,0,0,0,0,0,0,0,1,1,1,1,1,1,1,
1,0,0,0,0,0,0,0,0,0,1,1,1,1,1,1,1,
1,0,0,0,0,0,0,0,0,0,1,1,1,1,1,1,1,
1,0,0,0,0,0,0,0,0,0,1,1,1,1,1,1,1,
1,0,0,0,0,0,0,0,0,0,1,1,1,1,1,1,1,
1,1,0,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,1,0,0,0,0,0,0,0,1,1,1,1,1,1,1,
1,1,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
```

```
1,0,0,0,0,0,0,0,0,0,0,0,0,0,0,0,1,
1,0,0,0,0,0,0,0,0,0,0,0,0,0,0,0,1,
1,1,1,1,1,1,1,1,1,1,1,1,1,1,1,1,1,};
BYTE bInverseTwo240 [17 * 32] = {
1,1,1,1,1,1,1,1,1,1,1,1,1,1,1,1,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,1,1,1,1,1,1,1,1,1,0,0,0,0,0,0,1,
1,1,1,1,1,1,1,1,1,1,0,0,0,0,0,0,1,
1,1,1,1,1,1,1,1,1,1,0,0,0,0,0,0,1,
1,1,1,1,1,1,1,1,1,1,0,0,0,0,0,0,1,
1,1,1,1,1,1,1,1,1,1,0,0,0,0,0,0,1,
1,1,1,1,1,1,1,1,1,1,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,1,1,1,1,1,1,1,1,1,1,1,
1,0,0,0,0,0,1,1,1,1,1,1,1,1,1,1,1,
1,0,0,0,0,0,1,1,1,1,1,1,1,1,1,1,1,
1,0,0,0,0,0,1,1,1,1,1,1,1,1,1,1,1,
1,0,0,0,0,0,1,1,1,1,1,1,1,1,1,1,1,
1,0,0,0,0,0,1,1,1,1,1,1,1,1,1,1,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,0,0,0,0,0,0,0,0,0,0,0,0,0,0,0,1,
1,1,1,1,1,1,1,1,1,1,1,1,1,1,1,1,1};
BYTE bInverseThree240 [20 * 31] = {
1,1,1,1,1,1,1,1,1,1,1,1,1,1,1,1,1,1,1,1,
1,0,0,0,0,0,0,0,0,0,0,0,0,0,0,1,1,1,1,1,
1,0,0,0,0,0,0,0,0,0,0,0,0,0,0,1,1,1,1,1,
1,0,0,0,0,0,0,0,0,0,0,0,0,0,0,1,1,1,1,1,
1,0,0,0,0,0,0,0,0,0,0,0,0,0,0,1,1,1,1,1,
1,0,0,0,0,0,0,0,0,0,0,0,0,0,0,1,1,1,1,1,
1,0,0,0,0,0,0,0,0,0,0,0,0,0,0,1,1,1,1,1,
1,1,1,1,1,1,1,1,1,1,0,0,0,0,0,0,1,1,1,1,
1,1,1,1,1,1,1,1,1,1,0,0,0,0,0,0,1,1,1,1,
1,1,1,1,1,1,1,1,1,1,0,0,0,0,0,0,1,1,1,1,
1,1,1,1,1,1,1,1,1,1,0,0,0,0,0,0,1,1,1,1,
1,1,1,1,1,1,1,1,1,1,0,0,0,0,0,0,1,1,1,1,
1,1,1,1,1,1,1,1,1,1,0,0,0,0,0,0,1,1,1,1,
1,0,0,0,0,0,0,0,0,0,0,0,0,0,0,0,0,1,1,1,
1,0,0,0,0,0,0,0,0,0,0,0,0,0,0,0,0,0,1,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,1,1,1,1,1,1,1,1,1,0,0,0,0,0,0,0,0,0,1,
1,1,1,1,1,1,1,1,1,1,0,0,0,0,0,0,0,0,0,1,
1,1,1,1,1,1,1,1,1,1,0,0,0,0,0,0,0,0,0,1,
1,1,1,1,1,1,1,1,1,1,0,0,0,0,0,0,0,0,0,1,
1,1,1,1,1,1,1,1,1,1,0,0,0,0,0,0,0,0,0,1,
1,1,1,1,1,1,1,1,1,1,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,1,1,1,1,1,1,1,1,1,1,1,1,1,1,1,1,1,1,1};
BYTE bInverseFour240 [23 * 31] = {
1,1,1,1,1,1,1,1,1,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
1,0,0,0,0,0,0,0,0,1,1,1,1,1,1,1,1,1,1,1,1,1,1,
```

-continued

```
1,0,0,0,0,0,0,0,0,1,1,1,1,1,1,1,1,1,1,1,1,1,
1,0,0,0,0,0,0,0,0,1,1,1,1,1,1,1,1,1,1,1,1,1,
1,0,0,0,0,0,0,0,0,1,1,1,1,1,1,1,1,1,1,1,1,1,
1,0,0,0,0,0,0,0,0,1,1,1,1,1,1,1,1,1,1,1,1,1,
1,0,0,0,0,0,0,0,0,1,1,1,1,1,1,1,1,1,1,1,1,1,
1,0,0,0,0,0,0,0,0,1,1,1,1,0,0,0,0,0,0,0,0,1,
1,0,0,0,0,0,0,0,0,1,1,1,1,0,0,0,0,0,0,0,0,1,
1,0,0,0,0,0,0,0,0,1,1,1,1,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,0,0,0,0,0,0,0,0,1,
1,1,1,1,1,1,1,1,1,1,1,1,1,1,1,1,1,1,1,1,1,1};
BYTE bInverseFive240 [20 * 31] = {
1,1,1,1,1,1,1,1,1,1,1,1,1,1,1,1,1,1,1,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,1,1,1,1,1,1,1,1,1,1,1,1,1,1,
1,0,0,0,0,0,1,1,1,1,1,1,1,1,1,1,1,1,1,1,
1,0,0,0,0,0,1,1,1,1,1,1,1,1,1,1,1,1,1,1,
1,0,0,0,0,0,1,1,1,1,1,1,1,1,1,1,1,1,1,1,
1,0,0,0,0,0,1,1,1,1,1,1,1,1,1,1,1,1,1,1,
1,0,0,0,0,0,1,1,1,1,1,1,1,1,1,1,1,1,1,1,
1,0,0,0,0,0,1,1,1,1,1,1,1,1,1,1,1,1,1,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,1,1,1,1,1,1,1,1,1,1,1,1,0,0,0,0,0,0,1,
1,1,1,1,1,1,1,1,1,1,1,1,1,0,0,0,0,0,0,1,
1,1,1,1,1,1,1,1,1,1,1,1,1,0,0,0,0,0,0,1,
1,1,1,1,1,1,1,1,1,1,1,1,1,0,0,0,0,0,0,1,
1,1,1,1,1,1,1,1,1,1,1,1,1,0,0,0,0,0,0,1,
1,1,1,1,1,1,1,1,1,1,1,1,1,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,0,0,0,0,0,0,0,0,0,0,0,0,0,0,0,0,0,0,1,
1,1,1,1,1,1,1,1,1,1,1,1,1,1,1,1,1,1,1,1};
BYTE bInverseSix240 [24 * 30] = {
1,1,1,1,1,1,1,1,1,1,1,1,1,1,1,1,1,1,1,1,1,1,1,1,
1,0,0,0,0,0,0,0,0,0,0,0,0,0,0,0,1,1,1,1,1,1,1,1,
1,0,0,0,0,0,0,0,0,0,0,0,0,0,0,0,1,1,1,1,1,1,1,1,
1,0,0,0,0,0,0,0,0,0,0,0,0,0,0,0,1,1,1,1,1,1,1,1,
1,0,0,0,0,0,0,0,0,0,0,0,0,0,0,0,1,1,1,1,1,1,1,1,
1,0,0,0,0,0,0,0,0,0,0,0,0,0,0,0,1,1,1,1,1,1,1,1,
1,0,0,0,0,0,0,1,1,1,0,0,0,0,0,0,1,1,1,1,1,1,1,1,
1,0,0,0,0,0,0,1,1,1,0,0,0,0,0,0,1,1,1,1,1,1,1,1,
1,0,0,0,0,0,0,1,1,1,0,0,0,0,0,0,1,1,1,1,1,1,1,1,
1,0,0,0,0,0,0,1,1,1,0,0,0,0,0,0,1,1,1,1,1,1,1,1,
1,0,0,0,0,0,0,1,1,1,1,1,1,1,1,1,1,1,1,1,1,1,1,1,
1,0,0,0,0,0,0,1,1,1,1,1,1,1,1,1,1,1,1,1,1,1,1,1,
1,0,0,0,0,0,0,1,1,1,1,1,1,1,1,1,1,1,1,1,1,1,1,1,
1,0,0,0,0,0,0,1,1,1,1,1,1,1,1,1,1,1,1,1,1,1,1,1,
1,0,0,0,0,0,0,0,0,0,0,0,0,0,0,0,0,0,0,0,0,1,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,1,
1,0,0,0,0,0,0,1,1,1,1,1,1,1,1,0,0,0,0,0,0,0,0,1,
1,0,0,0,0,0,0,1,1,1,1,1,1,1,1,0,0,0,0,0,0,0,0,1,
1,0,0,0,0,0,0,1,1,1,1,1,1,1,1,0,0,0,0,0,0,0,0,1,
1,0,0,0,0,0,0,1,1,1,1,1,1,1,1,0,0,0,0,0,0,0,0,1,
1,0,0,0,0,0,0,0,0,0,0,0,0,0,0,0,0,0,0,0,0,0,0,1,
```

-continued

```
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,0,0,0,0,0,0,0,0,0,0,0,0,0,0,0,0,0,0,0,0,1,
1,1,1,1,1,1,1,1,1,1,1,1,1,1,1,1,1,1,1,1,1};
BYTE bInverseSeven240 [21 * 30] = {
1,1,1,1,1,1,1,1,1,1,1,1,1,1,1,1,1,1,1,1,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,0,0,0,0,0,0,0,0,0,0,0,0,0,1,
1,0,0,0,0,0,0,1,1,1,1,1,1,1,1,0,0,0,0,0,1,
1,0,0,0,0,0,0,1,1,1,1,1,1,1,1,0,0,0,0,0,1,
1,0,0,0,0,0,0,1,1,1,1,1,1,1,1,0,0,0,0,0,1,
1,0,0,0,0,0,0,1,1,1,1,1,1,1,1,0,0,0,0,0,1,
1,0,0,0,0,0,0,1,1,1,1,1,1,1,0,0,0,0,0,0,1,
1,0,0,0,0,0,0,1,1,1,1,1,0,0,0,0,0,0,0,0,1,
1,1,1,1,1,1,1,1,1,0,0,0,0,0,0,0,0,0,0,0,1,
1,1,1,1,1,1,1,1,1,0,0,0,0,0,0,0,0,0,0,0,1,
1,1,1,1,1,1,1,1,0,0,0,0,0,0,0,0,0,0,0,0,1,
1,1,1,1,1,1,1,1,0,0,0,0,0,0,0,0,0,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,0,0,0,0,0,0,0,0,1,1,1,1,1,
1,1,1,1,1,1,1,1,1,1,1,1,1,1,1,1,1,1,1,1,1};
BYTE bInverseEight240 [26 * 31] = {
1,1,1,1,1,1,1,1,1,1,1,1,1,1,1,1,1,1,1,1,1,1,1,1,1,1,
1,1,1,1,0,0,0,0,0,0,0,0,0,0,0,0,0,0,0,0,0,1,1,1,1,1,
1,1,1,1,0,0,0,0,0,0,0,0,0,0,0,0,0,0,0,0,0,1,1,1,1,1,
1,1,1,1,0,0,0,0,0,0,0,0,0,0,0,0,0,0,0,0,0,1,1,1,1,1,
1,1,1,1,0,0,0,0,0,0,0,0,0,0,0,0,0,0,0,0,0,1,1,1,1,1,
1,1,1,1,0,0,0,0,0,0,0,0,0,0,0,0,0,0,0,0,0,1,1,1,1,1,
1,1,1,1,0,0,0,0,0,0,0,0,0,0,0,0,0,0,0,0,0,1,1,1,1,1,
1,1,1,1,0,0,0,0,0,0,1,1,1,1,0,0,0,0,0,0,0,1,1,1,1,1,
1,1,1,1,0,0,0,0,0,0,1,1,1,1,1,1,0,0,0,0,0,1,1,1,1,1,
1,1,1,1,0,0,0,0,0,0,1,1,1,1,1,1,0,0,0,0,0,1,1,1,1,1,
1,1,1,1,0,0,0,0,0,0,1,1,1,1,1,1,0,0,0,0,0,1,1,1,1,1,
1,1,1,1,0,0,0,0,0,0,1,1,1,1,1,1,0,0,0,0,0,1,1,1,1,1,
1,1,1,1,0,0,0,0,0,0,1,1,1,1,1,1,0,0,0,0,0,1,1,1,1,1,
1,1,1,1,0,0,0,0,0,0,1,1,1,1,1,1,0,0,0,0,0,1,1,1,1,1,
1,1,1,1,0,0,0,0,0,0,0,0,0,0,0,0,0,0,0,0,0,1,1,1,1,1,
1,1,0,0,0,0,0,0,0,0,0,0,0,0,0,0,0,0,0,0,0,0,0,0,1,1,
1,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,1,
1,0,0,0,0,0,0,0,0,0,1,1,1,1,1,1,1,0,0,0,0,0,0,0,0,1,
1,0,0,0,0,0,0,0,0,1,1,1,1,1,1,1,1,1,0,0,0,0,0,0,0,1,
1,0,0,0,0,0,0,0,0,1,1,1,1,1,1,1,1,1,0,0,0,0,0,0,0,1,
1,0,0,0,0,0,0,0,0,1,1,1,1,1,1,1,1,1,0,0,0,0,0,0,0,1,
1,0,0,0,0,0,0,0,0,1,1,1,1,1,1,1,1,1,0,0,0,0,0,0,0,1,
1,0,0,0,0,0,0,0,0,1,1,1,1,1,1,1,1,1,0,0,0,0,0,0,0,1,
1,0,0,0,0,0,0,0,0,1,1,1,1,1,1,1,1,1,0,0,0,0,0,0,0,1,
1,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,0,0,0,1,
1,1,1,1,1,1,1,1,1,1,1,1,1,1,1,1,1,1,1,1,1,1,1,1,1,1};
BYTE bInverseNine240 [23 * 31] = {
1,1,1,1,1,1,1,1,1,1,1,1,1,1,1,1,1,1,1,1,1,1,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,1,1,1,1,1,1,1,1,1,1,0,0,0,0,0,0,1,
1,0,0,0,0,0,1,1,1,1,1,1,1,1,1,1,0,0,0,0,0,0,1,
1,0,0,0,0,0,1,1,1,1,1,1,1,1,1,1,0,0,0,0,0,0,1,
1,0,0,0,0,0,1,1,1,1,1,1,1,1,1,1,0,0,0,0,0,0,1,
1,0,0,0,0,0,1,1,1,1,1,1,1,1,1,1,0,0,0,0,0,0,1,
```

-continued

```
1,0,0,0,0,0,1,1,1,1,1,1,1,1,1,0,0,0,0,0,0,1,
1,0,0,0,0,0,1,1,1,1,1,1,1,1,1,1,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,0,0,0,0,0,0,0,0,0,0,0,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,0,0,0,0,0,0,0,0,0,0,1,
1,1,1,1,1,1,1,1,1,1,1,1,1,1,1,1,1,1,1,1,1,1,1};
BYTE bInverseTR240 [27 * 31] = {
1,1,1,1,1,1,1,1,1,1,1,1,1,1,1,1,1,1,1,1,1,1,1,1,1,1,1,
1,1,1,1,1,1,1,1,1,1,1,1,1,0,0,0,0,0,0,0,0,0,0,0,0,0,1,
1,1,1,1,1,1,1,1,1,1,1,1,1,0,0,0,0,0,0,0,0,0,0,0,0,0,1,
1,1,1,1,1,1,1,1,1,1,1,1,1,0,0,0,0,0,0,0,0,0,0,0,0,0,1,
1,1,1,1,1,1,1,1,1,1,1,1,1,0,0,0,0,0,0,0,0,0,0,0,0,0,1,
1,1,1,1,1,1,1,1,1,1,1,1,1,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,1,1,1,1,1,1,1,1,1,1,1,1,1,1,1,
1,0,0,0,0,0,0,0,0,0,1,1,1,1,1,1,1,1,1,1,1,1,1,1,1,1,1,
1,0,0,0,0,0,0,0,0,0,1,1,1,1,1,1,1,1,1,1,1,1,1,1,1,1,1,
1,0,0,0,0,0,0,0,0,0,1,1,1,1,1,1,1,1,1,1,1,1,1,1,1,1,1,
1,0,0,0,0,0,0,0,0,0,1,1,1,1,1,1,1,1,1,1,1,1,1,1,1,1,1,
1,0,0,0,0,0,0,0,0,0,1,1,1,1,1,1,1,1,1,1,1,1,1,1,1,1,1,
1,0,0,0,0,0,0,0,0,0,1,1,1,1,1,1,1,1,1,1,1,1,1,1,1,1,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,0,0,0,0,0,0,0,0,0,1,1,0,0,0,0,0,0,0,0,0,0,0,0,0,0,1,
1,1,1,1,1,1,1,1,1,1,1,1,0,0,0,0,0,0,0,0,0,0,0,0,0,0,1,
1,1,1,1,1,1,1,1,1,1,1,1,0,0,0,0,0,0,0,0,0,0,0,0,0,0,1,
1,1,1,1,1,1,1,1,1,1,1,1,0,0,0,0,0,0,0,0,0,0,0,0,0,0,1,
1,1,1,1,1,1,1,1,1,1,1,1,0,0,0,0,0,0,0,0,0,0,0,0,0,0,1,
1,1,1,1,1,1,1,1,1,1,1,1,0,0,0,0,0,0,0,0,0,0,0,0,0,0,1,
1,1,1,1,1,1,1,1,1,1,1,1,1,1,1,1,1,1,1,1,1,1,1,1,1,1,1};
BYTE bInverseOnus240 [26 * 24] = {
1,1,1,1,1,1,1,1,1,1,1,1,1,1,1,1,1,1,1,1,1,1,1,1,
1,1,1,1,1,1,1,1,1,1,1,1,1,0,0,0,0,0,0,0,0,0,0,1,
1,1,1,1,1,1,1,1,1,1,1,1,1,0,0,0,0,0,0,0,0,0,0,1,
1,1,1,1,1,1,1,1,1,1,1,1,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,0,0,0,0,0,0,0,0,0,0,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,0,0,0,0,0,1,0,0,0,0,0,1,1,1,1,1,1,1,1,1,1,1,1,
1,1,1,1,1,1,1,1,1,1,1,1,1,1,1,1,1,1,1,1,1,1,1,1};
BYTE bInverseAmount240 [27 * 31] = {
1,1,1,1,1,1,1,1,1,1,1,1,1,1,1,1,1,1,1,1,1,1,1,1,1,1,1,
```

-continued

```
1,1,1,1,1,1,1,1,1,1,1,1,1,1,1,1,0,0,0,0,0,0,0,0,0,1,
1,1,1,1,1,1,1,1,1,1,1,1,1,1,1,1,0,0,0,0,0,0,0,0,0,1,
1,1,1,1,1,1,1,1,1,1,1,1,1,1,1,1,0,0,0,0,0,0,0,0,0,1,
1,1,1,1,1,1,1,1,1,1,1,1,1,1,1,1,0,0,0,0,0,0,0,0,0,1,
1,1,1,1,1,1,1,1,1,1,1,1,1,1,1,1,0,0,0,0,0,0,0,0,0,1,
1,1,1,1,1,1,1,1,1,1,1,1,1,1,1,1,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,1,1,1,1,1,1,1,1,1,1,0,0,0,0,0,0,0,0,0,0,0,0,0,0,1,
1,0,0,0,0,0,0,0,0,0,0,0,0,0,0,0,0,1,1,1,1,1,1,1,1,1,
1,0,0,0,0,0,0,0,0,0,0,0,0,0,0,0,0,1,1,1,1,1,1,1,1,1,
1,0,0,0,0,0,0,0,0,0,0,0,0,0,0,0,0,1,1,1,1,1,1,1,1,1,
1,0,0,0,0,0,0,0,0,0,0,0,0,0,0,0,0,1,1,1,1,1,1,1,1,1,
1,0,0,0,0,0,0,0,0,0,0,0,0,0,0,0,0,1,1,1,1,1,1,1,1,1,
1,0,0,0,0,0,0,0,0,0,0,0,0,0,0,0,0,1,1,1,1,1,1,1,1,1,
1,0,0,0,0,0,0,0,0,0,0,0,0,0,0,0,0,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,0,0,0,0,0,0,0,0,0,1,1,1,1,1,1,1,1,1,1,1,1,1,1,1,1,
1,1,1,1,1,1,1,1,1,1,1,1,1,1,1,1,1,1,1,1,1,1,1,1,1,1};
BYTE bInverseHyphen240 [27 * 16] = {
1,1,1,1,1,1,1,1,1,1,1,1,1,1,1,1,1,1,1,1,1,1,1,1,1,1,1,
1,1,0,0,0,0,0,0,0,1,1,1,0,0,0,0,0,0,1,1,1,0,0,0,0,1,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,0,0,0,0,0,0,0,0,0,1,0,0,0,0,0,0,0,0,1,0,0,0,0,0,0,1,
1,1,0,0,0,0,0,0,0,1,1,1,0,0,0,0,0,0,1,1,1,0,0,0,0,1,1,
1,1,1,1,1,1,1,1,1,1,1,1,1,1,1,1,1,1,1,1,1,1,1,1,1,1,1};
CharacterType Shadows240 [ ] =
{
    {bInverseZero240,    27, 32, 0, 0, '0', 0, 0, 0, 100, 0, 0, 0, 23, 7},
    {bInverseOne240,     17, 31, 0, 0, '1', 0, 0, 0, 100, 0, 0, 0, 14, 1},
    {bInverseTwo240,     17, 32, 0, 0, '2', 0, 0, 0, 100, 0, 0, 0, 13, 3},
    {bInverseThree240,   20, 31, 0, 0, '3', 0, 0, 0, 100, 0, 0, 0, 15, 7},
    {bInverseFour240,    23, 31, 0, 0, '4', 0, 0, 0, 100, 0, 0, 0, 17, 4},
    {bInverseFive240,    20, 31, 0, 0, '5', 0, 0, 0, 100, 0, 0, 0, 16, 3},
    {bInverseSix240,     24, 30, 0, 0, '6', 0, 0, 0, 100, 0, 0, 0, 20, 6},
    {bInverseSeven240,   21, 30, 0, 0, '7', 0, 0, 0, 100, 0, 0, 0, 17, 2},
    {bInverseEight240,   26, 31, 0, 0, '8', 0, 0, 0, 100, 0, 0, 0, 21, 8},
    {bInverseNine240,    23, 31, 0, 0, '9', 0, 0, 0, 100, 0, 0, 0, 19, 5},
    {bInverseTR240,      27, 31, 0, 0, '<', 0, 0, 0, 100, 0, 0, 0, 23, 2},
    {bInverseOnus240,    26, 24, 0, 0, '#', 0, 0, 0, 100, 0, 0, 0, 22, 2},
    {bInverseAmount240,  27, 31, 0, 0, '$', 0, 0, 0, 100, 0, 0, 0, 24, 2},
    {bInverseHyphen240,  27, 16, 0, 0, '-', 0, 0, 0, 100, 0, 0, 0, 24, 9},
}
```

What is claimed is:

1. A check analysis method, comprising:
   using a first MICR font template to identify MICR characters across the length of a selected area of the digital image of the check;
   detecting a position for a MICR character not identified by the first MICR font template relative to at least one MICR character identified by the first MICR font template; and
   in response to detecting a position for a MICR character not identified by the first MICR font template, using another MICR font template to identify the MICR character in the detected position, wherein such other MICR font template includes an inverse skeleton template defining regions outside a MICR character of the first MICR font template within which to identify a MICR character based on pixels outside the MICR character location in the detected position.

2. A check analysis method as defined in claim 1, further comprising changing stored MICR line data for the check in response to identifying sufficient valid MICR characters to comply with predetermined rules defining a valid MICR line for a check.

3. A computer-implemented method of analyzing a MICR line in a digital image, comprising:

scanning the MICR line in the digital image to identify MICR characters therein, wherein scanning the MICR line includes using first MICR font templates to identify MICR characters in the MICR line;

in response to identified characters, determining positions along the MICR line in the digital image where other MICR characters should be; and analyzing each determined position of the MICR line in the digital image to try to identify the respective MICR character at that position, wherein analyzing each determined position includes using second MICR font templates to try to identify additional MICR characters in the MICR line, and wherein analyzing each determined position further includes using third MICR font templates to try to identify MICR characters in response to failing to identify a MICR character at a respective position using the second MICR font templates, the third MICR font templates including skeleton templates the inverse of at least one of the first MICR font templates and the second MICR font templates for identifying broken MICR characters having a part of the character missing and not identified by either the first or second MICR font templates.

4. A computer-implemented method of analyzing a MICR line in a digital image as defined in claim 3, further comprising digitally removing horizontal and vertical lines detected in the MICR line and not part of a possible MICR character.

5. A check processing method as defined in claim 3, wherein:

using first MICR font templates to identify MICR characters includes identifying acceptable pixels and unacceptable pixels in response to a selected one of the first MICR font templates, subtracting the number of unacceptable pixels from the number of acceptable pixels to define a difference, and comparing the difference to a first predetermined threshold;

using second MICR font templates to try to identify additional MICR characters includes determining a sum of acceptable pixels in response to a selected second MICR font template and comparing the sum of acceptable pixels to a second predetermined threshold; and using third MICR font templates to try to identify MICR characters includes determining a sum of unacceptable pixels in response to a selected one of the third MICR font templates and comparing the sum of unacceptable pixels to a third predetermined threshold.

6. A check processing method as defined in claim 5, wherein the second predetermined threshold sets a relaxed standard relative to the first predetermined threshold.

7. A computer-implemented method for digitally recognizing a plurality of characters across an area of a digital image containing character indicia at predetermined positions in the area and also containing non-character indicia in the area, comprising:

detecting indicia in the digital image and using a first template on the detected indicia to distinguish at least some character indicia from non-character indicia across the area;

in response to the predetermined positions of the character indicia and the character indicia distinguished using the first template, determining positions in the area at which other character indicia should be located but are not distinguished using the first template; and using another template at the determined positions to try to identify character indicia thereat, wherein such other template represents an inverse of the first template, the inverse defining an area of investigation outside an area of the first template at the determined positions.

8. A computer-implemented method as defined in claim 7, further comprising digitally distinguishing non-character indicia representing horizontal and vertical lines detected in the area of the digital image.

9. A check analyzer tool, comprising:

a first MICR font template to identify MICR characters;

a missing MICR character position detector responsive to the first MICR font template to detect a position of a missing MICR character relative to at least one MICR character identified by the first MICR font template; and another MICR font template, for use in response to the missing MICR character position detector to identify a MICR character in apposition detected by the missing MICR character position detector, wherein such other MICR font template represents an inverse of the first MICR font template so that the inverse identifies broken MICR characters having a part of the character missing and not identified by the first MICR font template.

10. A computer-implemented method for digitally recognizing a plurality of characters across an area of a digital image containing character indicia at predetermined positions in the area and also containing non-character indicia in the area, comprising:

detecting indicia in the digital image and using skeleton templates on the detected indicia to distinguish at least some character indicia from non-character indicia across the area;

in response to the predetermined positions of the character indicia and the character indicia distinguished using the skeleton templates, determining positions in the area at which other character indicia should be located but are not distinguished using the skeleton templates; and using inverse skeleton templates at the determined positions to try to identify character indicia thereat, wherein the inverse skeleton templates represent character indicia inversely to character indicia representations of the skeleton templates such that the inverse skeleton templates define areas of investigation outside areas of the skeleton templates at the determined positions.

11. A financial item analyzer tool, comprising:

means for applying character recognition processing to an invalidated MICR line in a digital image of a financial item; and memory means for containing in digitally encoded form the means for applying such that the means for applying is accessible by a digital computer;

wherein the means for applying includes:

a first set of digital templates, the first set including skeleton templates representing MICR characters to be digitally recognized at determined positions of the invalidated MICR line; and a second set of digital templates, the second set including inverse templates representing respective inverses of the MICR characters such that each inverse template of the second set is an inverse of a respective one of the skeleton templates of the first set, wherein a respective inverse template of the second set defines an area of investigation outside an area of the respective skeleton template of the first set at the determined positions.

12. A financial item analyzer tool as defined in claim 11, wherein the financial item is a check passed through a check sorter.

13. A financial item analyzer tool as defined in claim 11, wherein the means for applying includes:
  a detector to detect a digital image of the invalidated MICR line in the digital image of the financial item, wherein the detector includes the first and second sets of digital templates; and
  an image orienter, responsive to the detector, to change an orientation of the digital image of the financial item.

14. A financial item analyzer tool, comprising:
  a first MICR font template including a set of skeleton templates and a first application rule set to identify MICR characters;
  a missing MICR character position detector responsive to the first MICR font template to detect a position of a missing MICR character relative to at least one MICR character identified by the first MICR font template;
  a second MICR font template, responsive to the missing MICR character position detector, the second MICR font template including the set of skeleton templates and a second application rule set to identify a MICR character in a position detected by the missing MICR character position detector; and
  a third MICR font template, responsive to the second MICR font template, the third MICR font template including a set of inverse skeleton templates and a third application rule set to identify a MICR character in a position detected by the missing MICR character position detector.

15. A financial item analyzer tool as defined in claim 14, wherein:
  the first application rule set includes a first predetermined threshold, against which a difference between acceptable pixels and unacceptable pixels determined with the first MICR font template is compared;
  the second application rule set includes a second predetermined threshold, against which a sum of acceptable pixels determined with the second MICR font template is compared; and
  the third application rule set includes a third predetermined threshold, against which a sum of unacceptable pixels determined with the third MICR font template is compared.

16. A financial item analyzer tool as defined in claim 15, wherein the second predetermined threshold sets a relaxed standard relative to the first predetermined threshold.

17. A check processing method, comprising:
  transporting a check through a check sorter including a MICR reader and a digital imager;
  generating electrical signals with the MICR reader in response to the MICR reader sensing a MICR line on a check in the check sorter and communicating the electrical signals to a controller including a programmed computer to define a first set of data;
  generating with the digital imager a digital image of the check in the check sorter and communicating the digital image to a database to define a second set of data;
  determining in the programmed computer, using the first set of data and a predetermined set of MICR line validation rules digitally stored in the programmed computer, whether the electrical signals represent a valid or an invalid MICR line; and
  in response to determining that the electrical signals represent an invalid MICR line, and off-line from the check sorter and the transporting of the check, digitally processing, using the second set of data, the digital image of the check to identify MICR characters therein, including:
    digitally converting a digital representation of the digital image from the second set of data to a common image format;
    digitally applying sets of skeleton templates to the converted data in the common image format to determine MICR characters in the MICR line represented in the converted data;
    determining in the programmed computer, using the predetermined set of MICR line validation rules, whether the determined MICR characters represent a valid or invalid MICR line; and
    writing the determined MICR characters to the first set of data in response to determining that the determined MICR characters represent a valid MICR line;
  wherein digitally applying sets of skeleton templates includes:
    using first MICR font skeleton templates to identify MICR characters across the length of a selected area of the digital image of the check represented in the converted data in the common image format;
    detecting a position for a MICR character not identified by the first MICR font skeleton templates relative to at least one MICR character identified by the first MICR font skeleton templates; and
    in response to detecting a position for a MICR character not identified by the first MICR font skeleton templates, using other MICR font templates to identify the MICR character in the detected position, wherein such other MICR font templates are inverses of the first MICR font skeleton templates.

18. A check processing method, comprising:
  transporting a check through a check sorter including a MICR reader and a digital imager;
  generating electrical signals with the MICR reader in response to the MICR reader sensing a MICR line on a check in the check sorter and communicating the electrical signals to a controller including a programmed computer to define a first set of data;
  generating with the digital imager a digital image of the check in the check sorter and communicating the digital image to a database to define a second set of data;
  determining in the programmed computer, using the first set of data and a predetermined set of MICR line validation rules digitally stored in the programmed computer, whether the electrical signals represent a valid or an invalid MICR line; and
  in response to determining that the electrical signals represent an invalid MICR line, and off-line from the check sorter and the transporting of the check, digitally processing, using the second set of data, the digital image of the check to identify MICR characters therein, including:
    digitally converting a digital representation of the digital image from the second set of data to a common image format;
    digitally applying sets of skeleton templates to the converted data in the common image format to determine MICR characters in the MICR line represented in the converted data;
    determining in the programmed computer, using the predetermined set of MICR line validation rules, whether the determined MICR characters represent a valid or invalid MICR line; and
    writing the determined MICR characters to the first set of data in response to determining that the determined MICR characters represent a valid MICR line;
  wherein digitally applying sets of skeleton templates includes:
    using first MICR font skeleton templates to identify MICR characters in the converted data;

using second MICR font skeleton templates to try to identify additional MICR characters in the MICR line, and using third MICR font templates to try to identify still other MICR characters, the third MICR font templates including templates that are inverses of the first and second MICR font skeleton templates for identifying broken MICR characters having a part of the character missing and not identified by either the first or second MICR font templates.

19. A check processing method as defined in claim 18, wherein:

using first MICR font skeleton templates to identify MICR characters in the converted data includes identifying acceptable pixels and unacceptable pixels in response to a selected one of the first MICR font skeleton templates, subtracting the number of unacceptable pixels from the number of acceptable pixels to define a difference, and comparing the difference to a first predetermined threshold;

using second MICR font skeleton templates to try to identify additional MICR characters in the MICR line includes determining a sum of acceptable pixels in response to a selected second MICR font skeleton template and comparing the sum of acceptable pixels to a second predetermined threshold; and using third MICR font templates to try to identify still other MICR characters includes determining a sum of unacceptable pixels in response to a selected one of the third MICR font templates and comparing the sum of unacceptable pixels to a third predetermined threshold.

20. A check processing method as defined in claim 19, wherein the second predetermined threshold sets a relaxed standard relative to the first predetermined threshold.

21. A check processing method, comprising:

transporting a check through a check sorter including a MICR reader and a digital imager;

generating electrical signals with the MICR reader in response to the MICR reader sensing a MICR line on a check in the check sorter and communicating the electrical signals to a controller including a programmed computer to define a first set of data;

generating with the digital imager a digital image of the check in the check sorter and communicating the digital image to a database to define a second set of data;

determining in the programmed computer, using the first set of data and a predetermined set of MICR line validation rules digitally stored in the programmed computer, whether the electrical signals represent a valid or an invalid MICR line; and in response to determining that the electrical signals represent an invalid MICR line, and off-line from the check sorter and the transporting of the check, digitally processing, using the second set of data, the digital image of the check to identify MICR characters therein, including:

digitally converting a digital representation of the digital image from the second set of data to a common image format;

digitally applying sets of skeleton templates to the converted data in the common image format to determine MICR characters in the MICR line represented in the converted data;

determining in the programmed computer, using the predetermined set of MICR line validation rules, whether the determined MICR characters represent a valid or invalid MICR line; and writing the determined MICR characters to the first set of data in response to determining that the determined MICR characters represent a valid MICR line;

wherein digitally applying sets of skeleton templates includes:

detecting indicia in the converted data and using a first template on the detected indicia to distinguish at least some character indicia; and using another template on detected indicia to try to identify character indicia, wherein such other template represents an inverse of the first template, the inverse defining regions outside a MICR character to be examined.

22. A check processing method, comprising:

transporting a check through a check sorter including a MICR reader and a digital imager;

generating electrical signals with the MICR reader in response to the MICR reader sensing a MICR line on a check in the check sorter and communicating the electrical signals to a controller including a programmed computer to define a first set of data;

generating with the digital imager a digital image of the check in the check sorter and communicating the digital image to a database to define a second set of data;

determining in the programmed computer, using the first set of data and a predetermined set of MICR line validation rules digitally stored in the programmed computer, whether the electrical signals represent a valid or an invalid MICR line; and in response to determining that the electrical signals represent an invalid MICR line, and off-line from the check sorter and the transporting of the check, digitally processing, using the second set of data, the digital image of the check to identify MICR characters therein, including:

digitally converting a digital representation of the digital image from the second set of data to a common image format;

digitally applying sets of skeleton templates to the converted data in the common image format to determine MICR characters in the MICR line represented in the converted data;

determining in the programmed computer, using the predetermined set of MICR line validation rules, whether the determined MICR characters represent a valid or invalid MICR line; and writing the determined MICR characters to the first set of data in response to determining that the determined MICR characters represent a valid MICR line;

wherein digitally applying sets of skeleton templates includes digitally using in the programmed computer a digital inverse skeleton template representing an inverse image of the character to be detected such that a broken representation of the character in the digital image is identified.

* * * * *

UNITED STATES PATENT AND TRADEMARK OFFICE
CERTIFICATE OF CORRECTION

PATENT NO. : 6,654,487 B1
DATED : November 25, 2003
INVENTOR(S) : Charles H. Downs, Jr.

It is certified that error appears in the above-identified patent and that said Letters Patent is hereby corrected as shown below:

Column 8,
Line 26, delete "image" and insert -- image; --.

Column 43,
Line 9, delete "someting" and insert -- something --.

Column 87,
Line 19, delete "55" and insert -- { --.

Column 91,
Line 34, delete "21" and insert -- 12 --.

Column 97,
Lines 32, 33 and 34, delete "1000000000000000000001" and insert
-- 1000000000111000000001 --.

Signed and Sealed this

Twenty-third Day of March, 2004

JON W. DUDAS
*Acting Director of the United States Patent and Trademark Office*